(12) United States Patent
Iwase et al.

(10) Patent No.: US 7,978,955 B2
(45) Date of Patent: Jul. 12, 2011

(54) RECORDING DEVICE, RECORDING METHOD, REPRODUCING DEVICE, REPRODUCING METHOD, PROGRAM, AND RECORDING MEDIUM

(75) Inventors: Ayako Iwase, Kanagawa (JP); Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 1243 days.

(21) Appl. No.: 11/629,651

(22) PCT Filed: Apr. 12, 2006

(86) PCT No.: PCT/JP2006/007744
§ 371 (c)(1),
(2), (4) Date: Dec. 15, 2006

(87) PCT Pub. No.: WO2006/115060
PCT Pub. Date: Nov. 2, 2006

(65) Prior Publication Data
US 2008/0008447 A1    Jan. 10, 2008

(30) Foreign Application Priority Data
Apr. 22, 2005    (JP) .................. 2005-125547

(51) Int. Cl.
*H04N 9/80* (2006.01)
(52) U.S. Cl. ....................... 386/239; 386/248

(58) Field of Classification Search .................. 386/201, 386/202, 207, 239, 248, 321, 332, 338
See application file for complete search history.

(56) References Cited

U.S. PATENT DOCUMENTS
| | | |
|---|---|---|
| 2002/0164152 A1 | 11/2002 | Kato et al. |
| 2006/0007963 A1 | 1/2006 | Kang et al. |
| 2008/0120637 A1* | 5/2008 | Deiss .............................. 725/32 |
| 2009/0214186 A1* | 8/2009 | Sugahara ....................... 386/98 |

FOREIGN PATENT DOCUMENTS
| | | |
|---|---|---|
| JP | 2002 158971 | 5/2002 |
| JP | 2005-63594 | 3/2005 |
| JP | 200563594 | 3/2005 |
| JP | 2005 354706 | 12/2005 |

* cited by examiner

*Primary Examiner* — Robert Chevalier
(74) *Attorney, Agent, or Firm* — Oblon, Spivak, McClelland, Maier & Neustadt, L.L.P.

(57) ABSTRACT

The present invention relates to a recording apparatus, a recording method, a playback apparatus, a playback method, a program, and a recording medium in which random access playback of TS of audio data encoded using different encoding methods can be performed. A controller obtains PTS from TS, and sets a BS audio TS packet 261-1 as an entry point when an HQ audio TS packet 271-1 having the same PTS exists after the BS audio TS packet 261-1 in the TS. Further, the controller generates EP_map based on the PID of the BS audio ES and the HQ audio ES, the source packet number of the BS audio TS packet 261-1 set as the entry point, and the PTS.

17 Claims, 37 Drawing Sheets

FIG. 6

| Syntax | No. of bits | Mnemonic |
|---|---|---|
| zzzzz.clpi { | | |
| type_indicator | 8*4 | bslbf |
| version_number | 8*4 | bslbf |
| SequenceInfo_start_address | 32 | uimsbf |
| ProgramInfo_start_address | 32 | uimsbf |
| CPI_start_address | 32 | uimsbf |
| ClipMark_start_address | 32 | uimsbf |
| reserved_for_future_use | 128 | bslbf |
| ClipInfo() | | |
| for (i=0;i<N1;I++) { | | |
| padding_word | 16 | bslbf |
| } | | |
| SequenceInfo() | | |
| for (i=0;i<N2;I++) { | | |
| padding_word | 16 | bslbf |
| } | | |
| ProgramInfo() | | |
| for (i=0;i<N3;I++) { | | |
| padding_word | 16 | bslbf |
| } | | |
| CPI() | | |
| for (i=0;i<N4;I++) { | | |
| padding_word | 16 | bslbf |
| } | | |
| ClipMark() | | |
| for (i=0;i<N5;I++) { | | |
| padding_word | 16 | bslbf |
| } | | |
| } | | |

FIG. 9

PlayList-Syntax

| Syntax | No. of bits | Mnemonic |
|---|---|---|
| PlayList() { | | |
|   length | 32 | uimsbf |
|   reserved_for_future_use | 16 | bslbf |
|   number_of_PlayItems | 16 | uimsbf |
|   number_of_SubPaths | 16 | uimsbf |
|   for (PlayItem_id=0; | | |
|     PlayItem_id<number_of_PlayItems; | | |
|     PlayItem_id++) { | | |
|     PlayItem() | | |
|   } | | |
|   for (SubPath_id= 0; | | |
|     SubPath_id<number_of_SubPaths; | | |
|     SubPath_id++) { | | |
|     SubPath() | | |
|   } | | |
| } | | |

FIG. 10

SubPath-Syntax

| Syntax | No. of bits | Mnemonic |
|---|---|---|
| SubPath() { | | |
| length | 32 | uimsbf |
| reserved_for_future_use | 8 | bslbf |
| SubPath_type | 8 | uimsbf |
| reserved_for_future_use | 15 | uimsbf |
| is_repeat_SubPath | 1 | bslbf |
| reserved_for_future_use | 8 | bslbf |
| number_of_SubPlayItems | 8 | uimsbf |
| for(i=0; i< number_of_SubPlayItems; i++) { | | |
| SubPlayItem(i) | | |
| } | | |
| } | | |

FIG. 11

SubPath_type

| SubPath_type | Meaning |
|---|---|
| 0 | reserved |
| 1 | reserved |
| 2 | Audio presentation path of the Browsable slideshow<br>(The audio presentation path using the SubPath is not synchronized with the main path using PlayItems in the PlayList.) |
| 3 | Interactive graphics presentation menu<br>(The interactive graphics menu using the SubPath is not synchronized with the main path using PlayItems in the PlayList.) |
| 4 | Text subtitle presentation path<br>(The text subtitle presentation path using the SubPath is synchronized with the main path using PlayItems in the PlayList.) |
| 5 | 2nd Audio Presentation path<br>(The 2nd Audio Presentation path using the SubPath is synchronized with the main path using PlayItems in the PlayList.) |
| 6 | 2nd Video Presentation path<br>(The 2nd Video Presentation path using the SubPath is synchronized with the main path using PlayItems in the PlayList.) |
| 7-255 | reserved |

FIG. 12

| Syntax | No. of bits | Mnemonic |
|---|---|---|
| CPI() { | | |
| length | 32 | uimsbf |
| if(length !=0) { | | |
| reserved_for_word_align | 12 | bslbf |
| CPI_type | 4 | bslbf |
| EP_map() | | |
| } | | |
| } | | |

FIG. 13

| CPI_type | Meaning |
|---|---|
| 0 | reserved |
| 1 | EP_map type |
| 2 | reserved |
| 3—15 | reserved |

FIG. 19

| Syntax | No. of bits | Mnemonic |
|---|---|---|
| EP_map() { | | |
|     reserved_for_word_align | 8 | bslbf |
|     number_of_stream_PID_entries | 8 | uimsbf |
|     for(k=0;k<number_of_stream_PID_entries;k++) { | | |
|         stream_PID[k] | 16 | bslbf |
|         reserved_for_word_align | 10 | bslbf |
|         EP_stream_type[k] | 4 | bslbf |
|         number_of_EP_coarse_entries[k] | 16 | uimsbf |
|         number_of_EP_fine_entries[k] | 18 | uimsbf |
|         EP_map_for_one_stream_PID_start_address[k] | 32 | uimsbf |
|     } | | |
|     for(i=0;i<X;i++) { | | |
|         padding_word | 16 | bslbf |
|     } | | |
|     for(k=0;k<number_of_stream_PID_entries;k++) { | | |
|       EP_map_for_one_stream_PID(EP_stream_type[k],<br>            number_of_EP_coarse_entries[k],<br>            number_of_EP_fine_entries[k]) | | |
|       for(i=0;i<Y[k];i++) { | | |
|         padding_word | 16 | bslbf |
|       } | | |
|     } | | |
| } | | |

FIG. 20

| EP_stream_type | Meaning |
|---|---|
| 0 | reserved |
| 1 | video type1 |
| 2 | reserved |
| 3 | audio |
| 4 | reserved |
| others | reserved |

FIG. 21

| Syntax | No. of bits | Mnemonic |
|---|---|---|
| EP_map_for_one_stream_PID(EP_stream_type, Nc, Nf) { | | |
| EP_fine_table_start_address | 32 | uimsbf |
| for (i=0; i<Nc; i++) { | | |
| ref_to_EP_fine_id[i] | 18 | uimsbf |
| PTS_EP_coarse[i] | 14 | uimsbf |
| SPN_EP_coarse[i] | 32 | uimsbf |
| } | | |
| for (i=0; i<X; i++) { | | |
| padding_word | 16 | bslbf |
| } | | |
| for(EP_fine_id = 0; EP_fine_id < Nf; EP_fine_id ++) { | | |
| is_angle_change_point[EP_fine_id] | 1 | bslbf |
| I_end_position_offset[EP_fine_id] | 3 | bslbf |
| PTS_EP_fine[EP_fine_id] | 11 | uimsbf |
| SPN_EP_fine[EP_fine_id] | 17 | uimsbf |
| } | | |
| } | | |

FIG. 22

| EP_stream_type | I_end_position_offset | Entry point pointed to by the SPN_EP_start (Note1) |
|---|---|---|
| 1(video type1) | 001b to 111b | SQH+I_picture(if MPEG-2 video stream) or I or IDR picture(if MPEG-4 AVC video stream) |
| 3(audio) | 000b | Audio PES packet |

FIG. 23

| Syntax | No. of bits | Mnemonic |
|---|---|---|
| ClipInfo() { | | |
|   length | 32 | uimsbf |
|   reserved_for_future_use | 16 | bslbf |
|   Clip_stream_type | 8 | bslbf |
|   application_type | 8 | bslbf |
|   reserved_for_future_use | 31 | bslbf |
|   is_ATC_delta | 1 | bslbf |
|   TS_recording_rate | 32 | uimsbf |
|   number_of_source_packets | 32 | uimsbf |
|   reserved_for_future_use | 1024 | bslbf |
|   TS_type_info_block() | | |
|   if(is_ATC_delta==1b) { | | |
|     reserved_for_future_use | 8 | bslbf |
|     number_of_ATC_delta_entries | 8 | uimsbf |
|     for(i=0;i<number_of_ATC_delta_entries;i++) { | | |
|       ATC_delta[i] | 32 | uimsbf |
|       following_Clip_Information_file_name[i] | 8*5 | bslbf |
|       Clip_codec_identifier | 8*4 | bslbf |
|       reserved_for_future_use | 8 | bslbf |
|     } | | |
|   } | | |
| THE REST IS OMITTED | | |
| } | | |

FIG. 24

| application_type | meaning |
|---|---|
| 0 | reserved |
| 1 | TS for Movie applications |
| 2 | TS for Time based slide show |
| 3 | TS for a main-path of Browsable slide show |
| 4 | TS for a sub-path of Browsable slide show |
| 5 | TS for a sub-path of Interactive graphics menu |
| 6 | TS for a sub-path of Text subtitle |
| 7−255 | reserved |

FIG. 26
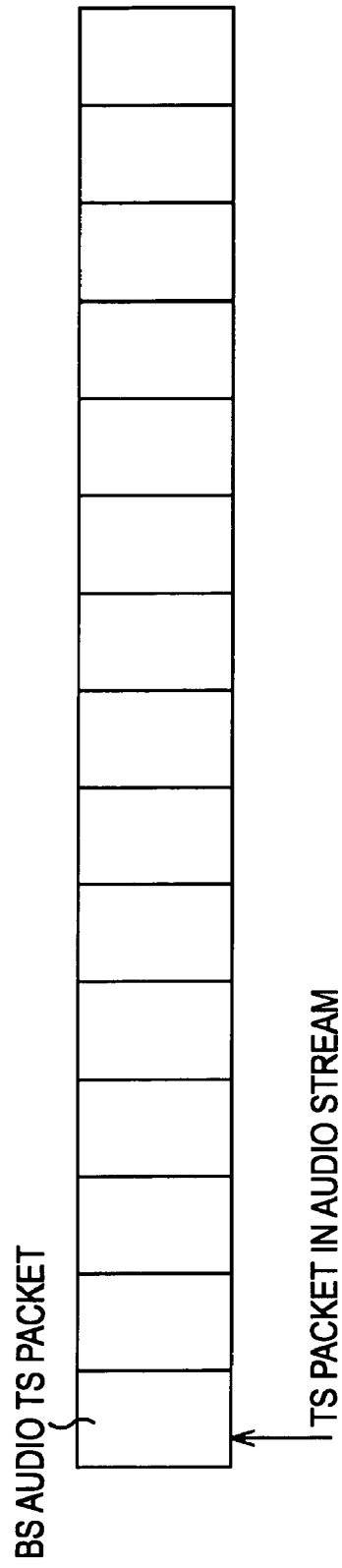
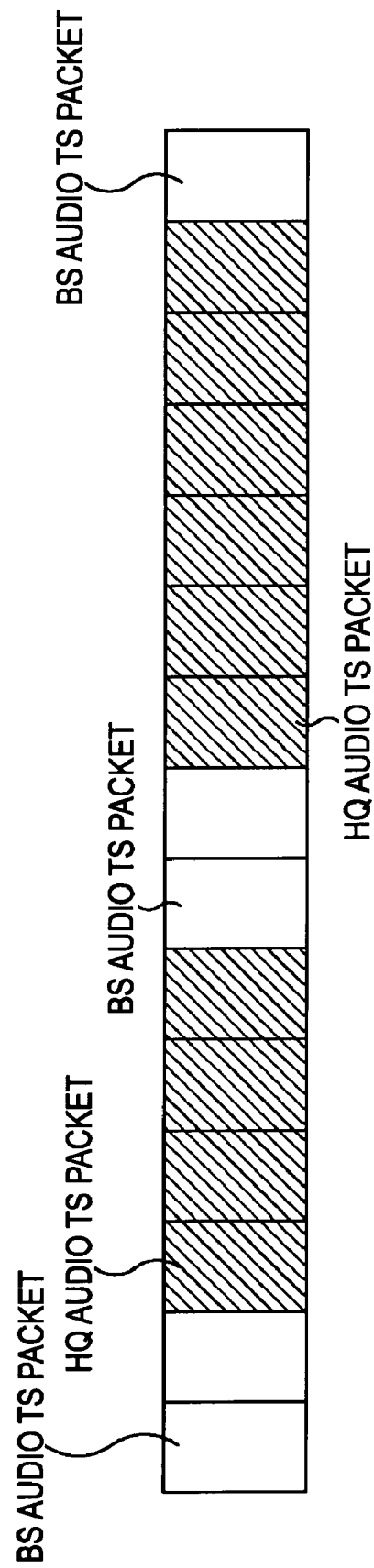

RECORDING DEVICE, RECORDING METHOD, REPRODUCING DEVICE, REPRODUCING METHOD, PROGRAM, AND RECORDING MEDIUM

TECHNICAL FIELD

Recently, various optical discs have been proposed as disc-based recording media removable from recording/playback apparatuses. AV (Audio Visual) streams to be recorded onto such recordable optical discs are multiplexed into TS (transport stream) by, for example, MPEG (Moving Picture Experts Group) 2.

Patent Document 1 discloses a technique for realizing a slide show with the use of MPEG2. Specifically, a technique for managing AV (Audio Visual) streams in the application format of still images recorded on a recording medium by using two layers, i.e., a playlist layer and a clip layer, is disclosed. A clip manages one or more still images and clip information, which is auxiliary information of each still image, and a playlist has a plurality of playitems representing playback sections of the slide show using the still images contained in the clip.

Further, a technique is disclosed in which the data address of a transport stream, which is indicated by the playback start time IN_time and the playback end time OUT_time of a playitem, is obtained by referring to EP_map, which is a table representing identification information on the still images contained in the clip information and source packet numbers associated therewith, thereby playing back a slide show of still images that are not synchronous with audio.

Further, a technique is disclosed in which audio is played back in synchronization with a slide show in which the playback start time of each still image is predetermined using EP_map for audio including the start time in each audio stream and information indicating the address of a source packet (smallest access unit) corresponding to the start time and the end time.

[Patent Document 1]
Japanese Unexamined Patent Application Publication No. 2004-336566

DISCLOSURE OF INVENTION

Problems to be Solved by the Invention

In Patent Document 1, however, it is not taken into consideration that TS packets with the same PID in two audio streams encoded using different encoding methods are multiplexed into a single transport stream for recording.

The present invention has been made in view of such a circumstance, and it is an object of the present invention to provide easy playback when TS packets with the same PID in two pieces of audio data encoded using different encoding methods are multiplexed into a single transport stream.

A recording apparatus according to the present invention includes receiving means for receiving an input of a transport stream in which first TS packets generated by TS-packetizing audio data encoded using a first encoding method that is a predetermined encoding method and second TS packets generated by TS-packetizing audio data encoded using a second encoding method different from the first encoding method are multiplexed, the second encoding method being a variable-length encoding method; obtaining means for obtaining time information used for decoding as first time information, the time information being included in one of the first TS packets of the transport stream received by the receiving means; determining means for determining whether or not one of the second TS packets that includes the time information having the same time value as the first time information exists after the one first TS packet from which the first time information is obtained by the obtaining means in the transport stream; setting means for setting as an entry point the one first TS packet from which the first time information is obtained when the determining means determines that the one second TS packet including the time information having the same time value as the first time information exists after the one first TS packet from which the first time information is obtained; creating means for creating a table based on stream identification information, the number of the one first TS packet set as the entry point by the setting means, and the first time information; and recording controlling means for recording the table created by the creating means onto a recording medium.

The determining means may further determine whether or not decoding information for starting decoding at an associated position is stored in a leading audio access unit among audio access units included in the one second TS packet including the time information having the same time value as the first time information; and the setting means may set as the entry point the one first TS packet from which the first time information is obtained when the determining means determines that the one second TS packet including the time information having the same time value as the first time information exists after the one first TS packet from which the first time information is obtained and when the determining means further determines that the decoding information necessary for performing the decoding starting from the associated position is stored in the leading audio access unit included in the one second TS packet including the time information having the same time value as the first time information.

The table may be a table for associating time information included in the transport stream with a TS packet number of the transport stream.

The table may comprise EP_map.

The time information may comprise a presentation time stamp.

The recording apparatus may further include reading means for reading information recorded onto the recording medium by the recording controlling means; and controlling means for controlling a read position of the reading means. The reading means may read the table from the recording medium; the controlling means may control the read position of the reading means based on the table and a playback position specified by a user; and the reading means may read the transport stream from the recording medium according to the control of the read position by the controlling means.

The recording apparatus may further include reading means for reading information recorded onto the recording medium by the recording controlling means; controlling means for controlling a read position of the reading means; and decoding means for decoding the audio data encoded using the first encoding method. The reading means may read the table from the recording medium; the controlling means may designate as the read position the number of one of the first TS packets that is determined based on the table and a playback position specified by a user; the reading means may read the first TS packets included in the transport stream, starting from the number of the one first TS packet designated by the controlling means; and the decoding means may decode the audio data encoded using the first encoding method included in the first TS packets read by the reading means.

The recording apparatus may further include reading means for reading information recorded onto the recording medium by the recording controlling means; controlling means for controlling a read position of the reading means; and decoding means for decoding the audio data encoded using the second encoding method. The reading means may read the table from the recording medium; the controlling means may designate as the read position the number of one of the first TS packets that is determined based on the table and a playback position specified by the user; the reading means may read one of the second TS packets that is recorded after the number of the one first TS packet designated by the controlling means; the controlling means may further designate as the read position the number of the one second TS packet read by the reading means when the time information included in the one second TS packet matches the time information included in the one first TS packet designated as the read position; the reading means may read the second TS packets included in the transport stream, starting from the number of the one second TS packet designated by the controlling means; and the decoding means may decode the audio data encoded using the second encoding method included in the second TS packets read by the reading means.

A recording method according to the present invention includes a receiving step of receiving an input of a transport stream in which first TS packets generated by TS-packetizing audio data encoded using a first encoding method that is a predetermined encoding method and second TS packets generated by TS-packetizing audio data encoded using a second encoding method different from the first encoding method are multiplexed, the second encoding method being a variable-length encoding method; an obtaining step of obtaining time information used for decoding as first time information, the time information being included in one of the first TS packets of the transport stream received in the processing of the receiving step; a determining step of determining whether or not one of the second TS packets that includes the time information having the same time value as the first time information exists after the one first TS packet from which the first time information is obtained in the processing of the obtaining step in the transport stream; a setting step of setting as an entry point the one first TS packet from which the first time information is obtained when it is determined in the processing of the determining step that the one second TS packet including the time information having the same time value as the first time information exists after the one first TS packet from which the first time information is obtained; a creating step of creating a table based on stream identification information, the number of the one first TS packet set as the entry point in the processing of the setting step, and the first time information; and a recording step of recording the table created in the processing of the creating step onto a recording medium.

A first program according to the present invention causes a computer to execute a process including a receiving step of receiving an input of a transport stream in which first TS packets generated by TS-packetizing audio data encoded using a first encoding method that is a predetermined encoding method and second TS packets generated by TS-packetizing audio data encoded using a second encoding method different from the first encoding method are multiplexed, the second encoding method being a variable-length encoding method; an obtaining step of obtaining time information used for decoding as first time information, the time information being included in one of the first TS packets of the transport stream received in the processing of the receiving step; a determining step of determining whether or not one of the second TS packets that includes the time information having the same time value as the first time information exists after the one first TS packet from which the first time information is obtained in the processing of the obtaining step in the transport stream; a setting step of setting as an entry point the one first TS packet from which the first time information is obtained when it is determined in the processing of the determining step that the one second TS packet including the time information having the same time value as the first time information exists after the one first TS packet from which the first time information is obtained; a creating step of creating a table based on stream identification information, the number of the one first TS packet set as the entry point in the processing of the setting step, and the first time information; and a recording step of recording the table created in the processing of the creating step onto a recording medium.

In a first aspect of the present invention, an input of a transport stream in which first TS packets generated by TS-packetizing audio data encoded using a first encoding method and second TS packets generated by TS-packetizing audio data encoded using a second encoding method are multiplexed is received: time information used for decoding, which is included in one of the first TS packets of the TS, is obtained as first time information; when it is determined that one of the second TS packets that includes the time information having the same time value as the first time information exists in the TS after the one first TS packet from which the first time information is obtained, the one first TS packet from which the first time information is obtained is set as an entry point; and a table is created based on stream identification information, the number of the one first TS packet set as the entry point, and the first time information, and is recorded onto a recording medium.

A playback apparatus according to the present invention is a playback apparatus for playing back data recorded on a recording medium, and the data includes a transport stream in which first TS (Transport Stream) packets generated by TS-packetizing audio data encoded using a first encoding method that is a predetermined encoding method and second TS packets generated by TS-packetizing audio data encoded using a second encoding method different from the first encoding method are multiplexed, the second encoding method being a variable-length encoding method. The playback apparatus includes reading means for reading information recorded on the recording medium having a table recorded thereon, the table being created based on first time information that is time information used for decoding, which is included in one of the first TS packets of the transport stream, and stream identification information and the number of the one first TS packet including the first time information when one of the second TS packets that includes the time information having the same time value as the first time information exists after the one first TS packet from which the first time information is obtained; and controlling means for controlling a read position of the reading means. The reading means reads the table from the recording medium; the controlling means controls the read position of the reading means based on the table and a playback position specified by a user; and the reading means reads the transport stream from the recording medium according to the control of the read position by the controlling means.

The playback apparatus may further include decoding means for decoding the audio data encoded using the first encoding method. The reading means may read the table from the recording medium; the controlling means may designate as the read position the number of one of the first TS packets that is determined based on the table and the playback position specified by the user; the reading means may read the first TS packets included in the transport stream, starting from the number of the one first TS packet designated by the controlling means; and the decoding means may decode the audio data encoded using the first encoding method included in the first TS packets read by the reading means.

The playback apparatus may further include decoding means for decoding the audio data encoded using the second encoding method. The reading means may read the table from the recording medium; the controlling means may designate as the read position the number of one of the first TS packets that is determined based on the table and the playback position specified by the user; the reading means may read one of the second TS packets that is recorded after the number of the one first TS packet designated by the controlling means; the controlling means may further designate as the read position the number of the one second TS packet read by the reading means when the time information included in the one second TS packet matches the time information included in the one first TS packet designated as the read position; the reading means may read the second TS packets included in the transport stream, starting from the number of the one second TS packet designated by the controlling means; and the decoding means may decode the audio data encoded using the second encoding method included in the second TS packets read by the reading means.

A playback method according to the present invention is a playback method for a playback apparatus for playing back data recorded on a recording medium, and the data includes a transport stream in which first TS packets generated by TS-packetizing audio data encoded using a first encoding method that is a predetermined encoding method and second TS packets generated by TS-packetizing audio data encoded using a second encoding method different from the first encoding method are multiplexed, the second encoding method being a variable-length encoding method. The playback method includes a first reading step of reading a table from the recording medium having the table recorded thereon, the table being created based on first time information that is time information used for decoding, which is included in one of the first TS packets of the transport stream, and stream identification information and the number of the one first TS packet including the first time information when one of the second TS packets that includes the time information having the same time value as the first time information exists after the one first TS packet from which the first time information is obtained; a controlling step of controlling a read position based on the table and a playback position specified by a user; and a second reading step of reading the transport stream from the recording medium according to the control of the read position by the processing of the controlling step.

A second program according to the present invention is a program for playing back data recorded on a recording medium, and the data includes a transport stream in which first TS packets generated by TS-packetizing audio data encoded using a first encoding method that is a predetermined encoding method and second TS packets generated by TS-packetizing audio data encoded using a second encoding method different from the first encoding method are multiplexed, the second encoding method being a variable-length encoding method. The program causes a computer to execute a process including a first reading step of reading a table from the recording medium having the table recorded thereon, the table being created based on first time information that is time information used for decoding, which is included in one of the first TS packets of the transport stream, and stream identification information and the number of the one first TS packet including the first time information when one of the second TS packets that includes the time information having the same time value as the first time information exists after the one first TS packet from which the first time information is obtained; a controlling step of controlling a read position based on the table and a playback position specified by a user; and a second reading step of reading the transport stream from the recording medium according to the control of the read position by the processing of the controlling step.

In a second aspect of the present invention, a table is read from a recording medium having recorded thereon a transport stream in which first TS packets generated by TS-packetizing audio data encoded using a first encoding method and second TS packets generated by TS-packetizing audio data encoded using a second encoding method are multiplexed, and the table that is created based on first time information that is time information used for decoding, which is included in one of the first TS packets of the TS, and stream identification information and the number of the one first TS packet from which the first time information is obtained when one of the second TS packets that includes the time information having the same time value as the first time information exists after the one first TS packet from which the first time information is obtained; a read position is controlled based on the table and a playback position specified by a user; and the transport stream is read from the recording medium.

A recording medium according to the present invention is a recording medium having recorded thereon data regarding audio data, wherein the data includes a transport stream in which first TS (Transport Stream) packets generated by TS-packetizing audio data encoded using a first encoding method that is a predetermined encoding method and second TS packets generated by TS-packetizing audio data encoded using a second encoding method different from the first encoding method are multiplexed, the second encoding method being a variable-length encoding method; and a table is recorded on the recording medium, the table being created based on first time information being time information used for decoding, which is included in one of the first TS packets of the transport stream, and stream identification information and the number of the one first TS packet including the first time information when one of the second TS packets that includes the time information having the same time value as the first time information exists after the one first TS packet from which the first time information is obtained.

In a third aspect of the present invention, a transport stream in which first TS packets generated by TS-packetizing audio data encoded using a first encoding method and second TS packets generated by TS-packetizing audio data encoded using a second encoding method are multiplexed, and a table created based on first time information that is time information used for decoding, which is included in one of the first TS packets of the TS, and stream identification information and the number of the one first TS packet from which the first time information is obtained when one of the second TS packets that includes the time information having the same time value as the first time information exists after the one first TS packet from which the first time information is obtained are recorded.

A playback method according to the present invention is a playback method for playing back data recorded on a recording medium, and the data includes a transport stream in which first TS (Transport Stream) packets generated by TS-packetizing audio data encoded using a first encoding method that is a predetermined encoding method and second TS packets generated by TS-packetizing audio data encoded using a second encoding method different from the first encoding method are multiplexed, the second encoding method being a variable-length encoding method. The playback method includes the steps of obtaining first time information for playback; reading a table including correspondence information between position information for the first TS packets on the recording medium and second time information used for decoding the first TS packets; specifying the second time information stored in the table based on the first time information; obtaining position information corresponding to the second time information specified based on the table; starting the reading of the data from a recording position at which one of the first TS packets is recorded in the position information; obtaining one of the second TS packets that is multiplexed at a position after the position at which the reading of the data is started; and decoding the obtained one second TS packet without decoding the read one first TS packet.

In a fourth aspect of the present invention, first time information for playback is obtained; a table including correspondence information between position information for the first TS packets on the recording medium and second time information used for decoding the first TS packets is read; the second time information stored in the table based on the first time information is specified; position information corresponding to the second time information specified based on the table is obtained; the reading of the data is started from a recording position at which one of the first TS packets is recorded in the position information; one of the second TS packets that is multiplexed at a position after the position at which the reading of the data is started is obtained; and the obtained one second TS packet is decoded without decoding the read one first TS packet.

Advantages

According to the first aspect of the present invention, audio streams can be recorded. More specifically, according to the first aspect of the present invention, a transport stream in which TS packets of audio data encoded using different encoding methods are multiplexed and information for providing random access to the transport stream can be recorded.

According to the second aspect of the present invention, audio streams can be recorded. More specifically, according to the second aspect of the present invention, random access playback can be performed on a transport stream in which TS packets of audio data encoded using different encoding methods are multiplexed.

According to the third aspect of the present invention, a recording medium having audio streams recorded thereon can be provided. More specifically, according to the third aspect of the present invention, a recording medium that allows random access playback of a transport stream in which TS packets of audio data encoded using different encoding methods are multiplexed can be provided.

BRIEF DESCRIPTION OF THE DRAWINGS

FIG. 6 is a diagram illustrating the syntax of a clip information file.

FIG. 9 is a diagram illustrating the syntax of a playlist.

FIG. 10 is a diagram illustrating the syntax of a sub path.

FIG. 11 is a diagram illustrating SubPath_type.

FIG. 12 is a diagram illustrating the syntax of CPI.

FIG. 13 is a diagram illustrating CPI_type.

FIG. 19 is a diagram illustrating the syntax of EP_map.

FIG. 20 is a diagram illustrating EP_stream_type.

FIG. 21 is a diagram illustrating the syntax of EP_map_for_one_stream_PID of EP_map.

FIG. 22 is a diagram illustrating a constraint of EP_stream_type.

FIG. 23 is a diagram illustrating the syntax of ClipInfo.

FIG. 24 is a diagram illustrating application_type.

FIG. 26 includes diagrams illustrating the difference between a case where a TS is composed of only a BS audio ES and a case where a TS is composed of a BS audio ES and an HQ audio ES.

Figure 1:
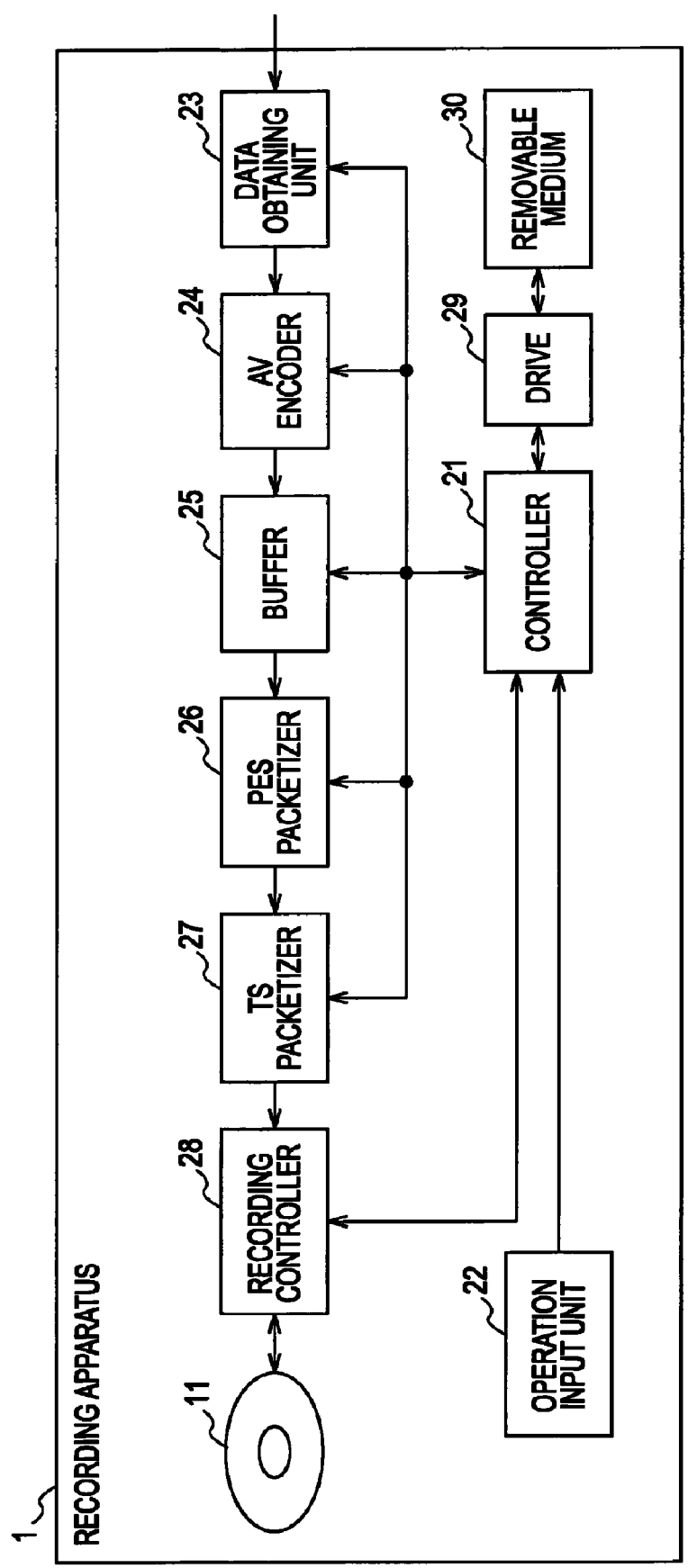
FIG. 1 is a block diagram showing an example structure of a recording apparatus according to the present invention.

REFERENCE NUMERALS 1 recording apparatus
21 controller
22 operation input unit
23 data obtaining unit
24 AV encoder 26 PES packetizer
27 TS packetizer
28 recording controller
171 BS audio ES
172 BS audio PES
173 BS audio TS
181 HQ audio ES
182 HQ audio PES
183 HQ audio TS
190 TS
201 BS audio PES packet
211 HQ audio PES packet
231 BS audio TS packet
232 HQ audio TS packet
261 BS audio TS packet
271 HQ audio TS packet
341 playback apparatus
351 controller
352 operation input unit
354 playback controller
356 AV decoder

BEST MODE FOR CARRYING OUT THE INVENTION

An embodiment of the present invention will be described hereinbelow with reference to the drawings.

FIG. 1 is a block diagram showing an example structure of a recording apparatus 1 according to the present invention.

The recording apparatus 1 includes an optical disc 11, a controller 21, an operation input unit 23, an AV (Audio Visual) encoder 24, a buffer 25, a PES (Packetized Elementary Stream) packetizer 26, a TS (Transport Stream) packetizer 27, a recording controller 28, a drive 29, and a removable medium 30.

The controller 21 executes a control program prepared in advance to control the overall operation of the recording apparatus 1. For example, the controller 21 controls a process of recording AV (Audio Visual) streams and EP_map (which is described in detail below) or the like for allowing a playback apparatus described below (a playback apparatus 341 shown in FIG. 35) to perform random access to the optical disc 11 onto the optical disc 11, which is a recording medium loaded therein.

The operation input unit 22 includes input devices, such as buttons, keys, a touch panel, a jog dial, and a mouse, and a receiver for receiving an infrared signal transmitted from a predetermined remote commander. The operation input unit 22 obtains an operation input from a user, and supplies it to the controller 21.

The data obtaining unit 23 obtains AV data, i.e., video data and audio data, from the outside, and supplies it to the AV encoder 24. The AV encoder 24 encodes the supplied video data and audio data using predetermined encoding methods, respectively, and supplies the resulting video ESs (elementary streams) and audio ESs to the buffer 25.

Figure 2:
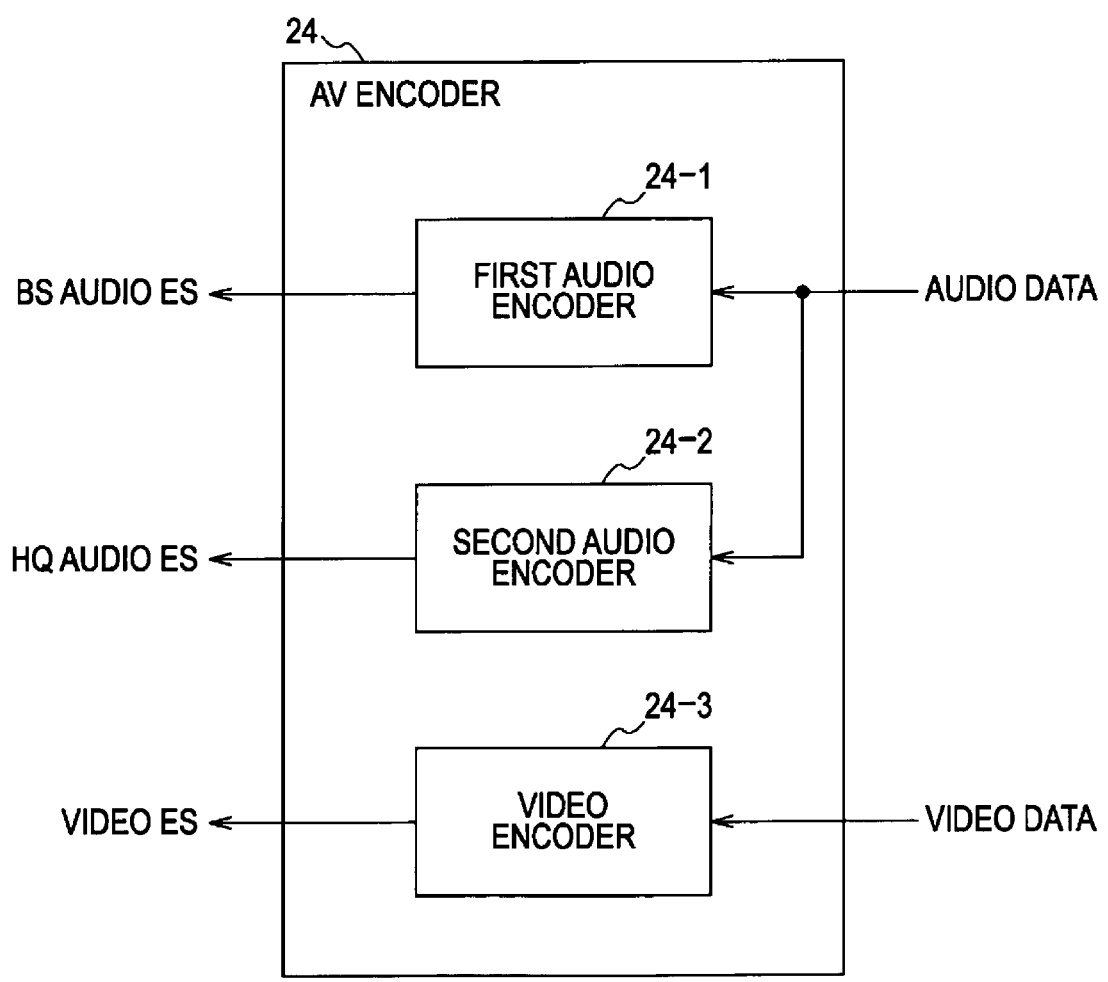
FIG. 2 is a block diagram showing an example structure of an AV encoder shown in FIG. 1.

As shown in FIG. 2, for example, the AV encoder 24 includes a first audio encoder 24-1, a second audio encoder 24-2, and a video encoder 24-3. The first audio encoder 24-1 encodes the audio data using a first encoding method into audio ESs, and outputs the audio ESs. The second audio encoder 24-2 encodes the audio data using a second encoding method into audio ESs, and outputs the audio ESs. The video encoder 24-3 encodes the video data using an encoding technique, such as MPEG (Moving Picture Expert Group) 2, into video ESs, and outputs the video ESs. Therefore, the AV encoder 24 includes audio encoders using two different encoding methods.

The first encoding method is an audio encoding method for encoding audio in the form that enables general-purpose audio decoders to decode the encoded audio (a fixed-length encoding method). The second encoding method is an audio encoding method for encoding audio in the form that enables only high-performance audio decoders to decode the encoded audio (a variable-length encoding method). Specifically, the second encoding method is a VBR (variable bit rate) audio encoding method and is an audio encoding method using a FIFO (first-in first-out) buffer for reducing the peak rate of VBR traffic during decoding. That is, the second encoding method is a variable-length encoding method, and a FIFO buffer is needed from a decoder to decode the audio ES data encoded using this encoding method. The output bit rate of the audio ES data encoded using variable-length encoding is variable. The output bit rate of the audio ES data encoded using fixed-length encoding (the first encoding method), on the other hand, is fixed.

In the following description, a stream of audio signals encoded by the first audio encoder 141 using the first encoding method is referred to as a "BS audio ES (basic audio elementary stream)", and a stream of audio signals encoded by the second audio encoder 142 using the second encoding method is referred to as an "HQ audio ES (high-quality audio elementary stream)". In the following description, a BS audio ES and an HQ audio ES are generally referred to as an "audio ES" unless they need to be distinguished from each other.

Thus, the BS audio ESs encoded by the first audio encoder 24-1, the HQ audio ESs encoded by the second audio encoder 24-2, and the video ESs encoded by the video encoder 24-3 are output from the AV encoder 24, and are supplied to the buffer 25.

Referring back to FIG. 1, the buffer 25 temporarily buffers the encoded data (the BS audio ESs, the HQ audio ESs, and the video ESs), and supplies the data to the PES packetizer 26. The PES packetizer 26 extracts BS audio ES data, HQ audio ES data, and video ES data at a timing based on the control of the controller 21, and packetizes the extracted ES data into PES packets under the control of the controller 21. The PES packetizer 26 stores a PTS (presentation time stamp), which is supplied from the controller 21, in each of the PES packets of the PES data. That is, each of the PES packets output from the PES packetizer 26 (the PES packets corresponding to the BS audio ES data, the PES packets corresponding to the HQ audio ES data, and the PES packets corresponding to the video ES data) includes a PTS. The PES packetizer 26 supplies a PES packet stream (which is a PES packet stream formed of a plurality of PES packets) to the TS packetizer 27.

The TS packetizer 27 packetizes the PES packet stream supplied from the PES packetizer 26 into TS packets (transport stream packets) under the control of the controller 21. Specifically, the TS packetizer 27 packetizes the BS audio PES data, HQ audio PES data, and video PES data supplied from the PES packetizer 26 into TS packets. The TS packets of the BS audio ES data, the TS packets of the HQ audio ES, and the TS packets of the video ES are multiplexed under the control of the controller 21. Constraints on the multiplexing and the PES packetization performed by the PES packetizer 26 are described below. The TS packetizer 27 supplies the multiplexed MPEG2-TS to the recording controller 28 provided downstream to the TS packetizer 27.

The TS packetizer 27, when performing TS packetization (generating TS packets), adds a transport_priority flag for identifying BS audio PES data and HQ audio PES data, and a PID for identifying an audio stream to the header (TS header) of each of the TS packets. The PID stored in the TS header of each of the plurality of TS packets forming the generated BS audio TS and the PID stored in the TS header of each of the plurality of TS packets forming the generated HQ audio TS are the same, and the transport_priority flag stored in the TS header of each of the plurality of TS packets forming the generated BS audio TS and the transport_priority flag stored in the TS header of each of the plurality of TS packets forming the generated HQ audio TS differ.

In a specific example, the TS packetizer 27 adds "PID=a0" and "tp=1 (transport_priority=1)" to the TS header of each of a plurality of BS audio TS packets forming a BS audio TS, and adds "PID=a0" and "tp=0 (transport_priority=0)" to the header of each of a plurality of BS audio TS packets forming an HQ audio TS.

The recording controller 28 records the data (MPEG2-TS) supplied from the TS packetizer 27 or the controller 21 onto the optical disc 11 under the control of the controller 21.

For example, the operation input unit 22 receives an input of a playback section specified in an AV stream from the user, and supplies it to the controller 21. The controller 21 creates a database (clip) of the AV stream, a database of a group (playlist) of playback sections (playitems) of the AV stream, and management information (info.dvr) of the recordings on the optical disc 11. Application database information including such information is input to the recording controller 28 in a similar manner to the AV stream. The recording controller 28 records database files onto the optical disc 11 according to control signals output from the controller 21.

When the user inputs information instructing random access playback to the operation input unit 22, the controller 21 determines a read position at which the AV stream is read from the optical disc 11 based on the contents of the database (clip) of the AV stream, and instructs the recording controller 28 to read the AV stream. For example, when a playlist selected by the user is played back starting from a position corresponding to a specified time, the controller 21 instructs the recording controller 28 to read the data corresponding to the specified time.

The drive 29 is further connected to the controller 21, as needed, and the removable medium 30 is loaded in the drive 29 that is formed of a magnetic disc (including a flexible disc), an optical disc (including a CD-ROM (Compact Disk-Read Only Memory) and a DVD, a magneto-optical disc (including a MD™ (Mini-Disk)), or a semiconductor memory.

It goes without saying that the recording medium on which the content is recorded may be any other medium than the optical disc 11, such as a magnetic disc or a semiconductor memory.

An arrangement for providing random access to a browsable slide show when TSs of audio streams encoded using two different encoding methods (the first encoding method and the second encoding method) are recorded on the optical disc 11 will be described hereinafter.

Figure 3:
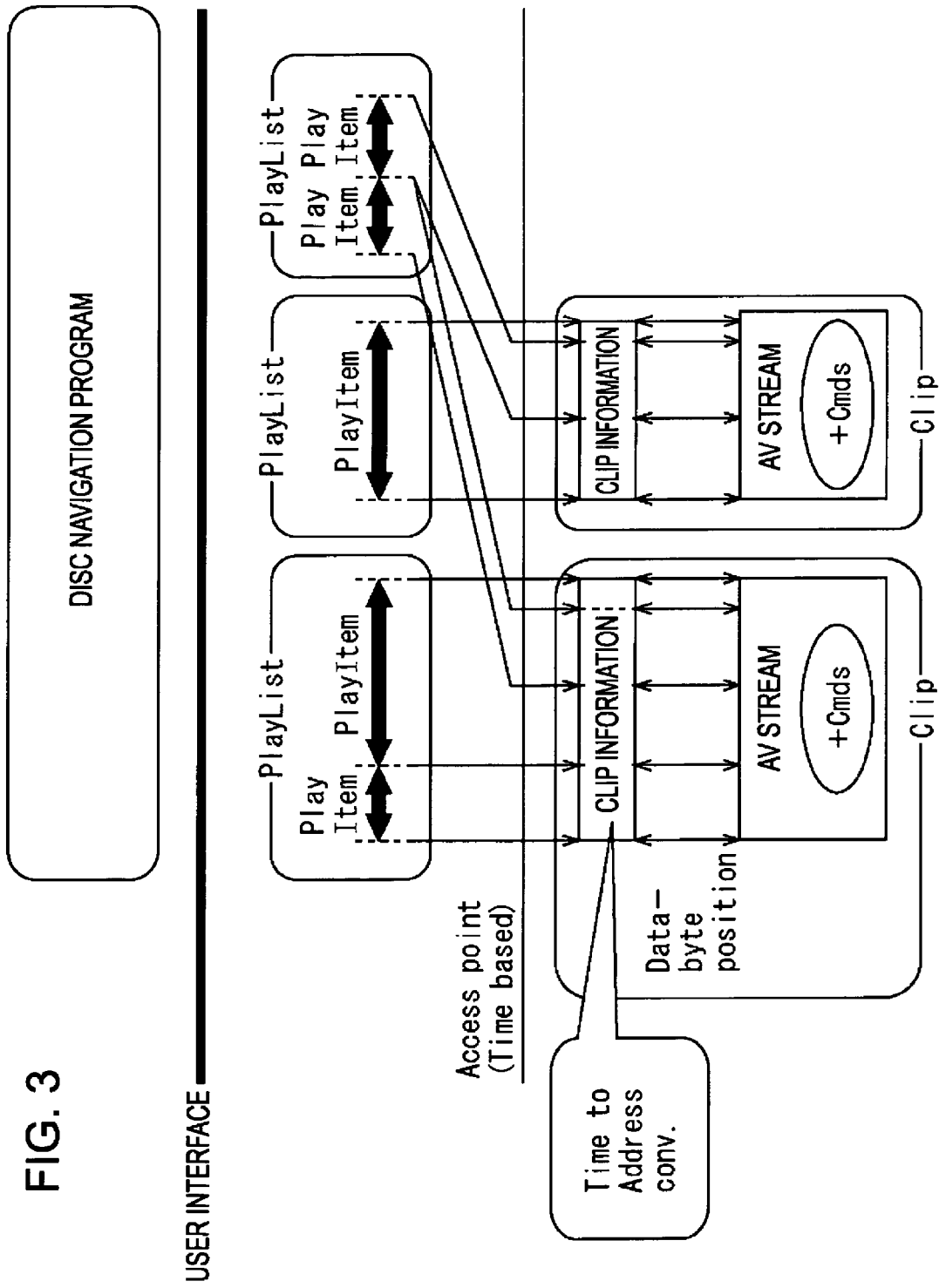
FIG. 3 is a diagram illustrating an example of the application format on an optical disc.

FIG. 3 illustrates an example of the application format on the optical disc 11 loaded in the recording apparatus 1 shown in FIG. 1 or a playback apparatus 341 shown in FIG. 35, described below.

The application format has two layers for managing AV streams, i.e., a playlist layer and a clip layer. The pair of an AV stream and a piece of clip information associated with the AV stream is regarded as one object, which is referred to as a "clip". In the following description, an AV stream is also referred to as an "AV stream file". A piece of clip information is also referred to as a "clip information file".

One AV stream file stores data configured in a structure in which MPEG (Moving Picture Expert Group) 2 transport streams are defined by the application format. Generally, files used in computers are handled as byte strings. On the other hand, content of AV stream files is expanded onto a time axis, and access points in clips are mainly specified by playlists by using time stamps. That is, the playlist and clip layers are layers for managing AV streams.

In a case where access points in clips are indicated by playlists by using time stamps, a clip information file (e.g., EP_map) is used for searching for address information at which decoding in an AV stream file is to be started on the basis of the time stamps.

A playlist is a collection of playback sections of an AV stream. One playback section in an AV stream is called a playitem, and the playitem is represented by a pair of an IN-point (playback start point) and an OUT-point (playback end point) of the playback section on the time axis. As shown in FIG. 3, a playlist has one or a plurality of playitems.

In FIG. 3, the first playlist from the left has two playitems, and the two playitems point to the first half and the second half of the AV stream contained in the left clip. The second playlist from the left has one playitem, and the playitem points to the entirety of the AV stream contained in the right clip. The third playlist from the left has two playitems, and the two playitems point to a portion of the AV stream contained in the left clip and a portion of the AV stream contained in the right clip.

For example, when the user specifies the left playitem included in the first playlist from the left as information concerning the current playback position by using a disc navigation program shown in FIG. 3, the first half of the AV stream included in the left clip, which is pointed to by the specified playitem, is played back. Playlists are therefore used as playback management information for managing the playback of AV stream files.

The disc navigation program has a function of controlling the playback order of playlists and the interactive playback of the playlists. The disc navigation program also has a function of displaying a menu screen for allowing the user to give instructions to perform various types of playback operations. The disc navigation program is described in a programming language, such as Java™, and is prepared on a recording medium.

In this embodiment, a playback path defined by an array of one or more playitems (sequential playitems) in a playlist is referred to as a "main path", and a playback path defined by array of one or more sub paths (sequential or non-sequential subplayitems) in parallel with the main path in a playlist is referred to as a "sub path". Thus, the application format on the recording medium loaded in the recording apparatus 1 or a playback apparatus (the playback apparatus 341 described below with reference to FIG. 35) has a sub path, which is played back in association with (or in synchronization with) a main path, in a playlist.

A clip information file (clip information shown in FIG. 3) will be described. The recording apparatus 1 according to the present embodiment recodes one clip AV stream and a clip information file corresponding to the clip AV stream onto the optical disc 11 as separate files. The clip information file has CPI (Characteristic Point Information) and ClipMark.

CPI is data included in a clip information file, and is used, mainly when time stamps of access points to clips are assigned, to search for a data address at which reading of data is to be started in a clip AV stream file. In this embodiment, CPI as a kind of EP_map is used.

Figure 4:
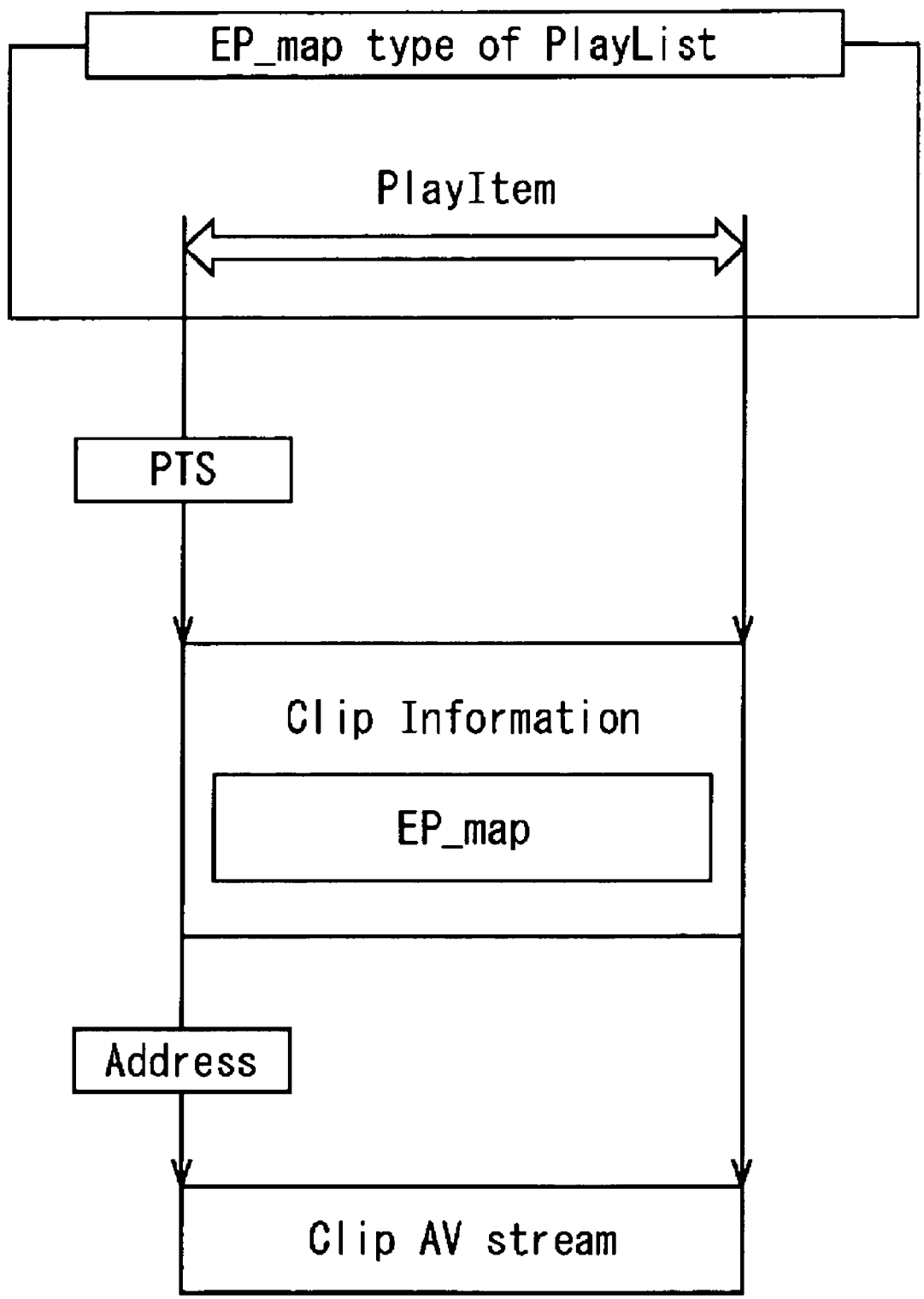
FIG. 4 is a diagram illustrating the relationship between EP_map and a clip AV stream.

FIG. 4 illustrates the relationship between EP_map and a clip AV stream.

EP_map is a list of entry point (EP) data and is extracted from elementary streams and transport streams. The EP_map has address information for searching for the position of an entry point at which decoding is to be started in an AV stream. A piece of EP data has a pair of a presentation time stamp (PTS) and a data address, in the AV stream, of the access unit corresponding to the PTS.

The EP_map is used mainly for two purposes. First, it is used to search in the AV stream for the data address of the access unit pointed to by the presentation time stamp in the playlist. Random access playback is included in this case. Second, the EP_map is used for fast forward playback or fast reverse playback. In a case where the recording apparatus 1 records an AV stream (the process shown in FIG. 33, described below) or the syntax of the AV stream can be analyzed (the process shown in FIG. 32, described below), EP_map is generated and recorded onto a disc.

As illustrated in FIG. 4, when an access point in a clip is specified by using a presentation time stamp (PTS), EP_map is used to search for address information at which decoding of the stream is to be started in the clip AV stream file. EP_map is therefore a table including addresses corresponding to the IN-points and the OUT-points on the time axis represented by a playlist, as described above, and is used to convert presentation time stamps (PTSs) of a playlist or the like into the corresponding addresses. That is, EP_map is a table in which presentation time stamps (PTSs) are associated with source packet numbers in a clip AV stream (TS (transport stream) packet numbers in a transport stream).

With the use of EP_map, appropriate data is selected and read from a clip AV stream. The EP_map is also used for random access. For example, when the user operates the operation input unit 22 to specify an access point in a clip by using a time stamp (PTS), the controller 21 refers to the EP_map to obtain address information at which decoding of the stream is to be started in the clip AV stream file, and controls the recording controller 28 to perform random access according to the address information. There are two types of EP_map, i.e., EP_map for video and EP_map for audio.

Figure 5:
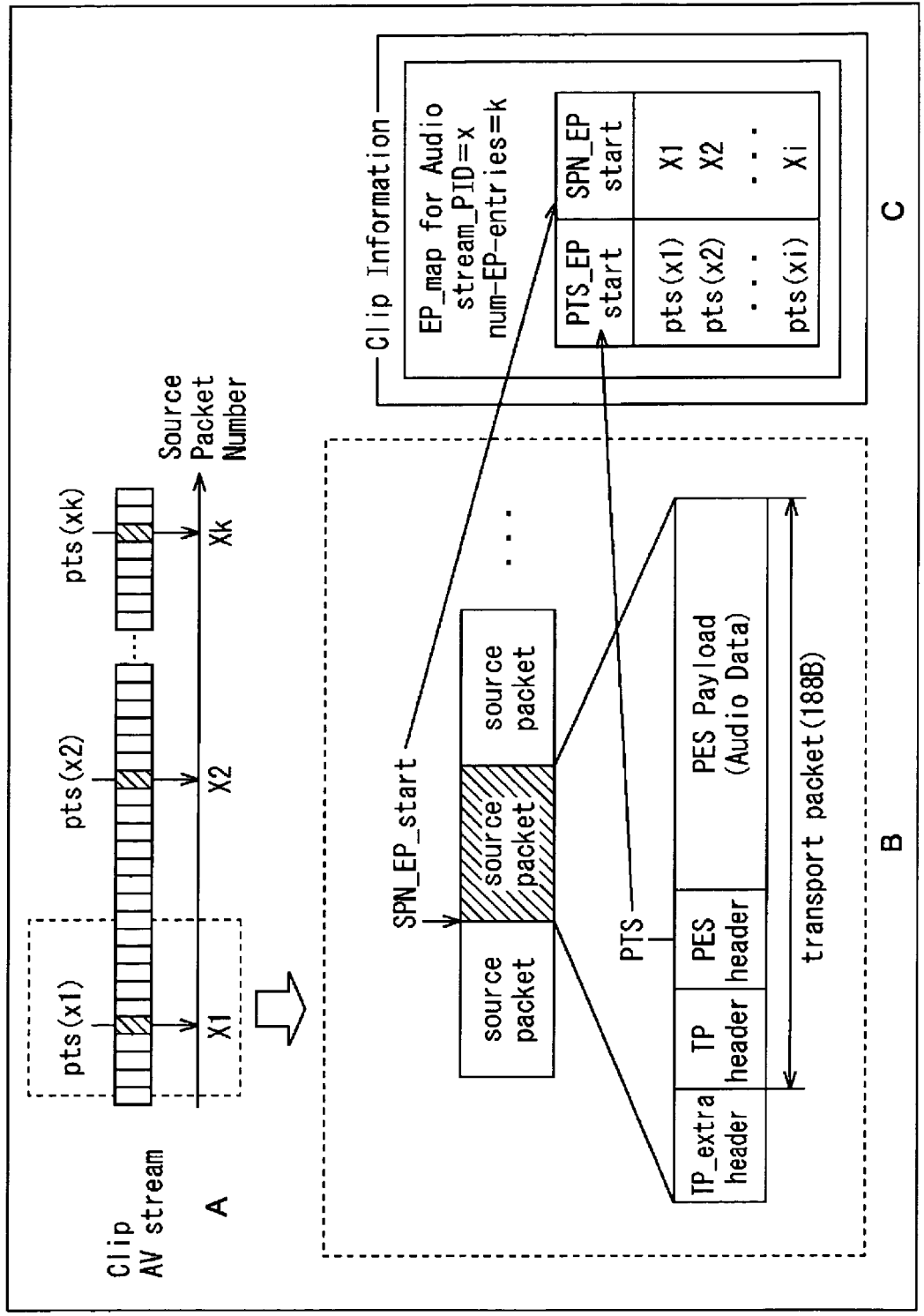
FIG. 5 is a diagram illustrating the structure of EP_map for audio.

FIG. 5 is a diagram showing a structure of EP_map for audio. Specifically, the part A of FIG. 5 is a diagram showing the positions of presentation time stamps (PTSs) in a clip AV stream; the part B of FIG. 5 is a diagram showing a portion of the clip AV stream shown in the part A of FIG. 5 in an enlarged fashion; and the part C of FIG. 5 is a diagram showing a data structure of EP_map for audio.

As shown in the part C of FIG. 5, EP_map for audio is a table including presentation time stamps (PTSs) (PTS_EP_start) of the clip AV stream and information (SPN_EP_start) indicating the corresponding source packet numbers (numbers of TS packets) associated with the PTSs.

Addresses are represented using source packet numbers (SPNs). The source packet numbers (SPNs) are serial numbers assigned to all source packets in a clip AV stream. In a clip AV stream, the first source packet is assigned source packet number SPN=0 (zero), the second source packet is assigned source packet number SPN=1, and the subsequent packets are assigned source packet numbers SPN, incrementing by one. Thus, the EP_map for audio has the source packet numbers (SPNs) as SPN_EP_start.

A clip information file will be described. FIG. 6 is a diagram showing the syntax of a clip information file.

As shown in FIG. 6, a zzzzz.clpi file (clip information file) has five objects. They are ClipInfo( ), SequenceInfo( ), ProgramInfo( ), CPI( ), and ClipMark( ). An AV stream (clip AV stream) and a clip information file corresponding to the AV stream are assigned the same number string, i.e., "zzzzz".

The syntax of the zzzzz.clip file (clip information file) shown in FIG. 6 will be described. type_indicator indicates the type of the file, and version_number indicates the version of the file. SequenceInfo_start_address indicates the start address of SequenceInfo( ) in units of relative byte numbers from the start byte of the zzzzz.clpi file of SequenceInfo. The relative byte numbers are counted from zero. ProgramInfo_start_address indicates the start address of ProgramInfo( ) in units of relative byte numbers from the start byte of the zzzzz.clpi file of ProgramInfo. The relative byte numbers are counted from zero.

CPI_Start_address indicates the start address of CPI( ) in units of relative byte numbers from the start byte of the zzzzz.clpi file. ClipMark_Start_address indicates the start address of ClipMark( ) in units of relative byte numbers from the start byte of the zzzzz.clpi file. The relative byte numbers are counted from zero. padding_word (padding words) is inserted according to the syntax of the zzzzz.clpi file. Each of N1, N2, N3, N4, and N5 should be zero or a positive integer. Each of the padding words may have an arbitrary value.

Figure 7:
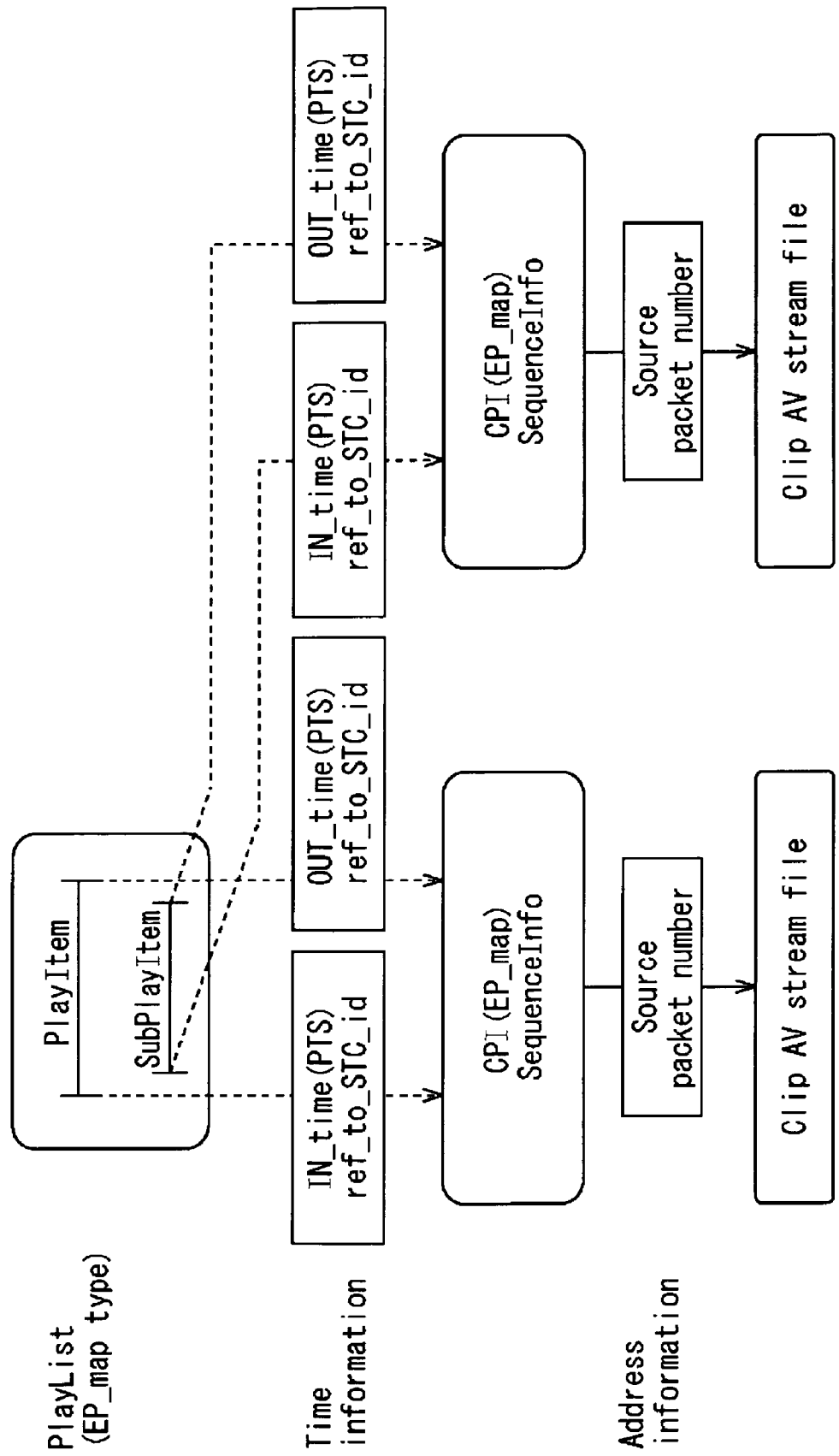
FIG. 7 is a diagram illustrating CPI.

The CPI (characteristic point information) in the syntax of the zzzzz.clip shown in FIG. 6 will be described with reference to FIG. 7. CPI is used to associate time information in an AV stream with an address in the file. When CPI_type in CPI( ) is EP_map type, as shown in FIG. 7, the CPI( ) includes EP_map. The syntax of CPI is described below with reference to FIG. 12.

In FIG. 7, a playlist includes one playitem and one subplayitem. Thus, the playlist has the entries of a playback path (main path) generated by the playitem and a playback path (sub path) generated by the subplayitem. A playlist has one main path and one or more sub paths, and one sub path is generated by array of one or more subplayitems.

The structure of the main path and the sub path will be described with reference to FIG. 8.

Figure 8:
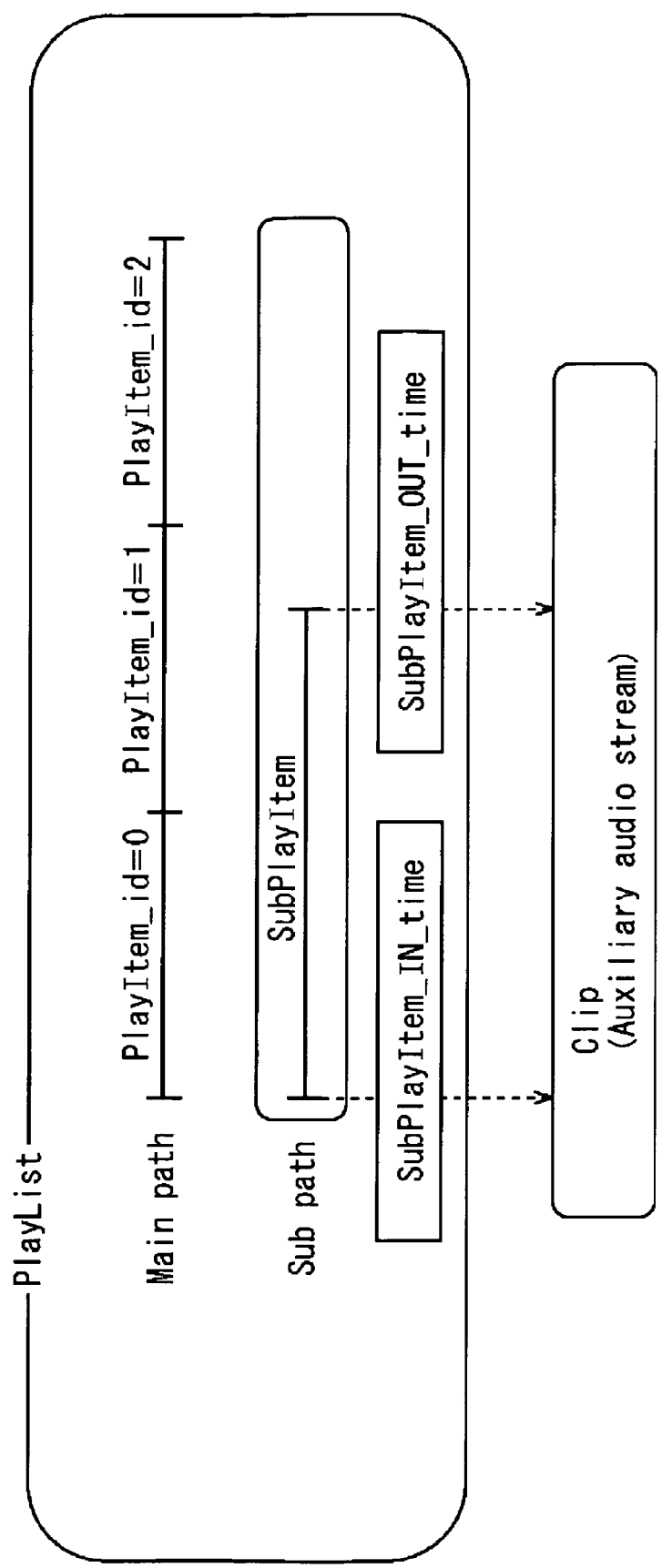
FIG. 8 is a diagram illustrating a structure of a main path and a sub path.

In FIG. 8, the main path indicates audio playback paths to be played back at different timings by using the sub paths. A main AV stream file referred to by a playitem in the main path corresponds to, for example, the clip AV stream file referred to by the playitem illustrated in FIG. 7 described above (the main AV stream file is omitted in FIG. 8).

For example, this structure is used when the main path points to a slide show of still images and the audio path of the sub path points to background music (BGM) for the main path, that is, when a browsable slide show is played back. In other words, it is used for playback of the slide show without interrupting BGM when a user instructs a playback apparatus (player) to update slides in the slide show.

In browsable slide shows, still images are played back in predetermined order, and the playback duration of each slide is limited or unlimited. If a slide whose playback duration is unlimited is contained, a next slide is not played back until the user instructs the playback apparatus to proceed to the next slide. Therefore, the slides are not played back at predetermined time on the time axis. In browsable slide shows, further, audio to be played back at the same time as the playback of still images is referred to by the audio path of the sub path, and the playback of audio is not synchronous with the playback of the still images. Therefore, the audio and the still images are played back asynchronously.

In FIG. 8, the playlist has one main path generated by an array of three playitems, and one sub path. The playitems forming the main path are assigned ID (identification) in order from the top. That is, the main path has the playitems with PlayItem_id=0, PlayItem_id=1, and PlayItem_id=2.

The sub path includes SubPlayItem_IN_time and SubPlayItem_OUT_time for designating the playback section of the sub path in a clip (auxiliary audio stream). In the example shown in FIG. 8, the clip (auxiliary audio stream) is referred to by the subplayitem. There is no relationship between the timing of (video data of) the AV stream referred to by the main path and the playback timing of audio, and there is no need to specify a time on the time axis of the main path at which the playback of the sub path is to be started. In FIG. 8, therefore, the subplayitem does not include sync_PlayItem_id and sync_start_PTS_of_PlayItem. That is, only information indicating that the AV stream referred to by the main path and the audio stream referred to by the sub path are played back together is stored in the subplayitem.

It is described that "the playback timing of the data of the video stream included in the AV stream and the playback timing of the data of the audio stream referred to by the sub path differ". More specifically, the playback of the video stream included in the AV stream and the playback of the video stream are matched in time (that is, the audio stream is associated with the video stream); however, detailed association is not provided in which sound is played back during the playback of a predetermined frame in the video stream. That is, detailed association is not provided in which the playback of the video stream with and the playback of the audio stream are matched in time and, in addition, associated sound is played back during the playback of a predetermined frame in the video stream. Such detailed association is not provided although the playback of the video stream and the playback of the audio stream are matched in time, and the playback timings differ.

The data structure (syntax) for specifically implementing the structure of the main path and sub path illustrated with reference to FIG. 8 will be described.

FIG. 9 illustrates the syntax of PlayList( ).

length is an unsigned integer of 32 bits indicating the number of bytes from immediately after this length field to the end of PlayList( ), that is, a field indicating the number of bytes from reserved_for_future_use to the last byte of the playlist. reserved_for_future_use of 16 bits is prepared after the length field. number_of_PlayItems is a 16-bit field indicating the number of playitems included in the playlist. For example, in the example shown in FIG. 8, the number of playitems is three. The values of PlayItem_id are assigned in order from 0 in which PlayItem( ) appears in the playList. For example, as shown in FIG. 8, PlayItem_id=0, PlayItem_id=1, and PlayItem_id=2 are assigned.

number_of_SubPaths is a 16-bit field indicating the number of sub paths (the number of entries) included in the playlist. For example, in the example shown in FIG. 8, the number of sub paths is one. The values of SubPath_id are assigned in order from 0 in which SubPath( ) appears in the playlist. For example, Subpath_id=0, Subpath_id=1, Subpath_id=and 2 are assigned. In the subsequent "for" statement, the playitems are referred to the number of times corresponding to the number of playitems, and the sub paths are referred to the number of times corresponding to the number of sub paths.

FIG. 10 illustrates the syntax of SubPath( ).

length is an unsigned integer of 32 bits indicating the number of bytes from immediately after this length field to the end of SubPath( ), that is, a field indicating the number of bytes from reserved_for_future_use to the last byte of the playlist. reserved_for_future_use of 16 bits is prepared after the length field. SubPath_type is an 8-bit field indicating the application type of the sub path. SubPath_type is used to indicate the type, such as a sub path for audio, bitmap subtitle, or text subtitle. An example of SubPath_type is described below with reference to FIG. 11. reserved_for_future_use of 15 bits is prepared after the SubPath_type field. is_repeat_SubPath is a 1-bit field indicating the method by which the sub path is played back, more specifically, indicating whether the sub path is played back repeatedly during the playback of the main path or the sub path is played back only once. For example, this field is used when the playback timings of the main AV stream and the clip designated by the sub path differ (when a browsable slide show is played back, such as when the main path points to a slide show of still images and the audio path of the sub path points to BGM (background music) for the main path). reserved_for_future_use of 8 bits is prepared after the is_repeat_SubPath field. number_of_SubPlayItems is an 8-bit field indicating the number of subplayitems (the number of entries) included in one sub path. For example, with respect to number_of_SubPlayItems, the number of subplayitems shown in FIG. 8 is one. In the subsequent "for" statement, the subplayitems are referred to the number of times corresponding to the number of subplayitems.

FIG. 11 is a diagram showing an example of SubPath_type (the type of sub path). For example, the type of SubPath is defined as shown in FIG. 11.

In FIG. 11, SubPath_type=0 and SubPath_type=1 are defined as "reserved". SubPath_type=2 is defined as an "audio presentation path of the browsable slideshow". For example, SubPath_type=2 indicates that, in a playlist, an audio presentation path referred to by the sub path and the main path referred to by using playitems are asynchronous. The type of the sub path shown in FIG. 8 is indicated by SubPath_type=2.

SubPath_type=3 is defined as an "interactive graphics presentation menu". For example, SubPath_type=3 indicates that, in a playlist, an interactive graphics menu referred to by the sub path and the main path referred to by using playitems are asynchronous.

SubPath_type=4 is defined as a "text subtitle presentation path". For example, SubPath_type=4 indicates that, in a playlist, a text subtitle presentation path referred to by the sub path and the main path referred to by using playitems are synchronous.

SubPath_type=5 is defined as a "2nd audio presentation path (which is a path for referring to the second audio stream)". Specifically, SubPath_type=5 indicates that, in a playlist, the second audio presentation path referred to by the sub path and the main path referred to by using playitems are synchronous. The (second) audio stream referred to by the sub path is, for example, an audio stream of director's commentaries (sound) on a movie.

SubPath_type=6 is defined as a "2nd video presentation path (which is a path for referring to the second video stream)". Specifically, SubPath_type=6 indicates that, in a playlist, the second video presentation path referred to by the sub path and the main path referred to by using playitems are synchronous. The (second) video stream referred to by the sub path is, for example, a video stream of director's commentaries (moving pictures) on a movie.

SubPath_type=7 to SubPath_type=255 are defined as "reserved".

FIG. 12 is a diagram showing the syntax of CPI. The syntax of CPI shown in FIG. 12 will be described. length is an unsigned integer of 32 bits indicating the number of bytes of CPI( ) from immediately after this length field to the end of CPI( ). CPI_type is a flag of 4 bits indicating the type of CPI in the clip, as shown in FIG. 13.

The EP_map in the syntax of CPI shown in FIG. 12 will be described. There are two types of EP_map, i.e., EP_map for video streams and EP_map for audio streams. In the EP_map, EP_map_type identifies the type of EP_map. When a clip includes one or more video streams, EP_map for video streams is used; when a clip includes no video streams and includes one or more audio streams, EP_map for audio streams is used. For example, when a browsable slide show is played back, EP_map for audio streams is used.

EP_map for an audio stream has stream_PID, PTS_EP_start, and SPN_EP start data. stream_PID indicates the PID of the transport packet carrying the audio stream. PTS_EP_start indicates a PTS of an access unit in the audio stream. SPN_EP start indicates the address of a source packet including the first byte of the access unit referred to by PTS_EP-start in the AV stream. More specifically, PTS_EP_start indicates a 33-bit accuracy PTS of an access unit in the audio stream, and SPN_EP_start indicates the relative address of a source packet including the first byte in the audio frame of the access unit referred to by PTS_EP_start in the AV stream. SPN_EP_start, with the size in units of source packet numbers, is counted from the first source packet of the AV stream file.

A sub table called EP_map_for_one_stream_PID( ) is created for each of the audio streams transmitted by the transport packets having the same PID. If a plurality of audio streams are contained in a clip, EP_map may include a plurality of EP_map for_one_stream_PID( ) entries.

Figure 14:
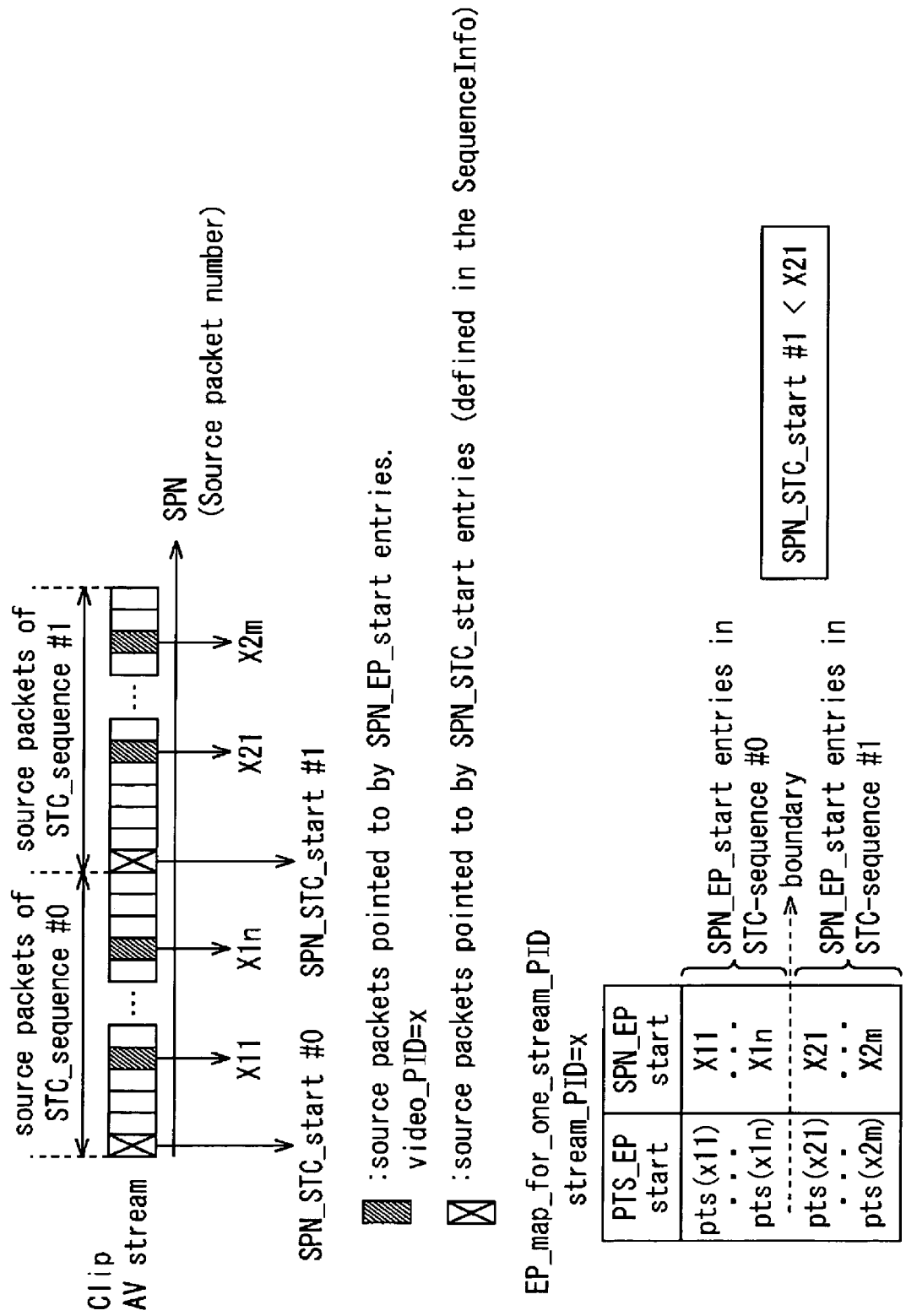
FIG. 14 is a diagram illustrating EP_map.

The relationship between EP_map and SequenceInfo will be described. One EP_map_for_one_stream_PID( ) entry is created in one table irrespective of STC discontinuity points. As shown in FIG. 14, the values of SPN_EP_start and the values of SPN_STC_start defined in SequenceInfo( ) are compared to determine the EP_map data boundaries of STC sequences (STC_sequence). EP_map should have one EP_map_for_one_stream_PID entry for a range of sequential streams transmitted with the same PID.

EP_map_for_one_stream_PID( ) will be described.

Figure 15:
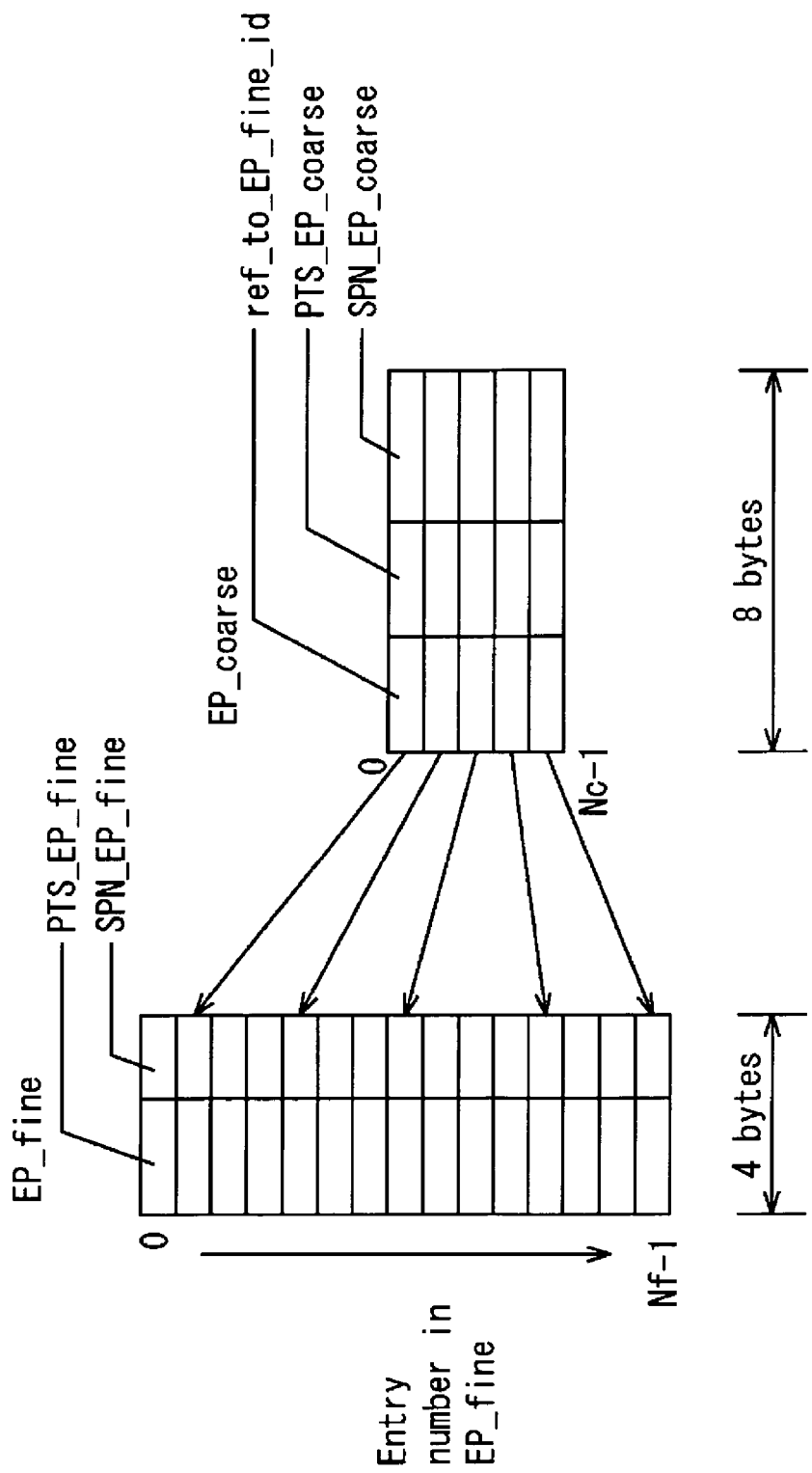
FIG. 15 is a diagram illustrating the relationship between EP_fine and EP_coarse.

In this embodiment, an EP_map_for_one_stream_PID( ) table is divided into two sub tables, i.e., EP_coarse and EP_fine (see FIG. 15), to reduce the data size of the EP_map_for_one_stream_PID( ) table and to improve the data search performance.

Figure 16:
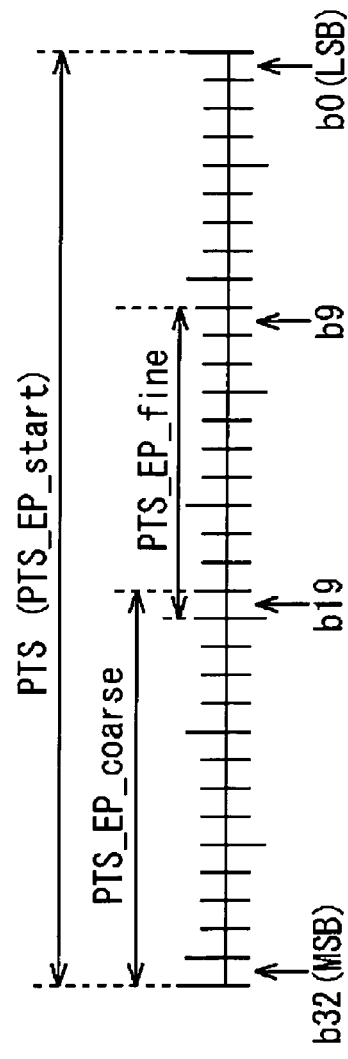
FIG. 16 is a diagram illustrating the format of PTS_EP_fine and PTS_EP_coarse.

EP_fine entries and EP_coarse entries are generated from the same PTS_EP_start and SPN_EP_start. The EP_fine entries have bit information near the LSB (Least Significant Bit) of PTS_EP_start and SPN_EP_start (see FIGS. 16 and 17). The EP_coarse entries have bit information near the MSB (Most Significant Bit) of PTS_EP_start and SPN_EP start, and entry numbers in the EP_fine table associated with the bit information (the entries in the EP_fine table having bits in the LSB generated from the same PTS_EP_start).

Figure 17:
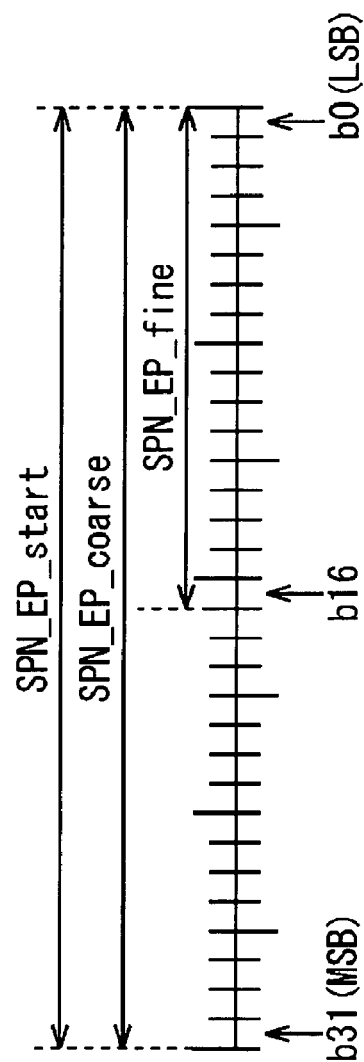
FIG. 17 is a diagram illustrating the format of SPN_EP_fine and SPN_EP_coarse.

As shown in FIG. 17, the 9th to 19th bits are used for PTS_EP_fine, and the 19th to 32nd bits are used for PTS_EP_coarse.

Figure 18:
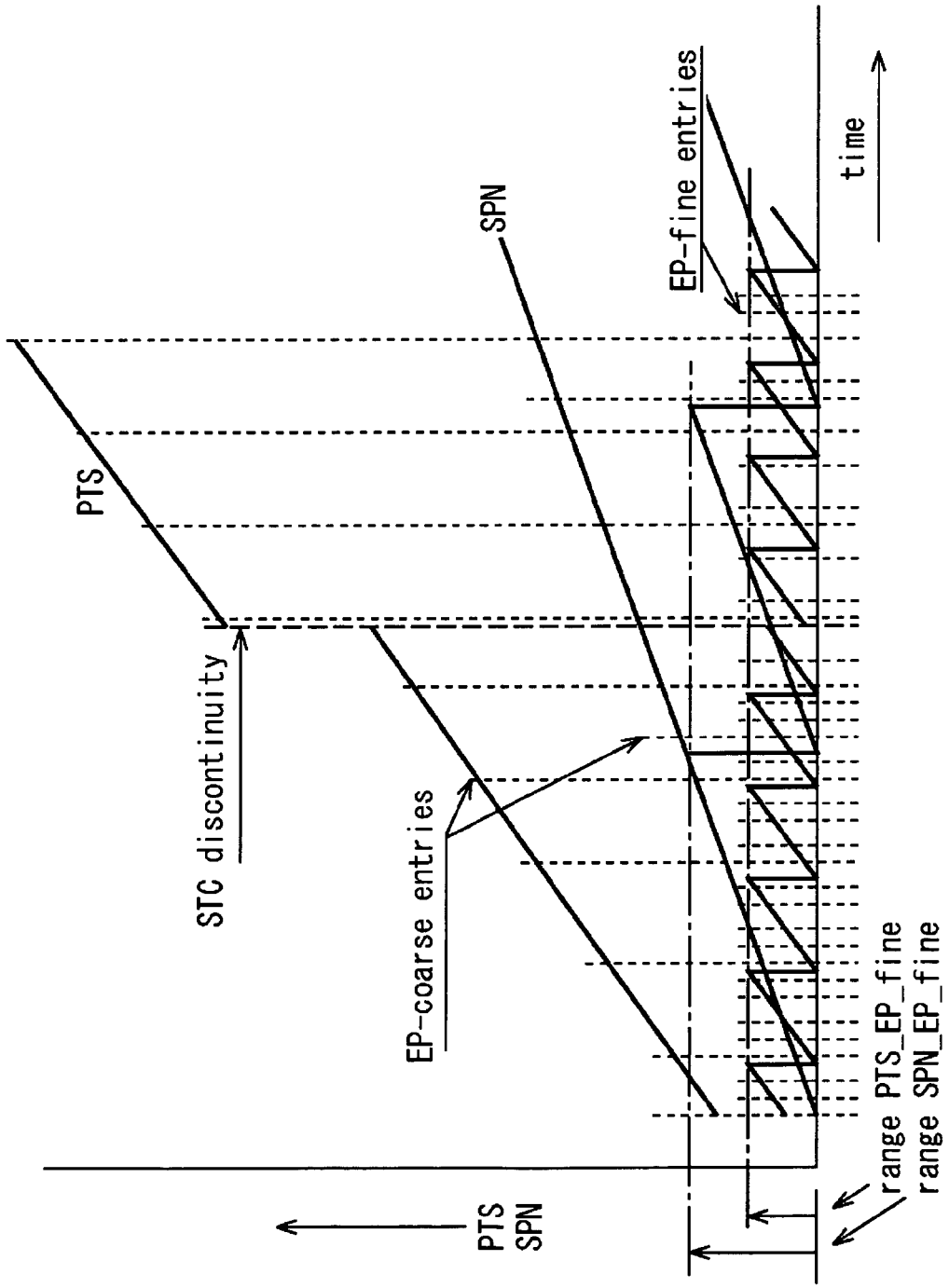
FIG. 18 is a diagram illustrating EP-coarse entries and EP-fine entries.

The number of entries in the EP_coarse sub table is smaller than the number of entries in the EP_fine sub table. EP_coarse entries are generated in the following cases:

an entry for the first PTS_EP_fine; an entry for the first PTS_EP_fine after the PTS_EP_fine value wraps around; and an entry for the first RSPN_EP_fine after the RSPN_EP_fine value wraps around (see FIG. 18)

An example of random access to an AV stream with the use of EP_map will be described.

It is assumed that playback of a playlist is to be started 30 minutes later on a global time axis of the playlist.

First, an STC-sequence-id of a playitem including the time of 30 minutes later on the global time axis in the playlist is searched for.

The value of a PTS corresponding to the time of 30 minutes later on a local time axis of the STC-sequence is derived.

SPN_STC_start of the STC-sequence is derived from the SequenceInfo.

Data search is started from an entry in the EP_coarse sub table whose SPN_EP_coarse is equal to or larger than the derived SPN_STC_start. An entry in the EP_coarse sub table whose PTS_EP_coarse is the closest to and temporally previous to the desired PTS is searched for.

Data search is performed in the EP_fine sub table, starting from the entry number whose EP_fine corresponds to the PTS_EP_coarse of the searched entry. An entry whose PTS_EP_fine value is the closest to and temporally previous to the desired PTS is searched for.

SPN_EP_start for starting the reading of the access unit having the desired PTS is determined by replacing 18 bits in the LSB of SPN_EP_coarse corresponding to the PTS_EP_coarse of the searched entry with the bits of RSPN_EP_fine corresponding to the PTS_EP_fine of the searched entry.

With the use of PTS_EP_fine and PTS_EP_coarse, random access is provided while reducing the data size of the EP_map_for_one_stream_PID( ) table and improving the data search performance.

The syntax of the EP_map described above is shown in FIG. 19.

number_of_stream_PID_entries indicates the number of EP_map_for_one_stream_PID entries in the EP_map.

stream_PID[k] indicates the value of the PID of the transport packet carrying the elementary stream referred to by the k-th EP_map_for_one_stream_PID entry in the EP_map.

EP_stream_type[k] indicates the type of the elementary stream referred to by that EP_map_for_one_stream_PID entry. The meaning of the values is given in a table shown in FIG. 20.

In FIG. 20, when EP_stream_type[k] is set to 1, the elementary stream is a video stream.

When EP_stream_type[k] is set to 3, the elementary stream is an audio stream.

Referring back to FIG. 19, number_of_EP_coarse_entries [k] indicates the number of EP-coarse entries in that EP_map_for_one_stream_PID entry.

number_of_EP_fine_entries[k] indicates the number of EP-fine entries in that EP_map_for_one_stream_PID entry.

EP_map_for_one_stream_PID_start_address[k] indicates the relative byte position at which that EP_map_for_one_stream_PID entry begins in the EP_map( ). This value is represented by the byte number from the first byte of the EP_map( ).

The syntax of EP_map_for_one_stream_PID is shown in FIG. 21. For illustration of the semantics of the syntax, the meaning of PTS_EP_start and SPN_EP_start, which are the sources of the data stored in EP_map_for_one_stream_PID, will be described.

PTS_EP_start and SPN_EP_start associated therewith designate an entry point on an AV stream. PTS_EP_fine and PTS_EP_coarse associated therewith are derived from the same PTS_EP_start. SPN_EP_fine and SPN_EP_coarse associated therewith are derived from the same SPN_EP_start. The definition of PTS_EP start and SPN_EP start is as follows:

PTS_EP_start is an unsigned integer of 33-bit length. The definition of PTS_EP_start depends on the value of EP_stream_type with respect to EP_map_for_one_stream_PID.

When EP_stream_type is set to 1 ('video type 1'), PTS_EP_start represents a PTS of 33-bit length of the video access unit that begins at the sequence header in the AV stream.

When EP_stream_type is set to 3 ('audio'), PTS_EP_start represents a PTS of 33-bit length of the video access unit that begins at the sequence header in the AV stream.

SPN_EP_start is an unsigned integer of 32 bits. The definition of SPN_EP_start depends on the value of EP_stream_type with respect to EP_map_for_one_stream_PID.

When EP_stream_type is set to 1 ('video type 1'), this field indicates the address in the AV stream of a source packet including the first byte of the video access unit associated with PTS_EP_start.

When EP_stream_type is set to 3 ('audio'), this field indicates the address in the AV stream of a source packet including the first byte of the audio PES packet including the PTS referred to by PTS_EP start associated with PTS_EP_start.

SPN_EP_start is represented in units of source packet numbers, and is counted from the initial value, which is zero, starting from the first source packet in the AV stream file.

The semantics of EP_map_for_one_stream_PID will be described.

EP_fine_table_start_address indicates the start address of the initial is_angle_change_point, and is represented by a relative byte number from the first byte of EP_map_for_one_stream_PID( ). The relative byte numbers start with zero.

ref_to_EP_fine_id indicates the number of the EP_fine entry having the PTS_EP_fine associated with the PTS_EP_coarse subsequent to this field. PTS_EP_fine and PTS_EP_coarse associated therewith are derived from the same PTS_EP_start.

ref_to_EP_fine_id is given by the value of EP_fine_id defined in the order stated in the for-loop of EP_fine_id.

PTS_EP_coarse, PTS_EP_fine, SPN_EP_coarse, and SPN_EP_fine are derived in the following manner.

It is assumed that the EP_fine sub table has Nf entries and that those entries are arranged in ascending order of the SPN_EP_start values associated with the entries.

Each of the PTS_EP_fine entries is derived from the corresponding PTS_EP_start in the following manner.

PTS_EP_fine[EP_fine_id]=(PTS_EP_start[EP_fine_id]>>9) % 211$

The relationship between PTS_EP_coarse and PTS_EP_fine associated therewith is as follows.

PTS_EP_coarse[i]=(PTS_EP_start[ref_to_EP_fine_id[i]]>>19) % 214 TS_EP_fine[ref_to_EP_fine_id[i]]=(PTS_EP_start[ref_to_EP_fine_id[i]]>>9) % 211$ Each of the SPN_EP_fine entries is derived from the corresponding SPN_EP_start in the following manner.

SPN_EP_fine[EP_fine_id]=SPN_EP_start[EP_fine_id] % 217$

The relationship between SPN_EP_coarse and SPN_EP_fine associated therewith is as follows.

SPN_EP_coarse[i]=SPN_EP_start[ref_to_EP_fine_id[i]] SPN_EP_fine[ref_to_EP_fine_id[i]]=SPN_EP_start[ref_to_EP_fine_id[i]] % 217$ EP_map_for_one_stream_PID( ) satisfies the following restrictions:

In EP_map_for_one_stream_PID( ), SPN_EP_coarse entries should be arranged in ascending order of the SPN_EP_coarse values.

In EP_map_for_one_stream_PID( ), SPN_EP_fine entries should be arranged in ascending order of the SPN_EP_start values associated therewith.

PTS_EP_coarse and SPN_EP_coarse entries are generated in the following cases: •• an entry for the first PTS_EP_fine; •• an entry for the first PTS_EP_fine after the PTS_EP_fine value wraps around; and •• an entry for the first SPN_EP_fine after the SPN_EP_fine value wraps around.

A constraint of EP_stream_type will be described with reference to FIG. 22.

When EP_stream_type is set to 1, i.e., video type 1, I_end_position_offset (which is a value indicating the end of an I-picture) is provided, and the value ranges from $001_b$ to $111_b$. Only the position having the sequence header and an I-picture (for MPEG-2 video streams) and the position having an I-picture or an IDR picture (for MPEG-4 AVC video streams) are set as entry points referred to by SPN_EP_start.

When EP_stream_type is set to 3, i.e., audio, I_end_position_offset (which is a value indicating the end of an I-picture) is not provided, and the value is set to $000_b$. Only audio PES packets are set as entry points referred to by SPN_EP_start.

ClipInfo( ) will be described with reference to FIG. 23. FIG. 23 shows the syntax of the ClipInfo( ) included in the clip information file shown in FIG. 6. The ClipInfo( ) stores attribute information of the corresponding AV stream file (clip AV stream).

As shown in FIG. 23, the ClipInfo( ) includes Clip_stream_type and application_type fields. The 8-bit Clip_stream_type field indicates the type of the AV stream corresponding to the clip information file. application_type indicates the type of application held in the clip AV stream. application_type will be described with reference to FIG. 24.

In FIG. 24, application_type=1 indicates a TS (transport stream) for a movie application. Application_type=2 indicates a TS for a slide show of still images, which is a TS for an application in which still images are changed along the playback time axis (also referred to as a "time based slide show"). Application_type=3 indicates a TS for a slide show of still images, which is a TS including still images of an application in which the still images are changed in accordance with a user's operation (also referred to as a "browsable slide show"). Application_type=4 indicates a sub TS including audio for a browsable slide show. Description of "TS for a sub-path of Browsable slide show" shown in FIG. 24 designates a value for specifying not only audio for a browsable slide show but also a clip AV stream having a TS including audio packets. Application_type=5 indicates a TS for a sub path referring to an interactive graphics menu. Application_type=6 indicates a TS for a sub path referring to a text subtitle (text subtitle data).

When application_type is set to any of 1, 2, 3, and 4, EP_map exists. In a case of a time based slide show and a browsable slide show, EP_map indicates still images in the slide show. When application_type is set to 5 or 6, EP_map does not exist. When application_type is set to any of 1, 2, and 3, the TS stored in the clip AV stream includes video or still images, and the EP_map is EP_map for video. When application_type is set to 4, the TS stored in the clip AV stream includes audio, and the EP_map is EP_map for audio.

Accordingly, EP_map for video streams is generated for application_type=1, application_type=2, or application_type=3, and EP_map for audio streams is generated for application_type=4.

There is a constraint on the generation of EP_map for application_type=1 or application_type=4. That is, the interval between two PTS_EP_fine entries in EP_map should be one second or less.

It is determined whether or not EP_map is generated depending on application_type in ClipInfo( ), which is specified by the application included in the clip AV Stream in the clip information file (see FIG. 6). If EP_map is generated, EP_stream_type, i.e., video or audio, is also determined depending on application_type.

An example of EP_map in a case where the application_type in the clip information file shown in FIG. 24 is set to 4, that is, in a case where an audio stream is contained in the corresponding clip AV stream file and the EP_stream_type is set to 3, will be described with reference to FIG. 25. As illustrated with reference to FIG. 24, an AV stream with application_type=4 designates a TS referred to by a sub path pointing to a browsable slide show, i.e., an audio stream for BGM (background music) during the browsable slide show (this is also used to designate a TS including only audio, as discussed above.)

Figure 25:
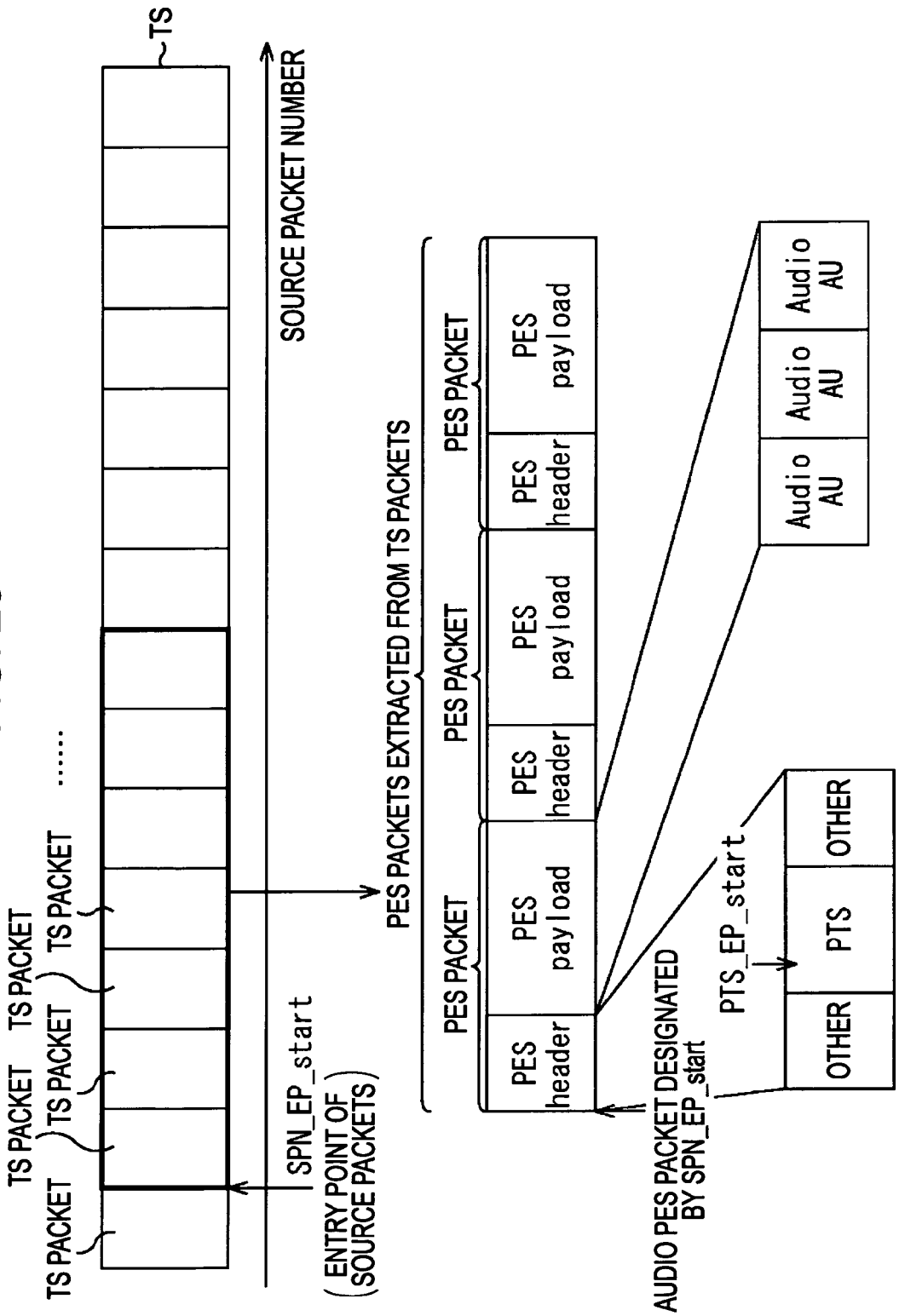
FIG. 25 is a diagram illustrating EP_map when the application_type is set to 4 and a TS is composed of only a BS audio ES.

In FIG. 25, a clip AV stream has TS packets of audio streams. The audio streams are encoded by a single audio encoder, and are encoded into a TS (transport stream) by using MPEG2. The TS is composed of a plurality of TS packets of a predetermined size (e.g., 188 bytes).

SPN_EP_start is information representing an entry point of source packets (TS packets). In FIG. 25, the position of a TS packet designated by an arrow of SPN_EP_start is designated by the SPN_EP_start. The SPN_EP_start corresponds to the SPN_EP_start in the EP_map_for_one_stream_PID( ) shown in FIG. 14.

The plurality of TS packets stored in the clip AV stream file include a plurality of PES (packetized elementary stream) packets. As illustrated in FIG. 25, PES packets (in the example shown in FIG. 25, three PES packets) can be extracted from the plurality of TS packets (in the example shown in FIG. 25, seven TS packets). The PES packets shown in FIG. 25 are PES packets extracted from the plurality of TS packets including the TS packet designated as the entry point of the source packets. More specifically, the data of the leading PES packet shown in FIG. 25 is included in the TS packet designated as the entry point of the source packets.

Each of the PES packets has a PES header and a PES payload. The PES header includes a PTS (presentation time stamp). For EP_stream_type=3, i.e., an audio stream, PTS_EP_start represents the PTS value of the PES packet. Thus, SPN_EP_start represents the source packet number of the TS packet including the first byte of the PES packet referred to by the PTS_EP_start. That is, the SPN_EP_start and PTS_EP_start of the EP_map_for_one_stream_PID( ) shown in FIG. 14 correspond to the SPN_EP_start and PTS_EP_start shown in FIG. 25, respectively.

The PES payload of each PES packet includes a plurality of audio access units (Audio AUs). In the example shown in FIG. 25, the size of each audio access unit is fixed. Thus, the audio streams stored in the clip AV stream file are audio streams encoded by an audio encoder using a fixed-length-encoding method.

An audio stream included in a TS will be described. TS packets may store, as audio, only one type of audio stream encoded by an audio encoder using a fixed-length encoding method, as shown in FIG. 25, or two types of audio streams encoded by an audio encoder using a fixed-length encoding method and an audio encoder using a variable-length encoding method. Thus, a TS may include two types of audio streams encoded and generated by audio encoders using two different encoding methods.

FIG. 26 shows the difference when the application_type shown in FIG. 24 is set to 4, i.e., EP_stream_type=3, between TS packets in which an audio stream encoded by an audio encoder using a fixed-length encoding method is stored and TS packets in which two audio streams encoded by audio encoders using two different encoding methods are stored.

In FIG. 26, the upper part illustrates a TS in an AV stream with application_type=4 including one type of audio stream. The lower part illustrates a TS in an AV stream with application_type=4 including two types of audio streams, that is, a TS including two types of audio streams encoded using different encoding methods. In the following description, an audio stream encoded by an audio encoder using fixed-length coding is referred to as a "BS audio ES (basic audio elementary stream)", and an audio stream encoded by an audio encoder using variable-length coding is referred to as an "HQ audio ES (high-quality audio elementary stream)". A TS packet of a BS audio ES is referred to as a "BS audio TS packet", and a TS packet of an HQ audio ES is referred to as an "HQ audio TS packet".

The TS illustrated in the upper part of FIG. 26 includes a BS audio ES as audio, and has a plurality of BS audio TS packets. The TS illustrated in the lower part of FIG. 26 includes a BS audio ES and an HQ audio ES as audio, and has a plurality of BS audio TS packets and a plurality of HQ audio TS packets.

An entry-point constraint of EP_map will be described. There is no constraints for the TS illustrated in the upper part of FIG. 26, that is, a TS having BS audio TS packets. In the TS illustrated in the lower part of FIG. 26, that is, a TS having BS audio TS packets and HQ audio TS packets, on the other hand, only a BS audio TS packet satisfying the constraint, discussed below, can be designated as an entry point of EP_map. Thus, only a BS audio TS packet, but not an HQ audio TS packet, can be set as an entry point of EP_map.

Figure 27:
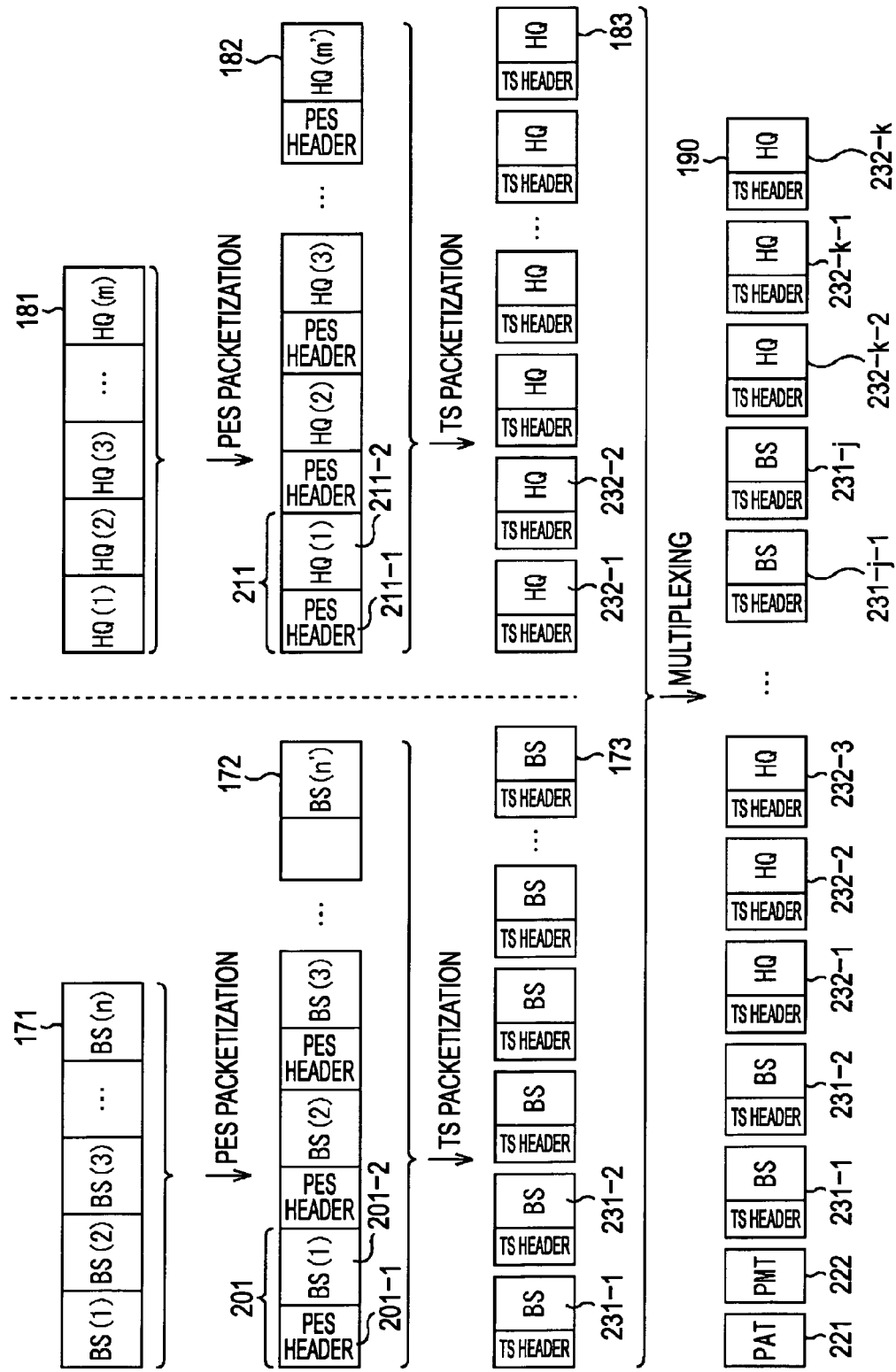
FIG. 27 is a diagram illustrating the flow of processing a BS audio ES and an HQ audio ES into a TS.

The flow of sequentially processing audio data into a TS stream will briefly be described with reference to FIG. 27.

Input audio data is encoded using two different encoding methods into a BS audio ES 171 and an HQ audio ES 181. The BS audio ES 171 has n (where n is an arbitrary natural number) audio access units (BS(1), BS(2), BS(3), . . . , BS(n)). The HQ audio ES 181 has m (where m is an arbitrary natural number) audio access units (HQ(1), HQ(2), HQ(3), . . . , HQ(m)).

The BS audio ES 171 and the HQ audio ES 181 are then subjected to PES packetization. Specifically, the BS audio ES 171 is PES-packetized to generate a BS audio PES 172, and the HQ audio ES 181 is PES-packetized to generate an HQ audio PES 182. In FIG. 27, the BS audio PES 172 is composed of PES packets including PES headers and PES payloads (represented by BS(1), BS(2), . . . , BS(n') in FIG. 27) (where n' is an arbitrary natural number). The HQ audio PES 182 is composed of BS audio PES packets including PES headers and PES payloads (represented by HQ(1), HQ(2), . . . , BS(m') in FIG. 27, where m' is an arbitrary natural number).

The constraint on the PES packetization is that the PES packetization should be performed so that PES packets in the BS audio PES 172 and the HQ audio PES 182 whose PTS values are the same exist an interval of one second or less. Here, a BS audio PES packet 201 having a PES header 201-1 and a PES payload (represented by BS(1) in FIG. 27) 201-2 and an HQ audio PES packet 211 having a PES header 211-1 and a PES payload (represented by HQ(1) in FIG. 27) 211-2 have the same PTS value (that is, the PTS stored in the PES header 201-1 and the PTS stored in the PES header 211-1 are equal). PES packetization is performed so that PES packets whose PTSs are the same exist an interval of one second or less if the PTSs are converted (calculated) into time. That is, PES packetization is performed so that an HQ audio PES packet having the same PTS as a BS audio PES packet exists an interval of one second or less. In the recording apparatus 1 shown in FIG. 1, the PES packetizer 26 performs PES packetization under this constraint.

The PES packet structure and TS packet structure of the HQ audio ES 181 having the same PTS value as the BS audio PES 172 will be described with reference to FIG. 28.

As in the BS audio ES shown in FIG. 25, each HQ audio PES packet of the packetized HQ audio ES 181 is composed of a PES header and a PES payload. The PES header includes PTS_DTS_flags, PTS, and other data.

PTS_DTS_flags is information indicating whether or not a PTS and a DTS (Decoding Time Stamp) are present. PTS_DTS_flags having value "00(b)" indicates absence of the PTS and DTS fields in the PES header, PTS_DTS_flags having value "10(b)" indicates presence of the PTS field in the PES header, and PTS_DTS_flags having value "11(b)" indicates presence of both PTS and DTS fields in the PES header. In the example shown in FIG. 28, the PTS_DTS_flags has a value of PTS_DTS_flags=10(b), indicating presence of the PTS value and absence of the DTS value in the PES header. In the example shown in FIG. 28, the PTS value is the same as the PTS value stored in a BS audio PES packet (i.e., the PTS (PTS_EP_start) shown in FIG. 25).

Figure 28:
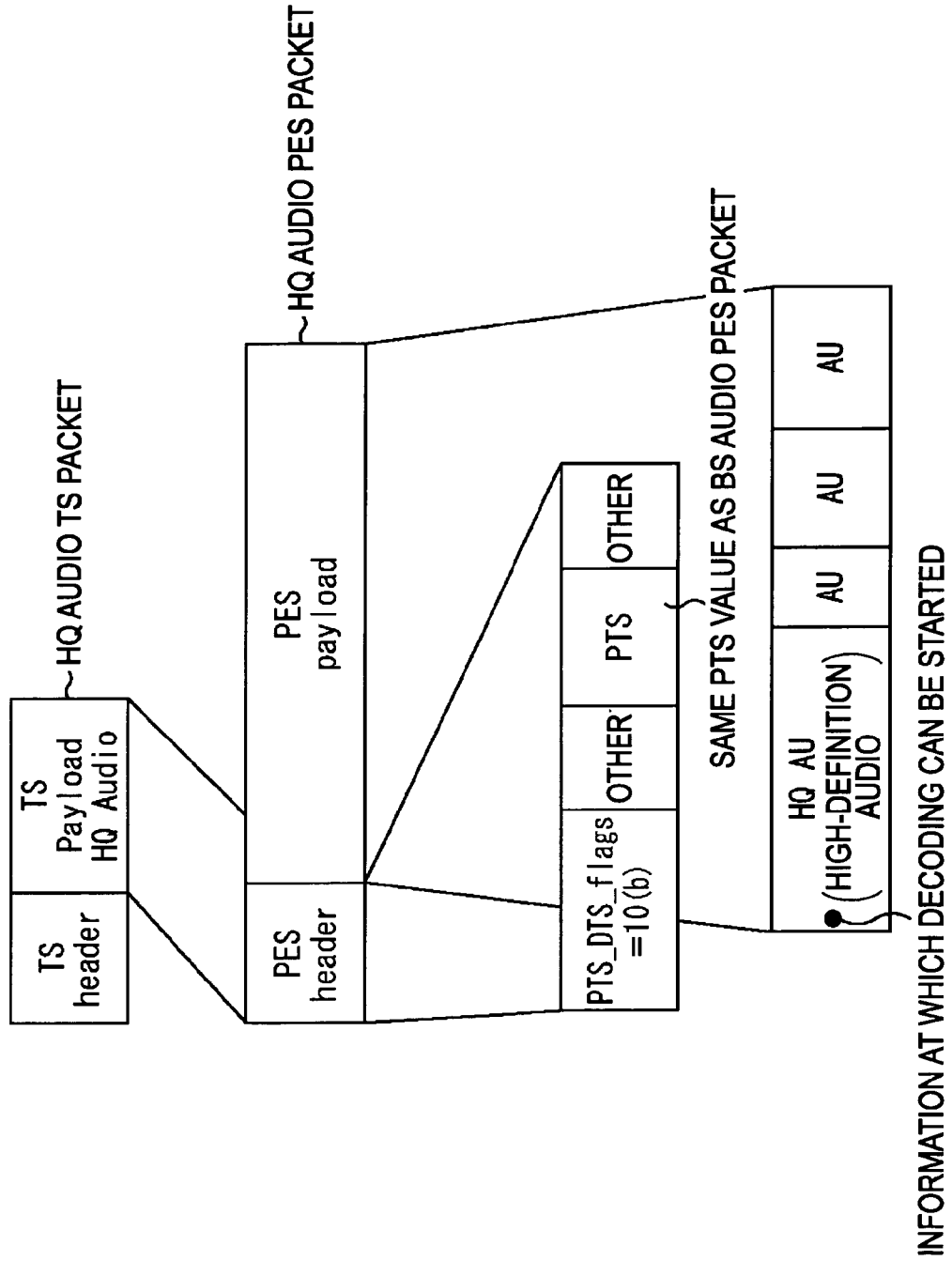
FIG. 28 is a diagram illustrating a structure of an HQ audio TS packet.

In the example shown in FIG. 28, the PES payload includes four audio access units (AUs). The audio access units provide high-quality (high-definition) audio, and the leading audio access unit in the PES payload includes decoding information (hereinafter also referred to as "detail information") at which decoding can be started. The detail information is thus information for starting the decoding at the position corresponding to the detail information. The information (detail information) at which decoding can be started includes, for example, the sampling frequency and channel information. The information (detail information) at which decoding can be started is not stored in all access units. An audio access unit (an audio access unit in the PES payload) in the HQ audio PES packet having the same PTS as a BS audio PES includes information for starting the decoding at the corresponding position.

Referring back to FIG. 27, the BS audio PES 172 and the HQ audio PES 182 are then subjected to TS packetization. Specifically, the BS audio PES 172 is TS-packetized to generate a BS audio TS 173, and the HQ audio PES 182 is TS-packetized to generate an HQ audio TS 183. The data of the PES header 201-1 and PES payload 201-2 in the leading PES packet 201 of the BS audio PES 172 is stored in TS packets 231-1 and 231-2 located at the first and second positions of the BS audio TS 172. More specifically, the data of the PES header 201-1 and the data of the PES payload 201-2 is stored in TS payload portions of the TS packets 231-1 and 231-2. Likewise, the data of the PES header 211-1 and PES payload 211-2 in the leading PES packet 211 of the HQ audio PES 182 is stored in TS packets 232-1 and 232-2 located at the first and second positions of the HQ audio TS 182. More specifically, the data of the PES header 211-1 and the data of the PES payload 211-2 are stored in TS payload portions of the TS packets 232-1 and 232-2.

The BS audio TS 173 and the HQ audio TS 183 are then subjected to multiplexing. Specifically, the BS audio TS 173 and the HQ audio TS 183 are multiplexed to generate a transport stream (TS) 190. The TS (MPEG2-TS) 190 includes a TS packet 221 corresponding to a PAT (Program Association Table), a TS packet 222 corresponding to a PMT (Program Map Table), BS audio TSs 231-1 to 231-*j* (where j is an arbitrary natural number), and HQ audio TSs 232-1 to 232-*k* (where k is an arbitrary natural number).

The constraint on the multiplexing is that a BS audio TS packet and an HQ audio TS packet whose PTS values are the same satisfy a relationship in which the HQ audio TS packet is subsequent to the BS audio TS packet. For example, the BS audio TS 173 and the HQ audio TS 183 are multiplexed so that the BS audio TS packets 231-1 and 231-2 precede the HQ audio TS packets 232-1 and 232-2. That is, TS packets in which PES packets having the same PTS value and PES payloads are stored are subject to the constraint that the TS packets of the HQ audio ES are placed after the TS packets of the BS audio ES.

For example, if the playback duration of five audio access units of the BS audio ES 171 is equal to the playback duration of 192 audio access units of the HQ audio ES 181, access units whose PTSs are the same exist an interval of five audio access units of the BS audio ES 171 (that is, 192 audio access units of the HQ audio ES 181). In the recording apparatus 1 shown in FIG. 1, the TS packetizer 27 performs multiplexing under that constraint.

Two examples satisfying the constraint on the multiplexing of the BS audio TS 173 and the HQ audio TS 183 shown in FIG. 27 (into the TS 190) will be described with reference to FIG. 29.

The BS audio TS 173 and the HQ audio TS 183 are multiplexed into the TS 190 under the constraint that a BS audio TS packet and an HQ audio TS packet whose PTS values are the same satisfy a relationship in which the HQ audio TS packet is subsequent to the BS audio TS packet.

A first example of packet alignment will be described with reference to the upper part of FIG. 29. In the upper part of FIG. 29, in a case where a BS audio TS packet 261-1 and an HQ audio TS packet 271-1 have PTS value PTS#1, the HQ audio TS packet 271-1 is placed after the BS audio TS packet 261-1. That is, TS packets whose PTS values are the same (both values are PTS#1) are aligned so that the BS audio TS packet 261-1 is located before the HQ audio TS packet 271-1. In a case where a BS audio TS packet 261-2 and an HQ audio TS packet 271-2 have PTS value PTS#2, the HQ audio TS packet 271-2 is placed after the BS audio TS packet 261-2. That is, TS packets whose PTS values are the same (both values are PTS#2) are aligned so that the BS audio TS packet 261-2 is located before the HQ audio TS packet 271-2.

Figure 30:
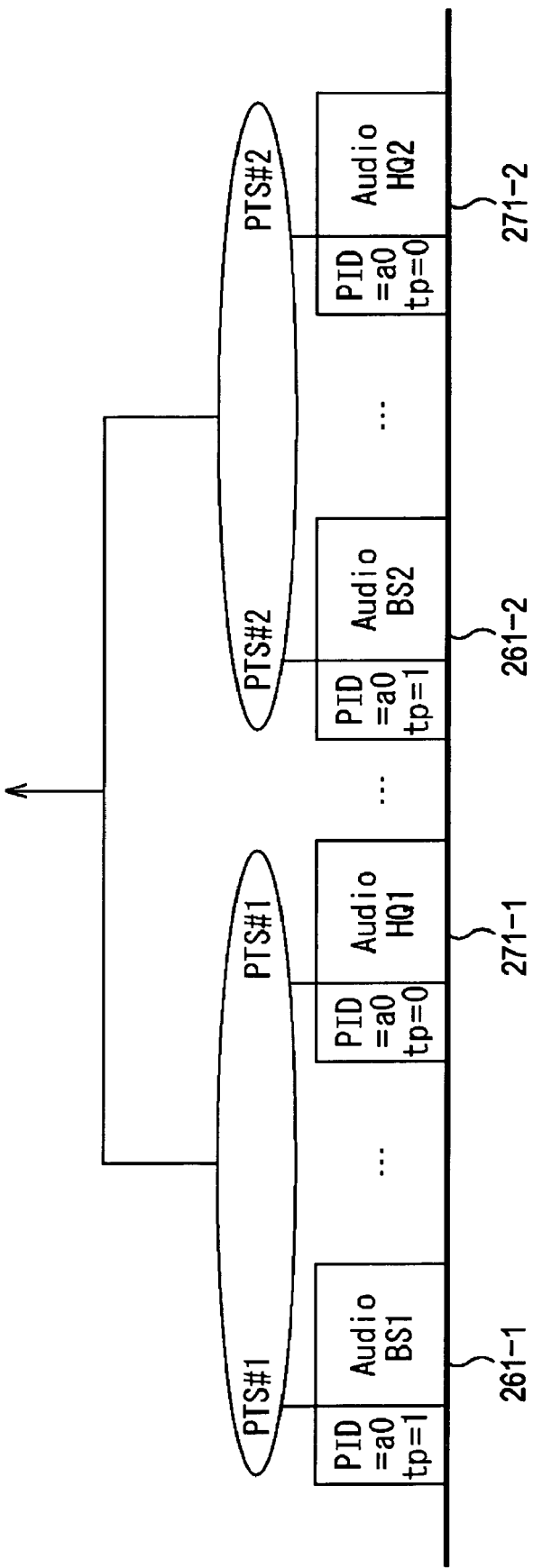
FIG. 30 is a diagram illustrating the time of PTSs.

As discussed above, PES packets whose PTSs are the same have been packetized so as to exist an interval of one second or less if the PTSs are converted (calculated) into time. Thus, when the interval between the values PTS#1 and PTS#2 is converted into time, the time interval is one second or less. As shown in FIG. 30, (PTS#2)−(PTS#1) equals one second or less.

A second example of packet alignment will be described with reference to the lower part of FIG. 29. In the lower part of FIG. 29, in a case where a BS audio TS packet 261-1 and an HQ audio TS packet 271-1 have PTS value PTS#1, the HQ audio TS packet 271-1 is placed after the BS audio TS packet 261-1. That is, TS packets whose PTS values are the same (both values are PTS#1) are aligned so that the BS audio TS packet 261-1 is located before the HQ audio TS packet 271-1. In a case where a BS audio TS packet 261-2 and an HQ audio TS packet 271-2 have PTS value PTS#2, the HQ audio TS packet 271-2 is placed after the BS audio TS packet 261-2. That is, TS packets whose PTS values are the same (both values are PTS#2) are aligned so that the BS audio TS packet 261-2 is located before the HQ audio TS packet 271-2.

Figure 29:
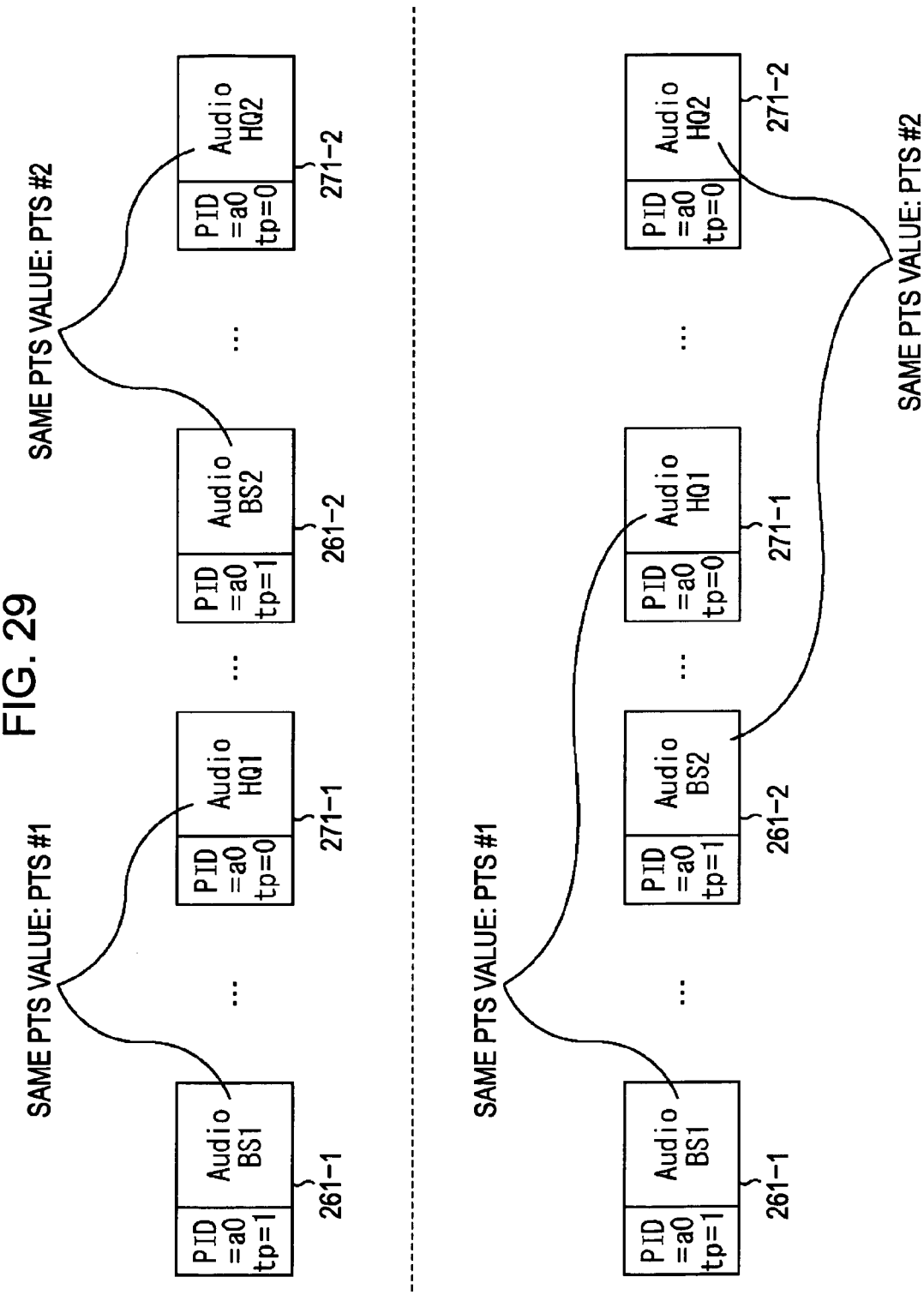
FIG. 29 is a diagram illustrating constraints on the multiplexing of TS packets.

The TS shown in the lower part of FIG. 29 is different from that shown in the upper part of FIG. 29 in that the HQ audio TS packet 271-1 is subsequent to the BS audio TS packet 261-2. That is, the BS audio TS packet 261-2 with PTS#2 is previous to the HQ audio TS packet 271-1 with PTS#1. However, as long as, in TS packets having the same PTS, an HQ audio TS packet should be placed after a BS audio TS packet, the TS shown in the lower part of FIG. 29 also satisfies the constraint described above.

Therefore, an HQ audio TS packet having the same PTS value as a BS audio TS packet exists after that BS audio TS packet, and the alignment shown in the lower part of FIG. 29 in which the HQ audio TS packet 271-1 with PTS#1 is placed after the BS audio TS packet 261-2 with PTS#2 also satisfies the constraint described above.

In the alignment shown in the lower part of FIG. 29, PES packets whose PTSs are the same have also been packetized so as to exist an interval of one second or less if the PTSs are converted (calculated) into time. Thus, if the interval between the packet with PTS#1 and the packet with PTS#2 is converted into time, the time interval therebetween is one second or less. The multiplexing process allows quick playback in the case of performing, for example, jump playback.

Figure 31:
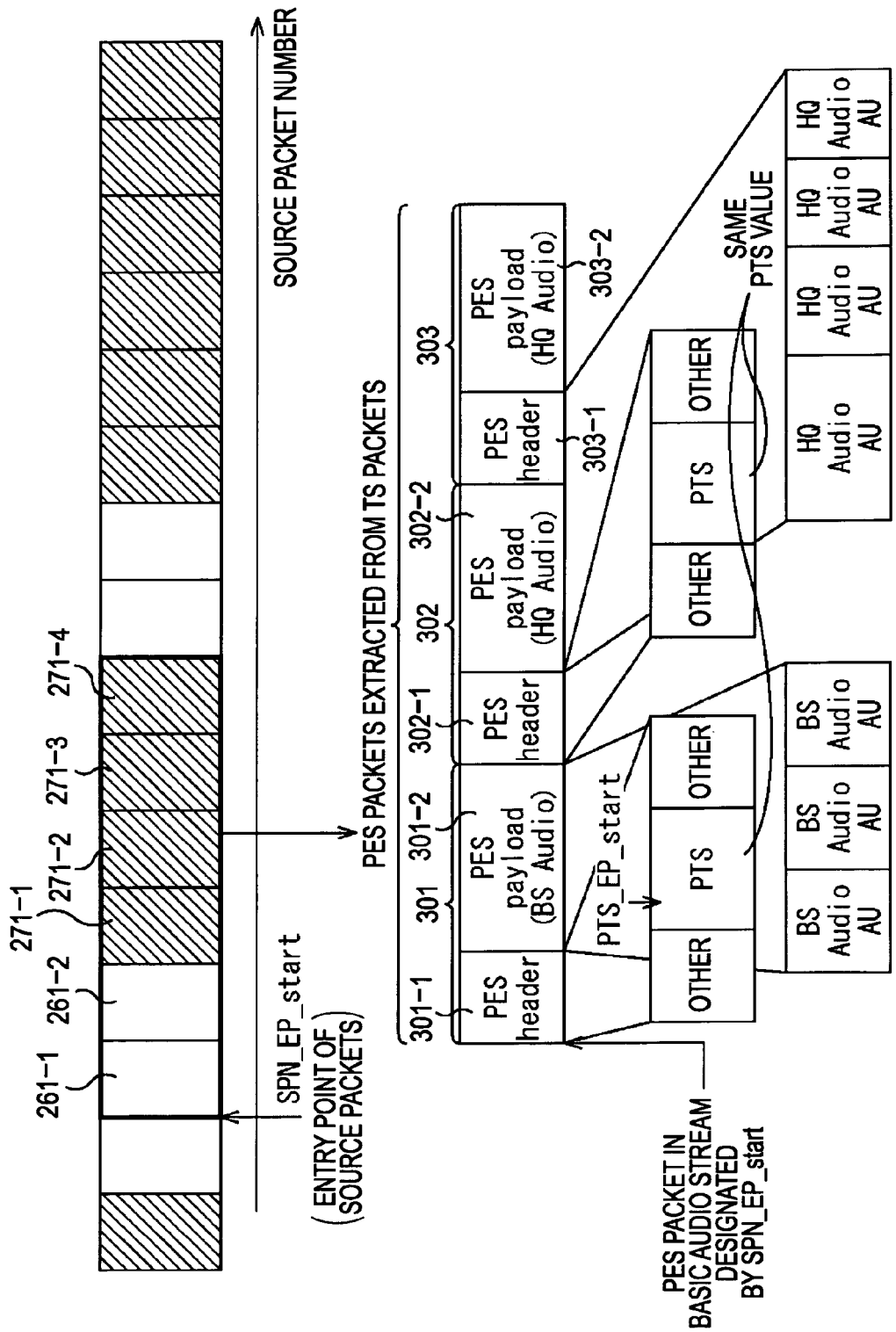
FIG. 31 is a diagram illustrating EP_map when the application_type is set to 4 and a TS is composed of a BS audio ES and an HQ audio TS.

The BS audio TS 173 and the HQ audio TS 183 are multiplexed according to the constraint described above to generate the TS 190 (see FIG. 27). An example of the generated TS 190 and EP_map will be described with reference to FIG. 31. FIG. 31 shows an example of EP_map for a TS in which the BS audio TS 173 and the HQ audio TS 183 are multiplexed, which is different from that shown in FIG. 25. In FIG. 25, the BS audio TS 173 (one type of audio ES) is contained as audio, whereas, in FIG. 31, two kinds of audio ESs, i.e., the BS audio TS 173 and the HQ audio TS 183, are contained as audio.

As in FIG. 25, the application_type (see FIG. 24) is also set to 4 in FIG. 31. FIG. 31 shows an example of EP_map for the type of EP_MAP that provides random, fast forward, or fast reverse access, i.e., EP_stream_type 3. As discussed with reference to FIG. 24, an AV stream with application_type=4 is audio to be played back together with a stream storing a browsable slide show or an audio stream to be played back together with video. This AV stream is also a TS referred to by a sub path.

In FIG. 31, a clip AV stream has TS packets of BS audio ESs and HQ audio ESs. The clip AV stream includes MPEG2 TSs (transport streams) encoded by two audio encoders. Each TS is composed of a plurality of TS packets of a predetermined size (e.g., 188 bytes).

In case of a TS having a BS audio TS and an HQ audio TS, when an HQ audio TS packet having the same PTS value as (a PES packet in) a BS audio TS packet is placed after the BS audio TS packet, the BS audio TS packet can be designated as an entry point.

SPN_EP_start is information representing an entry point of source packets (TS packets). In FIG. 31, the position of a BS audio TS packet 261-1 designated by an arrow of SPN_EP_start is designated by SPN_EP_start. In the TS shown in FIG. 31, BS audio TS packets 261-1 and 261-2 and HQ audio TS packets 271-1 to 271-4 are aligned in order from the TS packet designated by SPN_EP_start. The SPN_EP_start corresponds to the SPN_EP_start in the EP_map_for_one_stream_PID( ) shown in FIG. 14.

The plurality of TS packets stored in the clip AV stream file include a plurality of PES (Packetized Elementary Stream) packets. As shown in FIG. 31, PES packets (in the example shown in FIG. 31, three PES packets) can be extracted from the plurality of TS packets (in the example shown in FIG. 31, seven TS packets). The PES packets shown in FIG. 31 are PES packets extracted from the plurality of TS packets including the TS packet designated as the entry point of the source packets. More specifically, the data of the leading PES packet shown in FIG. 31 is included in the TS packet designated as the entry point of the source packets. In the example shown in FIG. 31, the PES packets extracted from the TS packets 261-1, 261-2, and 271-1 to 271-4 including the TS packet designated as the entry point of the source packets are PES packets 301 to 303. Each of the PES packets 301 to 303 has a PES header and a PES payload.

The PES packet 301 is a PES packet of the BS audio ES, and the PES packets 302 and 303 are PES packets of the HQ audio ES. The PES packet 301 has a PES header 301-1 and a PES payload 301-2, the PES packet 302 has a PES header 302-1 and a PES payload 302-2, and the PES packet 303 has a PES header 303-1 and a PES payload 303-2. The data of the BS audio ES is stored in the PES payload 301-2 of the PES packet 301, and the data of the HQ audio ES is stored in the PES payloads 302-2 and 303-2 of the PES packets 302 and 303.

The PTS stored in the PES header 301-1 of the leading PES packet 301 is defined as PTS_EP-start (the PTS value of the PES packet). SPN_EP_start represents the source packet number of the TS packet 261-1 including the first byte of the PES packet 301 referred to by the PTS_EP_start. That is, the SPN_EP_start and PTS_EP_start of the EP_map_for_one_stream_PID( ) shown in FIG. 14 correspond to the SPN_EP_start and PTS_EP_start shown in FIG. 31, respectively.

The PES payload 301-2 of the PES packet 301 includes a plurality of audio access units of the BS audio ES (BS Audio AUs). In the example shown in FIG. 31, the size of each audio access unit is fixed because the BS audio ES is a stream encoded using a fixed-length encoding method. The PES payload 302-2 of the PES packet 302 includes a plurality of audio access units of the HQ audio ES (HQ Audio AUs). In the example shown in FIG. 31, the size of each audio access unit is variable because the HQ audio ES is a stream encoded using a variable-length encoding method. The value of the PTS (the value of the PTS obtained from the BS audio TS packet 261-1 designated by PTS_EP_start), which is included in the PES header 302-1 of the PES packet 302, and the value of the PTS included in the PES header 301-1 of the PES packet 301 are the same. The PES payload 303-2 of the PES packet 303 includes a plurality of audio access units of the HQ audio ES. In the example shown in FIG. 31, the size of each audio access unit is variable because the HQ audio ES is a stream encoded using a variable-length encoding method.

Therefore, PTS_EP_start indicates the value of the PTS of the PES packet, and SPN_EP-start indicates the source packet number of the TS packet 261-1 including the first byte of the PES packet 301 referred to by PTS_EP_start.

A process for creating and recording a clip information file relating to a clip AV stream file recorded on the optical disc 11 will be described with reference to a flowchart shown in FIG. 32. This process is started by another recording apparatus or the recording apparatus 1 in a state where the clip AV stream file is recorded on the optical disc 11. That is, the process begins in a state where the optical disc 11 having recorded thereon a clip AV stream file, which is a file of the TS composed of BS audio TS packets and HQ audio TS packets described above (wherein the TS satisfies the constraint described above) with reference to FIGS. 27 to 31, is loaded in the recording apparatus 1 shown in FIG. 1.

In step S1, the recording controller 28 reads the clip AV stream file recorded on the optical disc 11, and supplies it to the controller 21.

In step S12, the controller 21 creates ClipInfo concerning the clip AV stream file. Specifically, the controller 21 creates the ClipInfo( ) represented in the syntax of the clip information file described above with reference to FIG. 6.

In step S13, the controller 21 creates SequenceInfo concerning the clip AV stream file. Specifically, the controller 21 creates the SequenceInfo( ) represented in the syntax of the clip information file described above with reference to FIG. 6.

In step S14, the controller 21 creates ProgramInfo concerning the clip AV stream file. Specifically, the controller 21 creates the ProgramInfo( ) represented in the syntax of the clip information file described above with reference to FIG. 6.

In step S15, the controller 21 creates CPI (EP_map) concerning the clip AV stream file. Specifically, the controller 21 creates the EP_map shown in FIG. 12 included in the CPI( ) in the syntax of the clip information file described above with reference to FIG. 6. The details of the process are described below with reference to FIG. 34.

In step S16, the controller 21 creates ClipMark concerning the clip AV stream file. Specifically, the controller 21 creates the ClipMark( ) represented in the syntax of the clip information file described above with reference to FIG. 6.

In step S17, the controller 21 records a clip information file in which the ClipInfo( ), the SequenceInfo( ), the ProgramInfo( ), the CPI( ), and the ClipMark( ) are stored.

Figure 32:
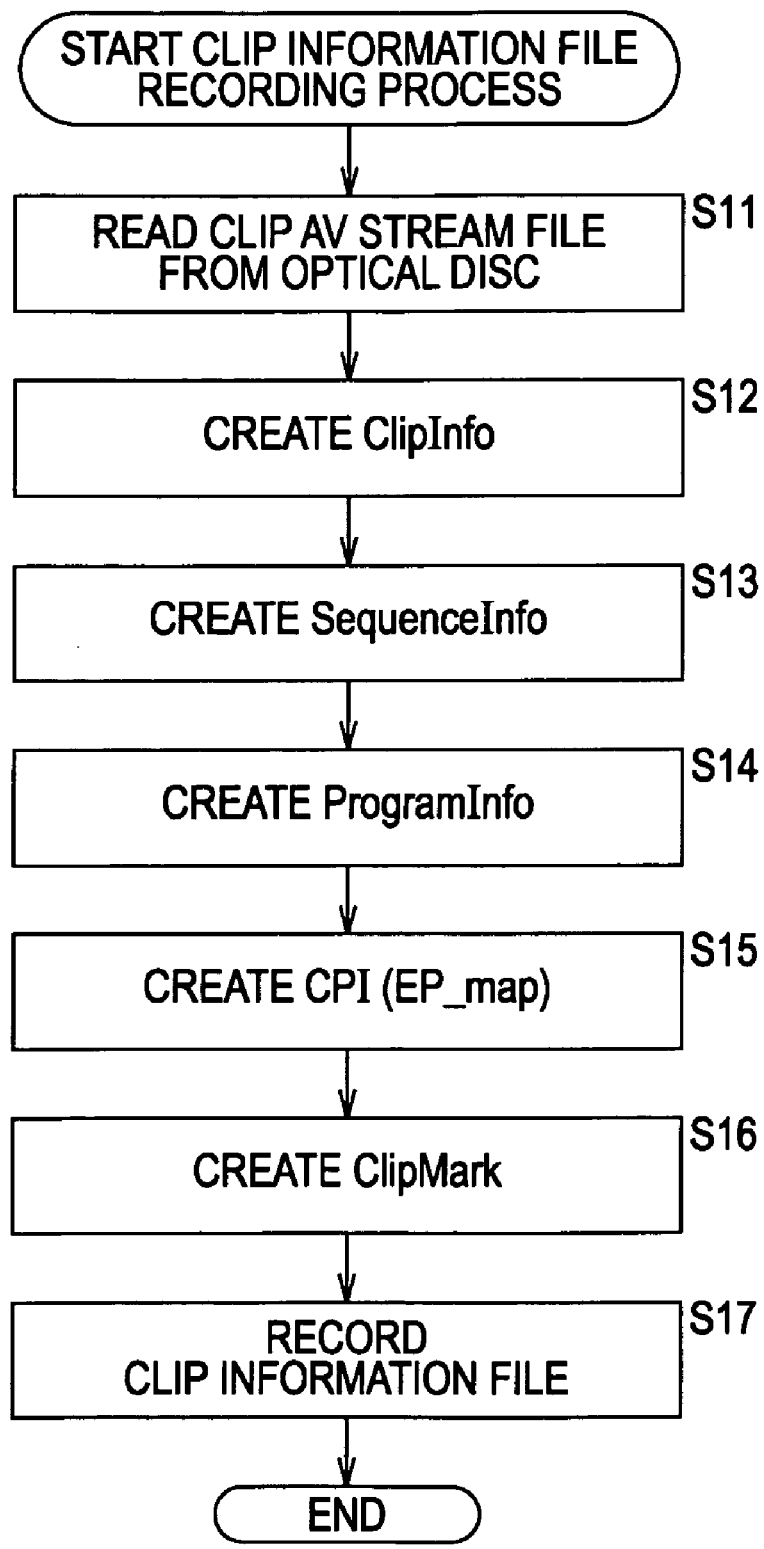
FIG. 32 is a flowchart showing a clip information file recording process.

According to the process shown in FIG. 32, a clip information file is created based on a clip AV stream file, and is recorded.

While the processing steps have been described in a time-series manner with reference to FIG. 32, actually, the processing of steps S12 to S16 is performed at the same time. In this example, the recording onto each optical disc 11 is illustrated. The data of the clip AV stream file and the clip information file is stored in a recording medium, such as a hard disk, and the data is input to a mother-disc creating apparatus to create a mother disc. Further, a stamper may be created based on the created mother disc, and an optical disc may be manufactured using the stamper.

While the clip information file creation process has been described with reference to FIG. 32 in the context in which the optical disc 11 has a clip AV stream file pre-recorded thereon, the recording of the clip AV stream file and the recording of the clip information file may be sequentially performed by the recording apparatus 1. This example will be described with reference to a flowchart shown in FIG. 33.

Figure 33:
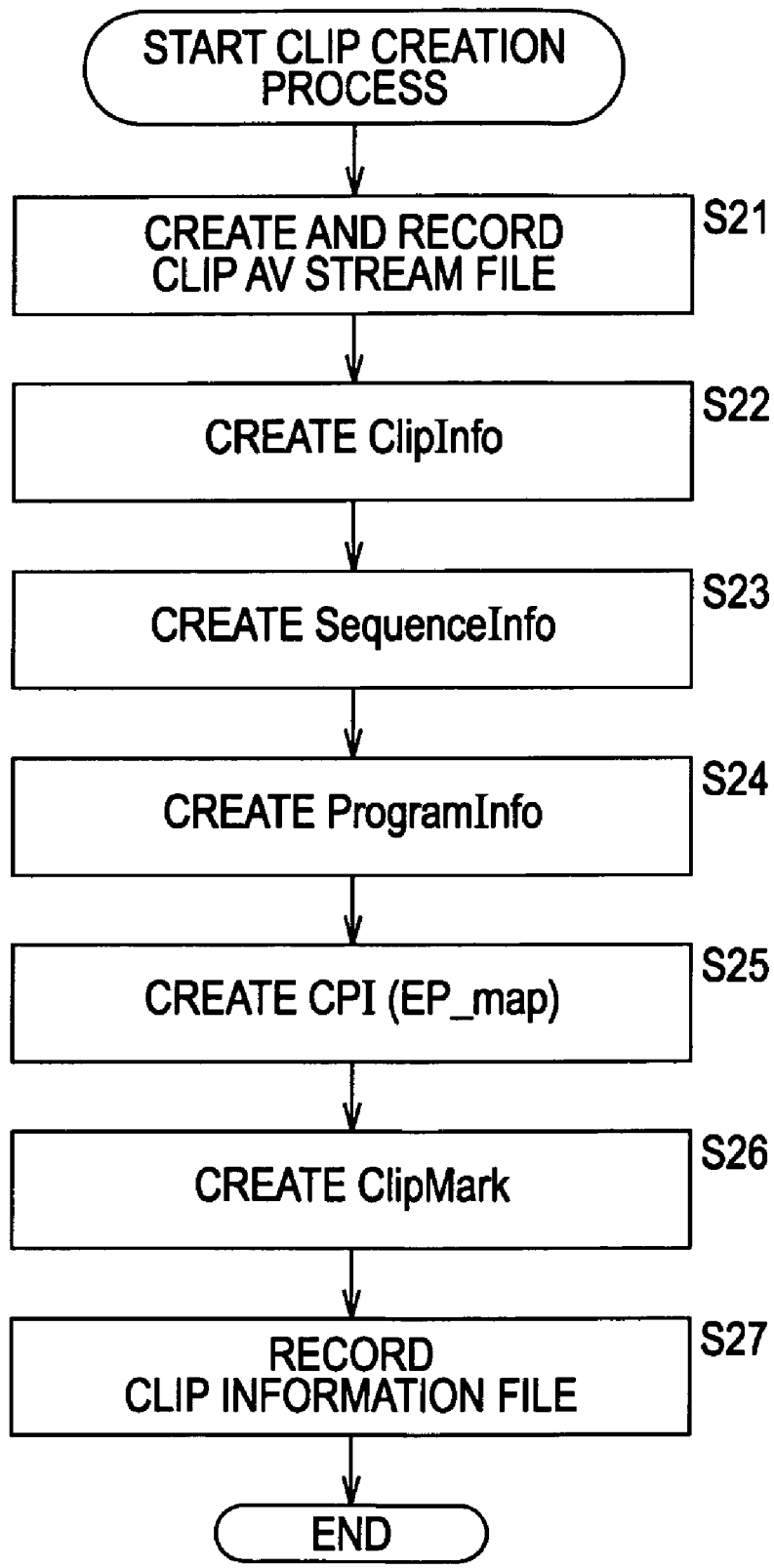
FIG. 33 is a flowchart showing a clip creation process.

FIG. 33 is a flowchart showing a process for recording a clip AV stream and a clip Information file relating to the clip AV stream. This process begins, for example, when the recording apparatus 1 shown in FIG. 1 is turned on and when the user instructs the recording apparatus 1 to record an AV stream. Of course, the optical disc 11 has been loaded in the recording apparatus 1.

In step S21, the recording apparatus 1 creates and records a clip AV stream file. Specifically, the data obtaining unit 23 of the recording apparatus 1 obtains AV data from the outside, and supplies it to the AV encoder 24. The data obtaining unit 23 further notifies the controller 21 of the obtained AV data. The AV encoder 24 encodes the supplied AV data under the control of the controller 21, and supplies the encoded AV data to the buffer 25. More specifically, as shown in FIG. 2, the first audio encoder 24-1 and the second audio encoder 24-2 encode the audio data, and the video encoder 24-3 encodes the video data. The resulting BS audio ES, HQ audio ES, and video ES data are supplied to the buffer 25. The buffer 25 temporarily stores the supplied encoded AV data (the BS audio ES data, the HQ audio ES data, and the video ES data). The PES packetizer 26 packetizes the encoded AV data (the BS audio ES data, the HQ audio ES data, and the video ES data) into PES packets according to the control of the controller 21, and supplies the PES packets to the TS packetizer 27. The TS packetizer 27 obtains PES packet streams, performs TS packetization and multiplexing on the obtained PES packet streams, and supplies the multiplexed MPEG2-TS to the recording controller 28. The recording controller 28 converts the received MPEG2-TS into a file to create a clip AV stream file, and records the clip AV stream file onto the optical disc 11. The TS included in the clip AV stream file satisfies the constraints described above with reference to FIG. 27. This processing enables the clip information file read in step S11 shown in FIG. 32 to be recorded onto the optical disc 11.

The subsequent processing of steps S22 to S27 is basically similar to the processing of steps S12 to S17 shown in FIG. 32, and will briefly be described.

In step S22, the controller 21 creates ClipInfo concerning the clip AV stream file recorded on the optical disc 11 in the processing of step S21. In step S23, the controller 21 creates SequenceInfo concerning the clip AV stream file recorded on the optical disc 11 in the processing of step S21. In step S24, the controller 21 creates ProgramInfo concerning the clip AV stream file recorded on the optical disc 11 in the processing of step S21. In step S25, the controller 21 creates CPI (EP-map) concerning the clip AV stream file recorded on the optical disc 11 in the processing of step S21. In step S26, the controller 21 creates ClipMark concerning the clip AV stream file recorded on the optical disc 11 in the processing of step S21. In step S27, the controller 21 records a clip information file in which the generated ClipInfo( ), SequenceInfo( ), ProgramInfo( ), CPI( ), and ClipMark( ) are stored.

According to the process shown in FIG. 33, a clip AV stream file and a clip information file are created and recorded.

While, as in FIG. 32, the processing steps shown in FIG. 33 have also been described in a time-series manner, actually, the processing of steps S11 to S16 is performed at the same time.

The details of the process for generating EP—map in step S15 shown in FIG. 32 and step S25 shown in FIG. 33 will be described with reference to a flowchart shown in FIG. 34. This process begins in a state where the optical disc 11 or a hard disk having recorded thereon the TS described above with reference to FIG. 31 is loaded in the recording apparatus 1 shown in FIG. 1. That is, the process begins in a state where the optical disc 11 having recorded thereon the TS 190 composed of the BS audio ES and the HQ audio ES, which is generated according to the constraints described with reference to FIG. 27, is loaded in the recording apparatus 1. For example, the process is performed after the processing of step S11 shown in FIG. 32 or the processing of step S21 shown in FIG. 33.

In step S51, the recording controller 28 reads the clip information file recorded on the optical disc 11, and receives an input of a TS composed of a BS audio ES and an HQ audio ES. As discussed above, the TS has the structure shown in FIG. 27 or 31, and is composed of TS packets of the HQ audio ES and TS packets of the HQ audio ES. The received TS is composed of a plurality of TS packets, and the TS packets are sequentially supplied to the controller 21.

In step S52, the controller 21 obtains the TS packets supplied from the recording controller 28, and determines whether or not each of the obtained TS packets is a TS packet of the BS audio ES. The TS packet is, as shown in FIG. 31, either the BS audio TS packet 261-1 (a TS packet of the BS audio ES) or the HQ audio TS packet 271-1 (a TS packet of the HQ audio ES), and the controller 21 determines whether or not the obtained TS packet is a TS packet of the BS audio ES (BS audio TS packets). The header of each of the TS packets is provided with a transport_priority flag (tp flag) for identifying whether that TS packet is a TS packet of the BS audio ES or a TS packet of the HQ audio ES. The controller 21 uses the tp flag attached to the header of each TS packet to perform the determination. For example, when the tp flag is 1, the controller 21 determines that the TS packet is a TS packet of the BS audio ES.

If it is determined in step S52 that the TS packet is not a TS packet of the BS audio ES, the process returns to step S52, and the subsequent processing is repeatedly performed. If the TS packet is a TS packet of the BS audio ES, the processing after step S52 is performed.

If it is determined in step S52 that the TS packet is a TS packet of the BS audio ES, then, in step S53, the controller 21 obtains the value of the PTS of the PES packet from the payload of the TS packet. The TS packet has a TS header and a TS payload, and the data of the PES packet is stored in the TS payload. For example, in FIG. 31, the PES header 301-1 is included in the TS payload of the TS packet 261-1, and the controller 21 obtains the value of the PTS stored in the PES header 301-1. For example, the controller 21 obtains PTS value PTS#1.

One PES packet is generated from a plurality of TS packets, and a desired TS packet may not include a PES header. For example, if the payload of the TS packet does not include a PES header but only includes a PES payload, the process returns to step S52. Then, a subsequent TS packet is obtained, and the subsequent processing is repeatedly performed.

In step S54, the controller 21 determines whether or not the TS packet including the PES packet of the HQ audio ES whose PTS is the same as the obtained PTS (e.g., PTS#1) exists at the end of the TS, and also determines whether or not the leading access unit has the header including the detail information. First, the controller 21 determines whether or not, for example, the TS packet including the PES packet of the HQ audio ES whose PTS value is the same as PTS#1 obtained in step S53 exists at the end of the TS (that is, whether or not that TS packet is placed after the TS packet obtained in step S52 in the TS). In other words, the controller 21 determines whether or not the TS packet of the HQ audio ES with PTS#1 is located after the TS packet of BS audio ES with the obtained PTS#1. If YES is obtained (if the TS packet of the HQ audio ES with PTS#1 is located in the TS after the TS packet of the BS audio ES with the obtained PTS#1), the controller 21 further determines whether or not the PES payload 302-2 of the HQ audio TS packet with PTS#1 (more specifically, the header of the PES payload 302-2) includes the detail information (the information shown in FIG. 28 at which decoding can be started). That is, the controller 21 determines whether or not the alignment described above with reference to FIG. 29 is satisfied, and also determines whether or not the PES payload extracted from the HQ audio TS packet with the same PTS includes the detail information (the information shown in FIG. 28 at which decoding can be started).

If it is determined in step S54 that the TS packet including the PES packet of the HQ audio ES with the same PTS as the obtained PTS (e.g., PTS#1) does not exist at the end of the TS, or if it is determined that the leading access unit does not have the header including the detail information, the process returns to step S52, and the subsequent processing is repeatedly performed. That is, unless both conditions are met, the process returns to step S52. If both conditions are met (YES is obtained), the process proceeds to step S55.

If it is determined in step S54 that the TS packet including the PES packet of the HQ audio ES with the same PTS as the obtained PTS (e.g., PTS#1) exists at the end of the TS and if it is determined that the leading access unit has the header including the detail information, then, in step S55, the controller 21 sets the current TS packet as an entry point. For example, the controller 21 designates the TS packet 261-1 shown in FIG. 31 as an entry point. That is, if the HQ audio TS packet and BS audio TS packet whose PTS values are the same are aligned so that the HQ audio TS packet is placed after the BS audio TS packet, and if the PES payload obtained from the HQ audio TS packet includes the detail information, that BS audio TS packet is designated as an entry point.

Since the detail information is included in the HQ audio TS packet having the same PTS as the BS audio TS packet designated as an entry point, the detail information can be immediately obtained for playback of HQ audio, thus allowing quick playback. An apparatus for playing back only BS audio also allows quick playback because the TS packet designated as an entry point has a PES packet header of BS audio.

In step S56, the controller 21 creates EP_map based on the PID of the BS audio ES and the HQ audio ES, the TS packet number, and the value of PTS obtained in step S53. As discussed above, PIDs are attached during TS packetization, and the PIDs of the BS audio ES and the HQ audio ES are the same (e.g., PID=a0). Thus, for example, the controller 21 creates EP_map based on PID=a0, the TS packet number (the source packet number of the BS audio TS packet 261-1 shown in FIG. 31), and PTS#1.

A specific example will be described with reference to the syntax of the EP_map shown in FIG. 19. The number_of_stream_PID_entries and the stream_PID[k] are generated based on the PID used in the processing of step S56. The stream_PID[k] indicates the value of the PID of the transport packet carrying the elementary stream referred to by the k-th EP_map_for_one_stream_PID entry in the EP_map. The EP_stream_type[k] is set to 3 (audio) (see FIG. 20). The number_of_EP_coarse_entries[k], the number_of_EP_fine_entries[k], and the EP_map_for_one_stream_PID_start_address[k] are generated based on the TS packet number and the value of the PTS used in the processing of step S56. As can be seen from reference to the syntax of the EP_map_for_one_stream_PID shown in FIG. 21, the sources of the data stored in the EP_map_for_one_stream_PID are PTS_EP_start and SPN_EP_start. Thus, the data stored in the EP_map_for_one_stream_PID is generated based on the TS packet number used in the processing of step S56, i.e., the source packet number at the entry point.

In step S57, the controller 21 determines whether or not the currently processed TP packet is the last TS packet. If it is determined that the current TP packet is not the last TS packet, or that an unprocessed TS packet remains, the process returns to step S52, and the subsequent processing is repeatedly performed. That is, the process is repeatedly performed until the last TS packet has been processed. If it is determined in step S57 that the currently processed TS packet is the last TS packet, the process ends.

Figure 34:
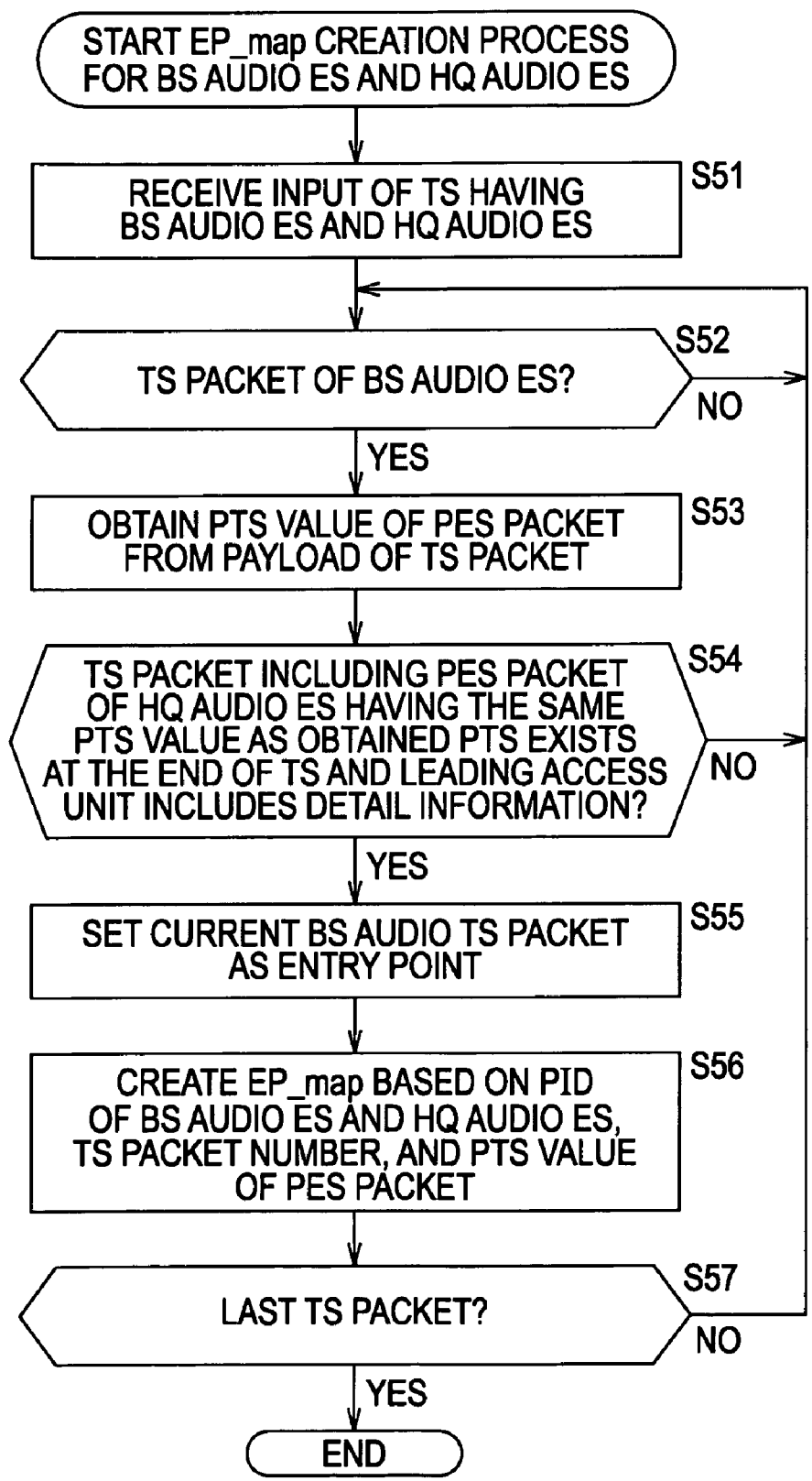
FIG. 34 is a flowchart showing an EP_map generation process for a BS audio ES and an HQ audio ES.

According to the process shown in FIG. 34, EP_map is created.

An arrangement for playing back a clip AV stream file and clip information file (clip) recorded on the optical disc 11 according to the process shown in FIG. 31 or the like will be described. FIG. 35 is a block diagram showing an example structure of a playback apparatus 341 for playing back the data recorded on the optical disc 11.

A controller 351 controls the overall operation of the playback apparatus 341 by executing a control program prepared in advance or by controlling a playback controller 354 to read a control program recorded on the optical disc 11 and to load the program into a memory 353 to execute it according to a user's operation that is input using an operation input unit 352. For example, the controller 351 can display a predetermined menu screen on an external display device when the optical disc 311 is loaded.

The operation input unit 352 includes an input device including, for example, buttons, keys, a touch panel, a jog dial, and a mouse, and a receiver for receiving an infrared signal transmitted from a predetermined remote commander. The operation input unit 352 obtains an operation input from a user, and supplies it to the controller 351.

The memory 353 stores data necessary for the controller 351 to perform various processes, as needed.

The playback controller 354 reads data from the optical disc 11 according to the control of the controller 351, and outputs the read data to the controller 351, the memory 353, or a buffer 355 to supply it to an AV decoder 356. When the information read from the optical disc 11 is a control program or control information, a clip information file (EP_map), or the like, the information read by the playback controller 354 is output to the controller 351 or the memory 353. When the information read from the optical disc 11 is AV data, such as an AV stream file, the information read by the playback controller 354 is output to the buffer 355 to supply it to the AV decoder 356.

The buffer 355 temporarily stores the AV data read from the optical disc 11 by the playback controller 354, such as an AV stream, and supplies the data to the AV decoder 356. Actually, since the AV stream is composed of a TS, the controller 351 obtains a PES from the TS, and further obtains an ES. The ES includes a BS audio ES, an HQ audio ES, and a video ES.

The AV decoder 356 decodes the AV data supplied from the playback controller 354, such as an AV stream, and outputs the resulting video signal and audio signal to an external display device. Specifically, the AV stream includes an encoded BS audio ES, HQ audio ES, and video ES.

Figure 36:
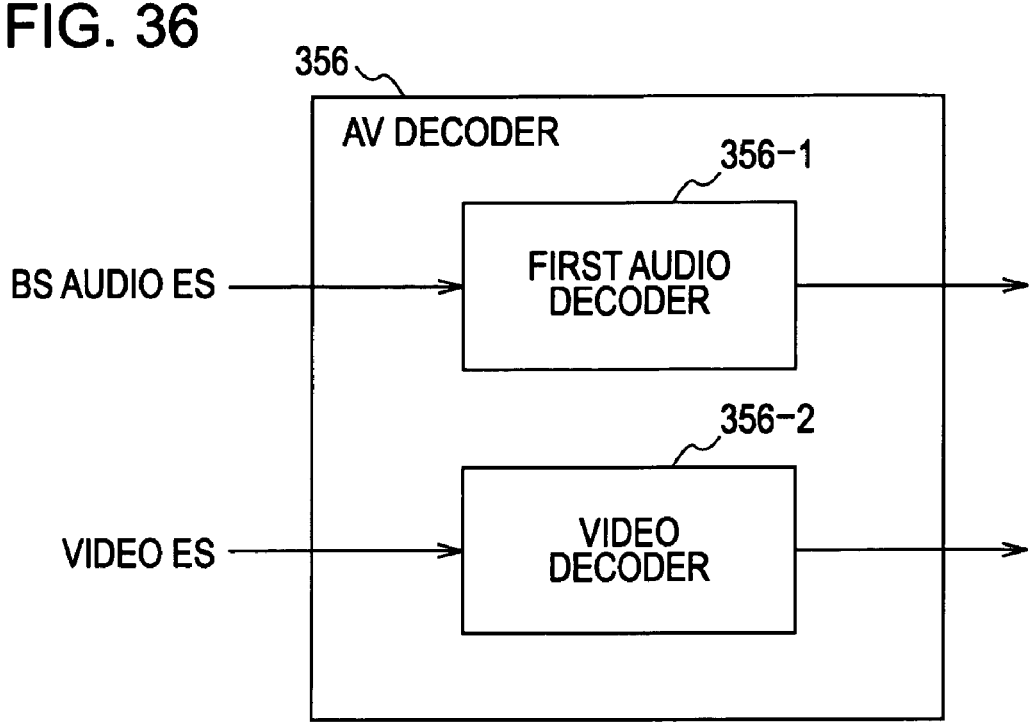
FIG. 36 is a block diagram showing an example structure of an AV decoder shown in FIG. 35.
Figure 37:
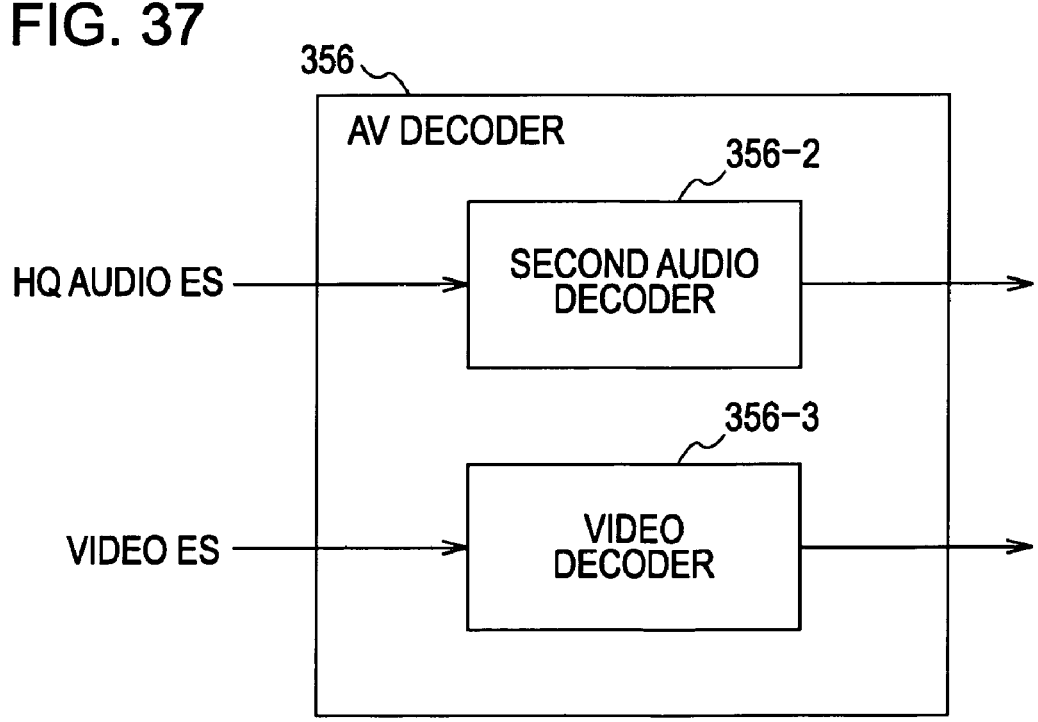
FIG. 37 is a block diagram showing another example structure of the AV decoder shown in FIG. 35.

The AV decoder 356 may include, as shown in FIG. 36, a first audio decoder 356-1 for decoding an audio ES encoded using a first encoding method and a video decoder 356-3 for decoding a video ES, or may include, as shown in FIG. 37, a second audio decoder 356-2 for decoding an audio ES encoded using a second encoding method and a video decoder 356-3 for decoding a video ES.

The AV decoder 356 shown in FIG. 36 is capable of decoding BS audio ESs as audio and is not capable of decoding HQ audio ESs. The AV decoder 356 shown in FIG. 37 is capable of decoding HQ audio ESs as audio. The AV decoder 356 shown in FIG. 37 has the second audio decoder 356-2, which provides higher performance than the first audio decoder 356-1, and is also capable of decoding BS audio ESs. However, due to the general desire for higher-performance playback, in the following description, it is assumed that the AV decoder 356 shown in FIG. 37 decodes an HQ audio ES.

Referring back to FIG. 35, the display device outputs the content recorded on, for example, the optical disc 11 based on the data (video data and audio data) decoded by the AV decoder 356 (that is, the display device displays video and outputs audio).

A drive 357 is further connected to the controller 351, as needed, and a removable medium 30 formed of a magnetic disc (including a flexible disc), an optical disc (including a CD-ROM (Compact Disk-Read Only Memory) and a DVD), a magneto-optical disc (including a MD™ (Mini-Disk)), or a semiconductor memory is loaded in the drive 357. Examples of the removable medium 30 may include.

The method for performing special playback using the EP_map generated by the process shown in FIG. 34 (which is generated and recorded in step S15 shown in FIG. 32 or step S25 shown in FIG. 33) will be described. EP_map is useful for random access playback.

In a digital broadcast transport stream, audio PIDs may change, and an AV decoder (the AV decoder 356 of the playback apparatus 341 shown in FIG. 35) may need PID mapping in the recorded transport stream. EP_map has the value of the audio PID to be referred to by the EP_map for each sub table called EP_map_for_one_stream_PID( ), and ProgramInfo has information concerning PID mapping.

Figure 38:
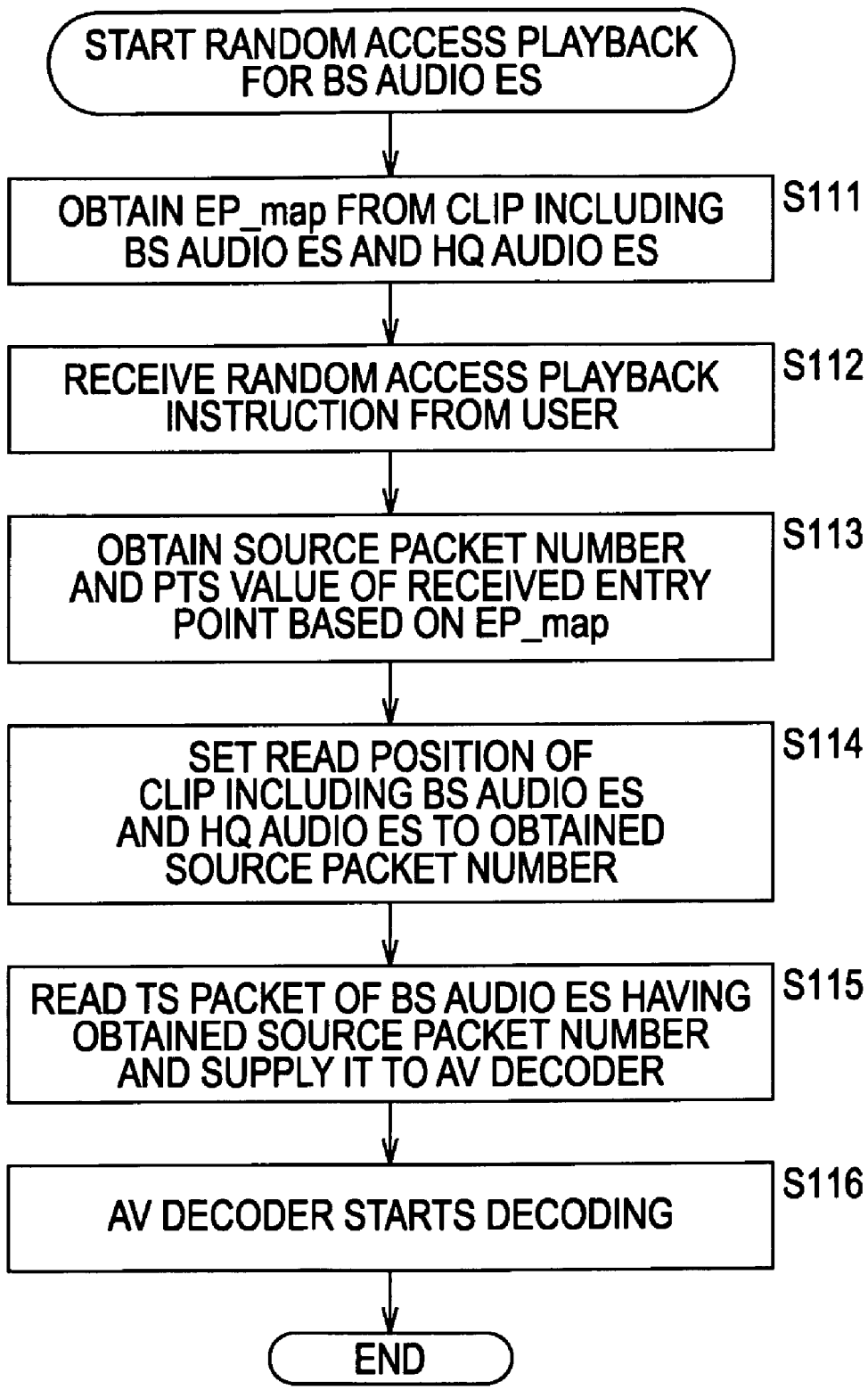
FIG. 38 is a flowchart showing a random access playback process for a BS audio ES.

FIG. 38 is a flowchart showing a random access playback process for a BS audio ES. This process is a process performed, for example, when the playback apparatus 341 shown in FIG. 35 including the AV decoder 356 shown in FIG. 36 plays back a clip (clip AV stream file and clip information file) recorded onto the optical disc 11 by the foregoing processes, that is, a process performed when the playback apparatus 341 supports BS audio ESs and video ESs (and does not support HQ audio ESs). That process is further a random access playback process, that is, a process in which the clip AV stream file recorded on the optical disc 11 is not played back from the beginning but is played back starting from a playback position specified by a user. This process begins when the optical disc 11 having a clip recorded thereon is loaded in the playback apparatus 341 shown in FIG. 35 (which is a playback apparatus including the AV decoder 356 shown in FIG. 36).

In step S111, the playback controller 354 obtains EP_map from a clip including a BS audio ES and an HQ audio ES, which is recorded on the optical disc 11, under the control of the controller 351. The playback controller 354 supplies the obtained EP_map to the controller 351.

In step S112, the operation input unit 352 receives a random access playback instruction given from a user. The operation input unit 352 supplies the signal corresponding to the received instruction to the controller 351. For example, the user specifies a playback position (entry point) by using time (playback time on the AV stream) to give a random access playback instruction. The operation input unit 352 supplies the signal corresponding to the received time of the entry point to the controller 351. The entry point is, as discussed above with reference to FIG. 34, designated for a predetermined BS audio TS packet. The controller 351 performs predetermined calculation based on the signal corresponding to the time supplied from the operation input unit 352, and determines a PTS. That is, the controller 351 is able to convert the time (time on the AV stream) specified by the user into a PTS.

In step S113, the controller 351 obtains the source packet number and PTS value of the received entry point based on the obtained EP_map. Specifically, the PTS based on the time specified by the user and a PTS based on EP_MAP are compared to designate a PTS for playback in the PTSs stored in the EP_MAP, and the source packet number corresponding to the designated PTS is specified. For example, in FIG. 31, when the position represented by SPN_EP_start, that is, the source packet number at which playback is to be started, is designated as an entry point (that is, when the controller 351 designates SPN#1 corresponding to SPN_EP_start (i.e., the number of the BS audio TS packet 261-1) as the source packet number of the entry point), the TS packet (the TS payload portion of the TS packet) including the BS audio TS packet 261-1 is designated.

In step S114, the controller 351 designates the obtained source packet number as the read position of the clip including the BS audio ES and the HQ audio ES. For example, the controller 351 designates the obtained source packet number, i.e., SPN#1 (SPN_EP_start), as the clip read position of the optical disc 11. Since, as discussed above with reference to FIG. 34, the entry point can only be designated for a BS audio TS packet, the read position of the optical disc 11 has been designated in the BS audio TS packet.

In step S115, the playback controller 354 reads the TS packet of the BS audio ES having that source packet number under the control of the controller 351, and supplies it to the AV decoder 356. For example, the playback controller 354 reads the TS packet of the BS audio ES having source packet number SPN#1, and supplies it to the AV decoder 356 shown in FIG. 36.

In step S116, the AV decoder 356 starts the decoding of the supplied TS packet of the BS audio ES. That is, the playback is started from the BS audio TS packet 261-1 (FIG. 31) having source packet number SPN#1. The AV decoder 356 has the structure shown in FIG. 36, and is capable of decoding BS audio ESs. Thus, the TS packets of the BS audio ES are sequentially read, decoded, and output. The subsequent TS packets are played back in a similar manner to a normal playback operation, and a detailed description thereof is thus omitted. Only the BS audio TS packets are sequentially picked up and decoded. In a case of video ESs for still images in a browsable slide show, the still images are sequentially changed according to instructions from the user, and the video ESs are sequentially decoded and output according to instructions from the user. In a case of normal video, a playback operation similar to a normal video playback operation is carried out.

According to the process shown in FIG. 38, the playback apparatus 341 (FIG. 35) including the AV decoder 356 shown in FIG. 36, which supports BS audio ESs, merely refers to EP_map to provide random access playback of a BS audio ES in response to a random access playback instruction given from the user.

A random access playback process for an HQ audio ES will be described with reference to a flowchart shown in FIG. 39. This process is a process performed, for example, when the playback apparatus 341 shown in FIG. 35 including the AV decoder 356 shown in FIG. 37 plays back a clip (clip AV stream file and clip information file) recorded on the optical disc 11 by the foregoing processes, that is, a process performed when the playback apparatus 341 supports HQ audio ES and video ESs. That process is further a random access playback process, that is a process in which the clip AV stream file recorded on the optical disc 11 is not played back from the beginning but is played back starting from a playback position specified by a user. This process begins when the optical disc 11 having a clip recorded thereon is loaded in the playback apparatus 341 shown in FIG. 35 (which is a playback apparatus including the AV decoder 356 shown in FIG. 37).

In step S151, the playback controller 354 obtains EP_map from a clip including a BS audio ES and an HQ audio ES, which is recorded on the optical disc 11, under the control of the controller 351. The playback controller 354 supplies the obtained EP_map to the controller 351.

In step S152, the operation input unit 352 receives a random access playback instruction given from a user. The operation input unit 352 supplies the signal corresponding to the received instruction to the controller 351. For example, the user specifies a playback position (entry point) by using time to give a random access playback instruction. The operation input unit 352 supplies the signal corresponding to the received time of the entry point to the controller 351. The entry point is, as discussed above with reference to FIG. 34, designated for a predetermined BS audio TS packet. Since the playback apparatus 341 is provided with the AV decoder 356 shown in FIG. 37 and supports HQ audio ESs, for example, in the example shown in FIG. 31, a request for playback starting from the HQ audio TS packet 271-1 is issued. However, the entry point obtained herein is that designated for the BS audio TS packet 261-1. Thus, in the subsequent processing, the read position is designated in the optimum HQ audio TS packet. The user may specify time (playback duration) into which a PTS is converted as a random access playback position.

In step S153, the controller 351 obtains the source packet number and PTS value of the received entry point based on the obtained EP_map. Specifically, the PTS based on the time specified by the user and a PTS based on EP_MAP are compared to designate a PTS for playback in the PTSs stored in the EP_MAP, and the source packet number corresponding to the designated PTS is specified. For example, in FIG. 31, when the position represented by SPN_EP_start is designated as an entry point, (that is, when the controller 351 designates SPN#1 corresponding to SPN_EP_start (i.e., the number of the BS audio TS packet 261-1), as the source packet number of the entry point), the TS packet including the BS audio TS packet 261-1 is designated. The user may directly specify a time position, or may perform an operation, such as a fast forward or fast reverse operation, without directly specifying time, so that the playback apparatus can determine the corresponding time information in accordance with the user's operation. In playback, an access position may be controlled also based on the STC-sequence described above, which is not discussed herein because this operation has no relation with the present invention.

In step S154, the controller 351 designates the obtained source packet number as the read position of the clip including the BS audio ES and the HQ audio ES. For example, the controller 351 designates the obtained source packet number, i.e., SPN#1 (SPN_EP_start), as the clip read position of the optical disc 11. Since, as discussed above with reference to FIG. 34, the entry point can only be designated for a BS audio TS packet, the read position of the optical disc 11 has been designated in the BS audio TS packet.

In step S155, the playback controller 354 reads the optical disc 11 starting from the current read position under the control of the controller 351, and obtains an HQ audio TS packet that is first recorded after the read position (with respect to recording time). For example, in the example shown in FIG. 31, when the read position is designated in the BS audio TS packet 261-1, the playback controller 354 obtains the HQ audio TS packet 271-1, which is the first recorded HQ audio TS packet whose source packet number is subsequent to the BS audio TS packet 261-1 (SPN#1). The playback controller 354 supplies the obtained HQ audio TS packet 271-1 to the controller 351. That is, the playback apparatus obtains a BS audio packet and an HQ audio packet based on the PID, while ignoring the BS audio packet, which appears first, and obtaining the HQ audio packet, which appears next, according to the transport_priority flag.

In step S156, the controller 351 determines whether or not the PTS value of the PTS header included in the TS payload of the obtained HQ audio TS packet matches the obtained PTS value. In the example shown in FIG. 31, the controller 351 determines whether or not the PTS value of the PTS header 302-1 included in the TS payload of the obtained HQ audio TS packet 271-1 matches the PTS value (PTS#1) obtained in the processing of step S153. If it is determined that the PTS value corresponding to the obtained HQ audio TS packet does not match the PTS value obtained in the processing of step S153, the process returns to step S155, and the subsequent processing is repeatedly performed. For example, the HQ audio TS packet 271-2 recorded after (whose source packet number is subsequent to that of) the currently read HQ audio TS packet 271-1 is obtained, and the determination of step S156 is performed on the obtained HQ audio TS packet 271-2. One PES packet is generated from a plurality of TS packets, and a desired HQ audio TS packet may not include a PES header. For example, if the payload of the HQ audio TS packet does not include a PES header but only includes a PES payload, the process returns to step S155. Then, a subsequent HQ audio TS packet is obtained, and the subsequent processing is repeatedly performed.

If it is determined in step S156 that the PTS value corresponding to the obtained HQ audio TS packet matches the PTS value obtained in the processing of step S153, the controller 351 designates the HQ audio TS packet as a new read position. Then, in step S157, the playback controller 354 reads the HQ audio TS packet having the matched PTS value under the control of the controller 351, and supplies the read packet to the AV decoder 356 shown in FIG. 37. That is, when the PTS value corresponding to the obtained HQ audio TS packet 271-1 matches the PTS value obtained in the processing of step S153, the playback time of the BS audio TS packet 261-1 is the same as that of the HQ audio TS packet 271-1. Thus, the playback controller 354 performs playback starting from the position of the HQ audio TS packet 271-1 whose PTS value matches the obtained PTS value.

In step S158, the AV decoder 356 starts the decoding of the supplied HQ audio TS packet 271-1. That is, the playback is started from the HQ audio TS packet 271-1 having the same PTS#1 as the BS audio TS packet 261-1 (FIG. 31) at the entry point designated as the playback position. The AV decoder 356 has the structure shown in FIG. 37, and is capable of decoding HQ audio ESs. Thus, the TS packets of the HQ audio ES are sequentially read, decoded, and output. The subsequent TS packets are played back in a similar manner to a normal playback operation, and a detailed description thereof is thus omitted. Only the HQ audio TS packets are sequentially picked up and decoded. In a browsable slide show, still images are sequentially changed according to instructions from the user, and video ESs are sequentially decoded and output according to instructions from the user.

As discussed with reference to the processing of steps S54 and S55 shown in FIG. 34, EP_map is generated so that an HQ audio TS packet having the same PTS as the BS audio TS packet designated as the entry point includes the detail information, which is information at which decoding is to be started. In this case, the AV decoder 356 can start decoding of the supplied HQ audio TS packet, thus allowing quick playback. If the detail information is not included in that HQ audio TS packet, another HQ audio TS packet including the detail information is searched for, and therefore, quick playback of the HQ audio ES cannot be performed. In contrast, according to this embodiment, when an HQ audio TS packet whose PTS value is the same as the BS audio TS packet includes the detail information, an entry point is designated (the process shown in FIG. 34), thus enabling quick playback of the HQ audio ES. Further, BS audio and HQ audio are of similar data content although they differ in sound quality. There is no need for storing EP_MAP of the BS audio and HQ audio having similar content in a clip information file, thus reducing the data size and simplifying the data structure on a recording medium.

Figure 39:
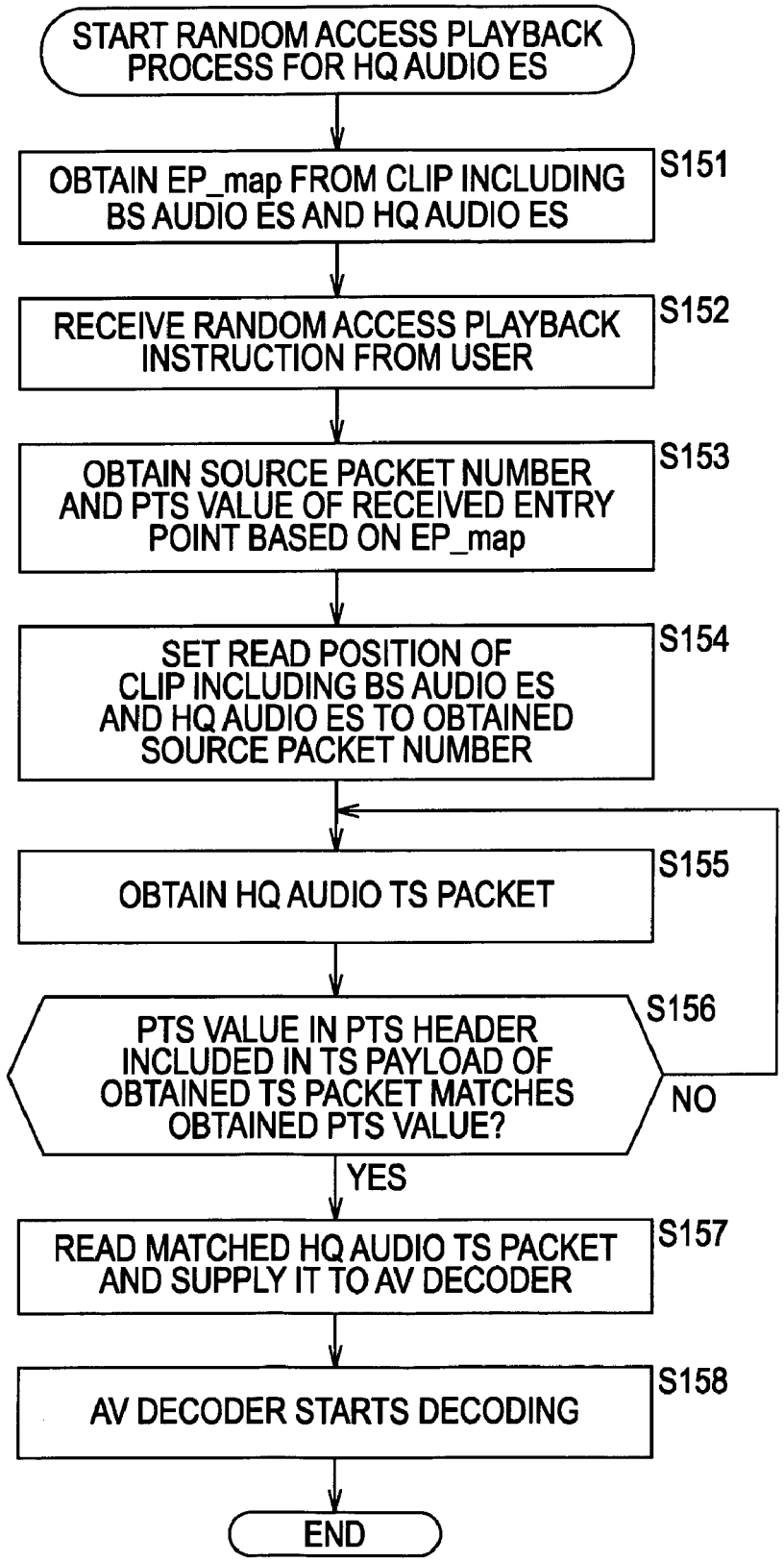
FIG. 39 is a flowchart showing a random access playback process for an HQ audio ES.

According to the process shown in FIG. 39, the playback apparatus 341 (FIG. 35) including the AV decoder 356 shown in FIG. 37, which supports HQ audio ESs, merely refers to EP_map to provide random access playback of an HQ audio ES in response to a random access playback instruction given from the user.

Therefore, even if audio of a clip AV stream file recorded on the optical disc 11 is a TS in which BS audio TS packets and HQ audio TS packets are multiplexed, EP_map is generated by the process described above with reference to FIG. 34, thus enabling random access playback based on the EP_map.

Accordingly, when audio data encoded using different encoding methods is subjected to TS packetization and multiplexing and the multiplexed data is recorded onto an optical disc as an AV stream, if an HQ audio TS packet having the same PTS value as a TS packet of an audio stream (which is a TS packet of a BS audio ES) that can be designated as an entry point exists and if, in the TS, the HQ audio TS packet is placed after the BS audio TS packet including that PTS value, that BS audio TS packet is designated as an entry point, based on which EP_map is created. Thus, in a case where an HQ audio ES corresponding to a position specified by the user is played back, the HQ audio TS with the same PTS as the BS audio TS packet designated as an entry point can be read, and random access playback of the HQ audio ES is thus performed.

Further, when a BS audio TS packet and an HQ audio TS packet whose PTSs are the same are arranged so that the HQ audio TS packet is placed after the BS audio TS packet and when the HQ audio TS packet stores the detail information, an entry point is designated. Thus, an HQ audio TS packet having the same PTS as the BS audio TS packet designated as the entry point stores the detail information, and the HQ audio ES can be quickly played back starting from that position.

In the foregoing example, the recording apparatus 1 (FIG. 1) records information onto the optical disc 11 and the playback apparatus 341 (FIG. 35) plays back the information recorded on the optical disc 11. The present invention is not limited to the optical disc 11, and can be applied to a case where information is recorded onto a recording medium, such as a hard disk, or the information recorded on such a recording medium is played back.

While EP_map to be used mainly for playing back an audio stream for a browsable slide show has been described, the present invention is not limited thereto, and can be applied to any EP_map that can be used for an audio stream may be used. For example, when audio streams to be played back in synchronization with video streams recorded on the optical disc 11 are obtained by downloading them from a network or other recording media and are played back, the source packet numbers of an audio stream corresponding to a PTS specified by the user are not supported by the EP_map for the video streams recorded on the optical disc 11. In such a case, EP_map for audio streams is used separately from the EP_map for the video streams recorded on the optical disc 11 (that is, the EP_map for the audio streams is downloaded together with the audio streams). In such a case, also, as discussed above, EP_map for audio streams is created to perform synchronous playback of the video streams recorded on the optical disc 11 and the downloaded audio streams. Further, random access playback of even the audio streams that are encoded using two different encoding methods and that are subjected to TS packetization and multiplexing can be realized. Thus, the term "recording medium" includes not only a single "recording medium", such as an optical disc, but also a plurality of recording media, such as an optical disc and a hard disk.

While, in the above-described embodiment, the recording apparatus 1 (FIG. 1) and the playback apparatus 341 (FIG. 35) are illustrated as different apparatuses, a recording/playback apparatus in which these apparatuses are combined may be used. In that case, the above-described recording and playback processes are performed by the recording/playback apparatus.

The series of processes described above may be implemented in hardware or in software. In that case, the software is installed from a recording medium onto a computer in which a program of the software is pre-installed in dedicated hardware or, e.g., a general-purpose personal computer or the like that is capable of executing various functions by installing various programs therein.

Figure 35:
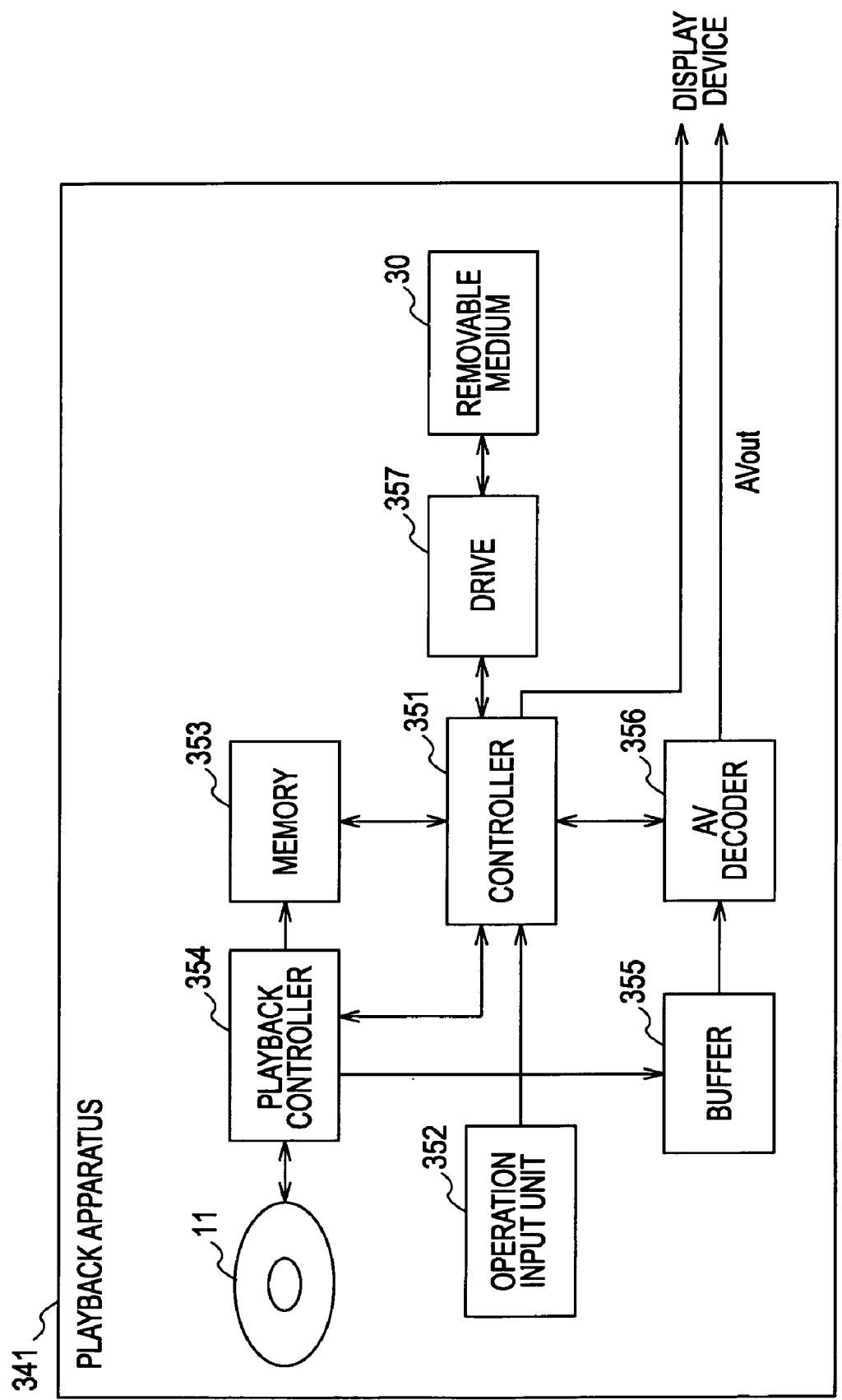
FIG. 35 is a block diagram showing an example structure of a payback apparatus according to the present invention.

The recording medium is formed of the removable medium 30, as shown in FIGS. 1 and 35, or the like, which is distributed to provide the programs to a user separately from the computer, such as a magnetic disc (including a flexible disc), an optical disc (including a CD-ROM (Compact Disk-Read Only Memory) and a DVD (Digital Versatile Disk)), a magneto-optical disc (including a MD (Mini-Disk)™), or a semiconductor memory, on which the programs are recorded.

In this specification, steps defining the programs stored in the recording medium may include processes that are executed in a time-series manner according to the order described, and also include processes that are executed in parallel or individually, not necessarily executed in a time-series manner.

The invention claimed is:

1. A recording apparatus for performing processing based on audio data, the recording apparatus comprising:
   receiving means for receiving an input of a transport stream in which first TS (Transport Stream) packets generated by TS-packetizing audio data encoded using a first encoding method that is a predetermined encoding method and second TS packets generated by TS-packetizing audio data encoded using a second encoding method different from the first encoding method are multiplexed, the second encoding method being a variable-length encoding method;
   obtaining means for obtaining time information used for decoding as first time information, the time information being included in one of the first TS packets of the transport stream received by the receiving means;
   determining means for determining whether or not one of the second TS packets that includes the time information having the same time value as the first time information exists after the one first TS packet from which the first time information is obtained by the obtaining means in the transport stream;
   setting means for setting as an entry point the one first TS packet from which the first time information is obtained when the determining means determines that the one second TS packet including the time information having the same time value as the first time information exists after the one first TS packet from which the first time information is obtained;
   creating means for creating a table based on stream identification information, the number of the one first TS packet set as the entry point by the setting means, and the first time information; and
   recording controlling means for recording the table created by the creating means onto a recording medium.

2. The recording apparatus according to claim 1, wherein the determining means further determines whether or not decoding information for starting decoding at an associated position is stored in a leading audio access unit among audio access units included in the one second TS packet including the time information having the same time value as the first time information, and the setting means sets as the entry point the one first TS packet from which the first time information is obtained when the determining means determines that the one second TS packet including the time information having the same time value as the first time information exists after the one first TS packet from which the first time information is obtained and when the determining means further determines that the decoding information necessary for performing the decoding starting from the associated position is stored in the leading audio access unit included in the one second TS packet including the time information having the same time value as the first time information.

3. The recording apparatus according to claim 1, wherein the table is a table for associating time information included in the transport stream with a TS packet number of the transport stream.

4. The recording apparatus according to claim 1, wherein the table comprises EP_map.

5. The recording apparatus according to claim 1, wherein the time information comprises a presentation time stamp.

6. The recording apparatus according to claim 1, further comprising:
   reading means for reading information recorded onto the recording medium by the recording controlling means; and
   controlling means for controlling a read position of the reading means,
   wherein the reading means reads the table from the recording medium,
   the controlling means controls the read position of the reading means based on the table and a playback position specified by a user, and
   the reading means reads the transport stream from the recording medium according to the control of the read position by the controlling means.

7. The recording apparatus according to claim 1, further comprising:
   reading means for reading information recorded onto the recording medium by the recording controlling means;
   controlling means for controlling a read position of the reading means; and
   decoding means for decoding the audio data encoded using the first encoding method,
   wherein the reading means reads the table from the recording medium,
   the controlling means designates as the read position the number of one of the first TS packets that is determined based on the table and a playback position specified by a user,
   the reading means reads the first TS packets included in the transport stream, starting from the number of the one first TS packet designated by the controlling means, and
   the decoding means decodes the audio data encoded using the first encoding method included in the first TS packets read by the reading means.

8. The recording apparatus according to claim 1, further comprising:
   reading means for reading information recorded onto the recording medium by the recording controlling means;
   controlling means for controlling a read position of the reading means; and decoding means for decoding the audio data encoded using the second encoding method, wherein the reading means reads the table from the recording medium, the controlling means designates as the read position the number of one of the first TS packets that is determined based on the table and a playback position specified by the user, the reading means reads one of the second TS packets that is recorded after the number of the one first TS packet designated by the controlling means, the controlling means further designates as the read position the number of the one second TS packet read by the reading means when the time information included in the one second TS packet matches the time information included in the one first TS packet designated as the read position, the reading means reads the second TS packets included in the transport stream, starting from the number of the one second TS packet designated by the controlling means, and the decoding means decodes the audio data encoded using the second encoding method included in the second TS packets read by the reading means.

9. A recording method for a recording apparatus for performing processing based on audio data, the recording method comprising:

a receiving step of receiving an input of a transport stream in which first TS (Transport Stream) packets generated by TS-packetizing audio data encoded using a first encoding method that is a predetermined encoding method and second TS packets generated by TS-packetizing audio data encoded using a second encoding method different from the first encoding method are multiplexed, the second encoding method being a variable-length encoding method;

an obtaining step of obtaining time information used for decoding as first time information, the time information being included in one of the first TS packets of the transport stream received in the processing of the receiving step;

a determining step of determining whether or not one of the second TS packets that includes the time information having the same time value as the first time information exists after the one first TS packet from which the first time information is obtained in the processing of the obtaining step in the transport stream;

a setting step of setting as an entry point the one first TS packet from which the first time information is obtained when it is determined in the processing of the determining step that the one second TS packet including the time information having the same time value as the first time information exists after the one first TS packet from which the first time information is obtained;

a creating step of creating a table based on stream identification information, the number of the one first TS packet set as the entry point in the processing of the setting step, and the first time information; and a recording step of recording the table created in the processing of the creating step onto a recording medium.

10. A non-transitory computer-readable medium storing a program for performing processing based on audio data, the program causing a computer to execute a process comprising:

a receiving step of receiving an input of a transport stream in which first TS (Transport Stream) packets generated by TS-packetizing audio data encoded using a first encoding method that is a predetermined encoding method and second TS packets generated by TS-packetizing audio data encoded using a second encoding method different from the first encoding method are multiplexed, the second encoding method being a variable-length encoding method;

an obtaining step of obtaining time information used for decoding as first time information, the time information being included in one of the first TS packets of the transport stream received in the processing of the receiving step;

a determining step of determining whether or not one of the second TS packets that includes the time information having the same time value as the first time information exists after the one first TS packet from which the first time information is obtained in the processing of the obtaining step in the transport stream;

a setting step of setting as an entry point the one first TS packet from which the first time information is obtained when it is determined in the processing of the determining step that the one second TS packet including the time information having the same time value as the first time information exists after the one first TS packet from which the first time information is obtained;

a creating step of creating a table based on stream identification information, the number of the one first TS packet set as the entry point in the processing of the setting step, and the first time information; and a recording step of recording the table created in the processing of the creating step onto a recording medium.

11. A playback apparatus for playing back data recorded on a recording medium, the data including a transport stream in which first TS (Transport Stream) packets generated by TS-packetizing audio data encoded using a first encoding method that is a predetermined encoding method and second TS packets generated by TS-packetizing audio data encoded using a second encoding method different from the first encoding method are multiplexed, the second encoding method being a variable-length encoding method, the playback apparatus comprising:

reading means for reading information recorded on the recording medium having a table recorded thereon, the table being created based on first time information that is time information used for decoding, which is included in one of the first TS packets of the transport stream, and stream identification information and the number of the one first TS packet including the first time information when one of the second TS packets that includes the time information having the same time value as the first time information exists after the one first TS packet from which the first time information is obtained; and controlling means for controlling a read position of the reading means, wherein the reading means reads the table from the recording medium, the controlling means controls the read position of the reading means based on the table and a playback position specified by a user, and the reading means reads the transport stream from the recording medium according to the control of the read position by the controlling means.

12. The playback apparatus according to claim 11, further comprising decoding means for decoding the audio data encoded using the first encoding method,
wherein the reading means reads the table from the recording medium,
the controlling means designates as the read position the number of one of the first TS packets that is determined based on the table and the playback position specified by the user,
the reading means reads the first TS packets included in the transport stream, starting from the number of the one first TS packet designated by the controlling means, and
the decoding means decodes the audio data encoded using the first encoding method included in the first TS packets read by the reading means.

13. The playback apparatus according to claim 11, further comprising decoding means for decoding the audio data encoded using the second encoding method,
wherein the reading means reads the table from the recording medium,
the controlling means designates as the read position the number of one of the first TS packets that is determined based on the table and the playback position specified by the user,
the reading means reads one of the second TS packets that is recorded after the number of the one first TS packet designated by the controlling means,
the controlling means further designates as the read position the number of the one second TS packet read by the reading means when the time information included in the one second TS packet matches the time information included in the one first TS packet designated as the read position,
the reading means reads the second TS packets included in the transport stream, starting from the number of the one second TS packet designated by the controlling means, and
the decoding means decodes the audio data encoded using the second encoding method included in the second TS packets read by the reading means.

14. A playback method for a playback apparatus for playing back data recorded on a recording medium,
the data including a transport stream in which first TS (Transport Stream) packets generated by TS-packetizing audio data encoded using a first encoding method that is a predetermined encoding method and second TS packets generated by TS-packetizing audio data encoded using a second encoding method different from the first encoding method are multiplexed, the second encoding method being a variable-length encoding method, the playback method comprising:
a first reading step of reading a table from the recording medium having the table recorded thereon, the table being created based on first time information that is time information used for decoding, which is included in one of the first TS packets of the transport stream, and stream identification information and the number of the one first TS packet including the first time information when one of the second TS packets that includes the time information having the same time value as the first time information exists after the one first TS packet from which the first time information is obtained;
a controlling step of controlling a read position based on the table and a playback position specified by a user; and
a second reading step of reading the transport stream from the recording medium according to the control of the read position by the processing of the controlling step.

15. A non-transitory computer-readable medium storing a program for playing back data recorded on a recording medium,
the data including a transport stream in which first TS (Transport Stream) packets generated by TS-packetizing audio data encoded using a first encoding method that is a predetermined encoding method and second TS packets generated by TS-packetizing audio data encoded using a second encoding method different from the first encoding method are multiplexed, the second encoding method being a variable-length encoding method, the program causing a computer to execute a process comprising:
a first reading step of reading a table from the recording medium having the table recorded thereon, the table being created based on first time information that is time information used for decoding, which is included in one of the first TS packets of the transport stream, and stream identification information and the number of the one first TS packet including the first time information when one of the second TS packets that includes the time information having the same time value as the first time information exists after the one first TS packet from which the first time information is obtained;
a controlling step of controlling a read position based on the table and a playback position specified by a user; and
a second reading step of reading the transport stream from the recording medium according to the control of the read position by the processing of the controlling step.

16. A non-transitory recording medium having recorded thereon data regarding audio data,
wherein the data including a transport stream in which first TS (Transport Stream) packets generated by TS-packetizing audio data encoded using a first encoding method that is a predetermined encoding method and second TS packets generated by TS-packetizing audio data encoded using a second encoding method different from the first encoding method are multiplexed, the second encoding method being a variable-length encoding method; and
a table is recorded on the recording medium, the table being created based on first time information, the first time information being time information used for decoding the transport stream by a playback apparatus, the time information being included in one of the first TS packets of the transport stream, the table being created based on stream identification information and the number of the one first TS packet including the first time information when one of the second TS packets that includes the time information having the same time value as the first time information exists after the one first TS packet from which the first time information is obtained.

17. A playback method for playing back data recorded on a recording medium, the data including a transport stream in which first TS (Transport Stream) packets generated by TS-packetizing audio data encoded using a first encoding method that is a predetermined encoding method and second TS packets generated by TS-packetizing audio data encoded using a second encoding method different from the first encoding method are multiplexed, the second encoding method being a variable-length encoding method, the playback method comprising the steps of:
obtaining first time information for playback;
reading a table including correspondence information between position information for the first TS packets on the recording medium and second time information used for decoding the first TS packets;
specifying the second time information stored in the table based on the first time information;
obtaining position information corresponding to the second time information specified based on the table;
starting the reading of the data from a recording position at which one of the first TS packets is recorded in the position information;

obtaining one of the second TS packets that is multiplexed at a position after the position at which the reading of the data is started; and decoding the obtained one second TS packet without decoding the read one first TS packet.

* * * * *

UNITED STATES PATENT AND TRADEMARK OFFICE
CERTIFICATE OF CORRECTION

| | | |
|---|---|---|
| PATENT NO. | : 7,978,955 B2 | Page 1 of 1 |
| APPLICATION NO. | : 11/629651 | |
| DATED | : July 12, 2011 | |
| INVENTOR(S) | : Ayako Iwase et al. | |

It is certified that error appears in the above-identified patent and that said Letters Patent is hereby corrected as shown below:

On the title page, Item (86), the PCT No. is incorrect. Item (86) should read:

-- (86)  PCT No.:     PCT/JP2006/307744

§ 371 (c)(1),
  (2), (4) Date:   Dec. 15, 2006 --

Signed and Sealed this
Thirtieth Day of August, 2011

David J. Kappos
*Director of the United States Patent and Trademark Office*